(12) United States Patent
Baird, III

(10) Patent No.: US 12,443,622 B2
(45) Date of Patent: Oct. 14, 2025

(54) METHODS AND APPARATUS FOR A DISTRIBUTED DATABASE WITHIN A NETWORK

(71) Applicant: Hedera Hashgraph, LLC, Las Vegas, NV (US)

(72) Inventor: Leemon C. Baird, III, Richardson, TX (US)

(73) Assignee: Hedera Hashgraph, LLC, Las Vegas, NV (US)

( * ) Notice: Subject to any disclaimer, the term of this patent is extended or adjusted under 35 U.S.C. 154(b) by 0 days.

(21) Appl. No.: 18/318,787

(22) Filed: May 17, 2023

(65) Prior Publication Data
US 2024/0111782 A1   Apr. 4, 2024

Related U.S. Application Data

(63) Continuation of application No. 17/493,934, filed on Oct. 5, 2021, now abandoned.
(Continued)

(51) Int. Cl.
*G06F 16/27* (2019.01)
*G06F 16/22* (2019.01)
*G06F 16/23* (2019.01)

(52) U.S. Cl.
CPC .......... *G06F 16/27* (2019.01); *G06F 16/2237* (2019.01); *G06F 16/2358* (2019.01)

(58) Field of Classification Search
CPC ............. G06F 16/2237; G06F 16/2255; G06F 16/2358; G06F 16/27; G06F 16/275; G06F 16/9024
See application file for complete search history.

(56) References Cited

U.S. PATENT DOCUMENTS

| 4,309,569 A | 1/1982 | Merkle |
| 5,280,619 A | 1/1994 | Wang |

(Continued)

FOREIGN PATENT DOCUMENTS

| CA | 2845306 A1 | 2/2013 |
| CN | 101390078 A | 3/2009 |

(Continued)

OTHER PUBLICATIONS

Aho et al. 1983. Data Structures and Algorithms (1st ed.). Addison-Wesley Longman Publishing Co., Inc., Boston, MA, USA, 620 pages.

(Continued)

*Primary Examiner* — Taelor Kim
(74) *Attorney, Agent, or Firm* — COOLEY LLP

(57) ABSTRACT

In some embodiments, a method includes defining an address book for a distributed database. The address book includes an identifier for each compute device from a set of compute devices that implements the distributed database via a network. The method further includes receiving, from a compute device from the set of compute devices, an event including a transaction to update the address book and calculating, based on a consensus protocol of the distributed database that uses the address book, a received round for the event. The method further includes updating the address book based on the transaction to define an updated address book a predetermined number of rounds after at least one of the received round for the event or a previous update to the address book.

20 Claims, 23 Drawing Sheets

Related U.S. Application Data

(60) Provisional application No. 63/088,298, filed on Oct. 6, 2020.

(56) References Cited

U.S. PATENT DOCUMENTS

| | | |
|---|---|---|
| 5,701,480 A | 12/1997 | Raz |
| 5,991,414 A | 11/1999 | Garay et al. |
| 5,999,931 A | 12/1999 | Breitbart et al. |
| 6,336,139 B1 | 1/2002 | Feridun et al. |
| 6,446,092 B1 | 9/2002 | Sutter |
| 6,457,007 B1 | 9/2002 | Kikuchi et al. |
| 6,584,476 B1 | 6/2003 | Chatterjee et al. |
| 6,694,328 B1 | 2/2004 | Bennett |
| 6,966,836 B1 | 11/2005 | Rush et al. |
| 7,062,490 B2 | 6/2006 | Adya et al. |
| 7,240,060 B2 | 7/2007 | Adya et al. |
| 7,555,516 B2 | 6/2009 | Lamport |
| 7,558,883 B1 | 7/2009 | Lamport |
| 7,590,632 B1 | 9/2009 | Caronni et al. |
| 7,647,329 B1 | 1/2010 | Fischman et al. |
| 7,797,457 B2 | 9/2010 | Lamport |
| 7,844,745 B1 | 11/2010 | Darbyshire et al. |
| 7,849,223 B2 | 12/2010 | Malkhi et al. |
| 7,890,508 B2 | 2/2011 | Gerber et al. |
| 8,037,279 B2 | 10/2011 | Schuba et al. |
| 8,112,452 B2 | 2/2012 | Adya et al. |
| 8,285,689 B2 | 10/2012 | Du et al. |
| 8,423,678 B2 | 4/2013 | Darbyshire et al. |
| 8,478,114 B1 | 7/2013 | Beach et al. |
| 8,533,169 B1 | 9/2013 | Bailey et al. |
| 8,533,582 B2 | 9/2013 | Rao et al. |
| 8,571,519 B2 | 10/2013 | Ginzboorg |
| 8,600,944 B2 | 12/2013 | Bryant et al. |
| 8,612,386 B2 | 12/2013 | Tien et al. |
| 8,654,650 B1 | 2/2014 | Vermeulen et al. |
| 8,713,038 B2 | 4/2014 | Cohen et al. |
| 8,732,140 B2 | 5/2014 | Bird et al. |
| 8,766,980 B2 | 7/2014 | Miyashita et al. |
| 8,775,464 B2 | 7/2014 | Bulkowski et al. |
| 8,799,248 B2 | 8/2014 | Bulkowski et al. |
| 8,862,617 B2 | 10/2014 | Kesselman |
| 8,868,467 B2 | 10/2014 | Serebrennikov |
| 8,880,486 B2 | 11/2014 | Driesen et al. |
| 8,886,601 B1 | 11/2014 | Landau et al. |
| 8,914,333 B2 | 12/2014 | Bird et al. |
| 9,189,342 B2 | 11/2015 | Von Thenen et al. |
| 9,244,717 B2 | 1/2016 | Pissay et al. |
| 9,251,235 B1 | 2/2016 | Hurst et al. |
| 9,280,591 B1 | 3/2016 | Kharatishvili et al. |
| 9,390,154 B1 | 7/2016 | Baird, III |
| 9,407,516 B2 | 8/2016 | Gordon |
| 9,529,923 B1 | 12/2016 | Baird, III |
| 9,568,943 B1 | 2/2017 | Carman |
| 9,646,029 B1 | 5/2017 | Baird, III |
| 9,842,031 B1 | 12/2017 | Kharatishvili |
| 9,875,510 B1 | 1/2018 | Kasper |
| 9,965,731 B2 | 5/2018 | Dantzig et al. |
| 10,097,356 B2 | 10/2018 | Zinder |
| 10,318,505 B2 | 6/2019 | Baird, III |
| 10,353,888 B1 | 7/2019 | Cogan et al. |
| 10,354,325 B1 | 7/2019 | Skala et al. |
| 10,375,037 B2 | 8/2019 | Baird, III et al. |
| 10,489,385 B2 | 11/2019 | Baird, III et al. |
| 10,572,455 B2 | 2/2020 | Baird, III |
| 10,747,753 B2 | 8/2020 | Baird, III |
| 10,887,096 B2 | 1/2021 | Baird, III |
| 11,222,006 B2 | 1/2022 | Baird, III |
| 11,232,081 B2 | 1/2022 | Baird, III |
| 11,256,823 B2 | 2/2022 | Baird, III et al. |
| 11,475,150 B2 | 10/2022 | Baird, III |
| 11,537,593 B2 | 12/2022 | Baird, III et al. |
| 11,657,036 B2 | 5/2023 | Baird, III |
| 11,677,550 B2 | 6/2023 | Baird, III |
| 11,681,821 B2 | 6/2023 | Baird, III |
| 11,734,260 B2 | 8/2023 | Baird, III |
| 11,797,502 B2 | 10/2023 | Baird, III |
| 2001/0025351 A1 | 9/2001 | Kursawe et al. |
| 2002/0129087 A1 | 9/2002 | Cachin et al. |
| 2002/0143800 A1 | 10/2002 | Lindberg et al. |
| 2002/0186848 A1 | 12/2002 | Shaik |
| 2003/0147536 A1 | 8/2003 | Andivahis et al. |
| 2004/0012630 A1 | 1/2004 | Carels et al. |
| 2004/0030822 A1 | 2/2004 | Rajan et al. |
| 2004/0172421 A1 | 9/2004 | Saito et al. |
| 2005/0038831 A1 | 2/2005 | Souder et al. |
| 2005/0102268 A1 | 5/2005 | Adya et al. |
| 2005/0114666 A1 | 5/2005 | Sudia |
| 2005/0141706 A1 | 6/2005 | Regli et al. |
| 2005/0246397 A1 | 11/2005 | Edwards et al. |
| 2006/0047720 A1 | 3/2006 | Kulkarni et al. |
| 2006/0136369 A1 | 6/2006 | Douceur et al. |
| 2006/0168011 A1 | 7/2006 | Lamport |
| 2006/0212759 A1 | 9/2006 | Campbell et al. |
| 2007/0050415 A1 | 3/2007 | Armangau et al. |
| 2007/0165865 A1 | 7/2007 | Talvitie |
| 2008/0120300 A1 | 5/2008 | Detlefs et al. |
| 2008/0220873 A1 | 9/2008 | Lee et al. |
| 2008/0256078 A1 | 10/2008 | Bhashyam |
| 2008/0298579 A1 | 12/2008 | Abu-Amara |
| 2009/0012932 A1 | 1/2009 | Romem et al. |
| 2009/0083210 A1 | 3/2009 | Clark et al. |
| 2009/0150566 A1 | 6/2009 | Malkhi et al. |
| 2009/0158413 A1 | 6/2009 | Gentry et al. |
| 2009/0182673 A1 | 7/2009 | Al-Herz et al. |
| 2009/0248624 A1 | 10/2009 | Lammel et al. |
| 2010/0172504 A1 | 7/2010 | Allen et al. |
| 2010/0198914 A1 | 8/2010 | Gehrke et al. |
| 2010/0257198 A1 | 10/2010 | Cohen et al. |
| 2011/0029689 A1 | 2/2011 | Darbyshire et al. |
| 2011/0173455 A1 | 7/2011 | Spalka et al. |
| 2011/0191251 A1 | 8/2011 | Al-Herz et al. |
| 2011/0196827 A1 | 8/2011 | Zunger |
| 2011/0196834 A1 | 8/2011 | Kesselman |
| 2011/0196873 A1 | 8/2011 | Kesselman |
| 2011/0250974 A1 | 10/2011 | Shuster |
| 2011/0251997 A1 | 10/2011 | Wang et al. |
| 2012/0078847 A1 | 3/2012 | Bryant et al. |
| 2012/0102006 A1 | 4/2012 | Larson et al. |
| 2012/0131093 A1 | 5/2012 | Hamano et al. |
| 2012/0150802 A1 | 6/2012 | Popov et al. |
| 2012/0150844 A1 | 6/2012 | Lindahl et al. |
| 2012/0198450 A1 | 8/2012 | Yang et al. |
| 2012/0209822 A1 | 8/2012 | Prabhakar et al. |
| 2012/0221528 A1 | 8/2012 | Renkes et al. |
| 2012/0233134 A1 | 9/2012 | Barton et al. |
| 2012/0254163 A1 | 10/2012 | Bandyopadhyay et al. |
| 2012/0278293 A1 | 11/2012 | Bulkowski et al. |
| 2012/0303631 A1 | 11/2012 | Bird et al. |
| 2012/0310985 A1 | 12/2012 | Gale et al. |
| 2013/0110767 A1 | 5/2013 | Tatemura et al. |
| 2013/0145426 A1 | 6/2013 | Wright et al. |
| 2013/0246377 A1 | 9/2013 | Gaitonde |
| 2013/0263119 A1 | 10/2013 | Pissay et al. |
| 2013/0290249 A1 | 10/2013 | Merriman et al. |
| 2013/0311422 A1 | 11/2013 | Walker et al. |
| 2014/0012812 A1 | 1/2014 | Zunger |
| 2014/0025443 A1 | 1/2014 | Onischuk |
| 2014/0108415 A1 | 4/2014 | Bulkowski et al. |
| 2014/0222829 A1 | 8/2014 | Bird et al. |
| 2014/0310243 A1 | 10/2014 | McGee et al. |
| 2014/0324905 A1 | 10/2014 | Matsumoto |
| 2014/0337393 A1 | 11/2014 | Burchall et al. |
| 2015/0067002 A1 | 3/2015 | Shvachko et al. |
| 2015/0067819 A1 | 3/2015 | Shribman et al. |
| 2015/0074050 A1 | 3/2015 | Landau et al. |
| 2015/0172412 A1 | 6/2015 | Escriva et al. |
| 2015/0186497 A1 | 7/2015 | Patton et al. |
| 2015/0200774 A1 | 7/2015 | Le Saint |
| 2015/0242478 A1 | 8/2015 | Cantwell et al. |
| 2015/0277969 A1 | 10/2015 | Strauss et al. |
| 2015/0281344 A1 | 10/2015 | Grootwassink et al. |
| 2015/0294308 A1 | 10/2015 | Pauker et al. |
| 2016/0085772 A1 | 3/2016 | Vermeulen et al. |
| 2016/0088424 A1 | 3/2016 | Polo et al. |

(56) References Cited

U.S. PATENT DOCUMENTS

| | | | |
|---|---|---|---|
| 2016/0091988 | A1 | 3/2016 | Skowronski et al. |
| 2016/0140548 | A1 | 5/2016 | Ahn |
| 2016/0150060 | A1 | 5/2016 | Meng et al. |
| 2016/0205218 | A1 | 7/2016 | Tan et al. |
| 2016/0218875 | A1 | 7/2016 | Le Saint et al. |
| 2016/0241392 | A1 | 8/2016 | Vandervort |
| 2016/0283920 | A1 | 9/2016 | Fisher et al. |
| 2016/0292213 | A1 | 10/2016 | Stanfill |
| 2016/0328429 | A1 | 11/2016 | Lipcon |
| 2016/0342976 | A1 | 11/2016 | Davis |
| 2017/0006097 | A1 | 1/2017 | Johnson |
| 2017/0041296 | A1 | 2/2017 | Ford et al. |
| 2017/0048261 | A1 | 2/2017 | Gmach et al. |
| 2017/0075938 | A1 | 3/2017 | Black et al. |
| 2017/0116095 | A1 | 4/2017 | Schatz et al. |
| 2017/0132257 | A1 | 5/2017 | Baird, III |
| 2017/0180367 | A1* | 6/2017 | Warren ............... H04L 63/0823 |
| 2017/0300550 | A1 | 10/2017 | Emberson et al. |
| 2017/0308548 | A1 | 10/2017 | Baird, III |
| 2018/0005186 | A1 | 1/2018 | Hunn |
| 2018/0006820 | A1 | 1/2018 | Arasu et al. |
| 2018/0018370 | A1 | 1/2018 | Feiks et al. |
| 2018/0026782 | A1 | 1/2018 | Xiao et al. |
| 2018/0101777 | A1 | 4/2018 | Benja-Athon |
| 2018/0173747 | A1 | 6/2018 | Baird, III |
| 2019/0020629 | A1* | 1/2019 | Baird, III ............. H04L 9/3297 |
| 2019/0028278 | A1 | 1/2019 | Gilson |
| 2019/0034517 | A1 | 1/2019 | Byrd |
| 2019/0042619 | A1 | 2/2019 | Baird, III |
| 2019/0129893 | A1 | 5/2019 | Baird, III et al. |
| 2019/0235946 | A1 | 8/2019 | Guo et al. |
| 2019/0268147 | A1* | 8/2019 | Baird, III ............. H04L 9/0866 |
| 2019/0286623 | A1 | 9/2019 | Baird, III |
| 2020/0012676 | A1 | 1/2020 | Singh Narang et al. |
| 2020/0073758 | A1 | 3/2020 | Natarajan et al. |
| 2020/0097459 | A1 | 3/2020 | Baird, III et al. |
| 2020/0125538 | A1 | 4/2020 | Baird, III |
| 2020/0145387 | A1 | 5/2020 | Baird, III et al. |
| 2020/0320064 | A1 | 10/2020 | Baird, III |
| 2020/0372015 | A1 | 11/2020 | Baird, III |
| 2021/0126780 | A1 | 4/2021 | Baird, III |
| 2021/0209885 | A1* | 7/2021 | Lundin ................. H04L 9/3239 |
| 2022/0107960 | A1 | 4/2022 | Baird, III |
| 2022/0129438 | A1 | 4/2022 | Baird, III |
| 2022/0237312 | A1 | 7/2022 | Baird, III et al. |
| 2022/0391358 | A1 | 12/2022 | Baird, III |

FOREIGN PATENT DOCUMENTS

| | | |
|---|---|---|
| CN | 101627395 A | 1/2010 |
| CN | 102142015 A | 8/2011 |
| CN | 102419764 A | 4/2012 |
| CN | 102474682 A | 5/2012 |
| CN | 102567453 A | 7/2012 |
| CN | 102622442 A | 8/2012 |
| CN | 102819585 A | 12/2012 |
| CN | 102831156 A | 12/2012 |
| CN | 102999433 A | 3/2013 |
| CN | 103605810 A | 2/2014 |
| CN | 103746811 A | 4/2014 |
| CN | 103842995 A | 6/2014 |
| CN | 103858123 A | 6/2014 |
| CN | 104636130 A | 5/2015 |
| CN | 105681301 A | 6/2016 |
| CN | 106021017 A | 10/2016 |
| CN | 106022917 A | 10/2016 |
| CN | 106789095 A | 5/2017 |
| CN | 106797311 A | 5/2017 |
| CN | 106897119 A | 6/2017 |
| CN | 107003893 A | 8/2017 |
| CN | 107247749 A | 10/2017 |
| CN | 108833607 A | 11/2018 |
| CN | 109314703 A | 2/2019 |
| EP | 0949595 A2 | 10/1999 |
| JP | H09509268 A | 9/1997 |
| JP | 2003202964 A | 7/2003 |
| JP | 2005216167 A | 8/2005 |
| JP | 2008225693 A | 9/2008 |
| JP | 2010033227 A | 2/2010 |
| JP | 2010146103 A | 7/2010 |
| JP | 2010225148 A | 10/2010 |
| JP | 2012027685 A | 2/2012 |
| JP | 5211342 B2 | 6/2013 |
| JP | 2014506345 A | 3/2014 |
| JP | 2015526832 A | 9/2015 |
| JP | 2016096547 A | 5/2016 |
| JP | 2016519379 A | 6/2016 |
| JP | 2017510002 A | 4/2017 |
| KR | 20100014941 A | 2/2010 |
| KR | 20160140800 A | 12/2016 |
| RU | 2376635 C2 | 12/2009 |
| RU | 2417426 C2 | 4/2011 |
| RU | 2449358 C1 | 4/2012 |
| RU | 2510623 | 4/2014 |
| RU | 2560810 C2 | 8/2015 |
| RU | 2595493 C2 | 8/2016 |
| WO | WO-9514279 A1 | 5/1995 |
| WO | WO-2014037901 A1 | 3/2014 |
| WO | WO-2015008377 A1 | 1/2015 |
| WO | WO-2015094329 A1 | 6/2015 |
| WO | WO-2015111152 A1 | 7/2015 |
| WO | WO-2016143095 A1 | 9/2016 |
| WO | WO-2017176523 A1 | 10/2017 |

OTHER PUBLICATIONS

Anonymous: "Sammantics," Oct. 30, 2016 (Oct. 30, 2016), pp. 1-169, Retrieved from the Internet: URL: https://web.archive.org/web/2016103018 2822/ http://sammantics.com/ [retrieved on Apr. 11, 2022].

[Author Unknown] "Merkle Tree". Wikipedia (May 17, 2020), https://en.wikipedia.org/w/index.php?title=Merkle_tree&oldid=957154565; 5 pages.

Baird et al., "Hedera: A Governing Council & Public Hashgraph Network," Whitepaper, v.1.4, dated Oct. 17, 2018, 76 pages.

Baird et al., "Hedera: A Public Hashgraph Network and Governing Council," WhitePaper V 2.0, Aug. 29, 2019, available from http://tokeninsight.com/api/upload/content/whitepaper/HBAR_en .pdf (Year: 2019), 97 pages.

Baird, "Hashgraph Consensus: Detailed Examples," Swirlds Tech Report Swirlds-TR-2016-02, dated Dec. 11, 2016, 29 pages.

Baird, "Hashgraph Consensus: Fair, Fast Byzantine Fault Tolerance," Swirlds Tech Report TR-2016-01, dated May 31, 2016, 24 pages.

Bitcoin—"you-need-to-know" archived Sep. 5, 2015 and retrieved from https://web.archive.org/web/20150905115130/https:// bitcoin. org/en/you-need-to-know on Jul. 13, 2020, 2 pages.

Boneh, "Functional Encryption: A New Vision for Public-Key Cryptography, "Communication of the ACM 55:56-64 (2012).

Bonneau et al., SoK: Research Perspectives and Challenges for Bitcoin and Cryptocurrencies, International Association for Cryptologic Research vol. 20150323:173252, 18 pages (2015), DOI: 10.1109/SP.2015.14 [retrieved on Mar. 23, 2015].

Defago et al., "Total Order broadcast and multicast algorithms: Taxonomy and survey." ACM Computing Surveys (CSUR) 36.4 (2004): 372-421.

Final Office Action issued by The United States Patent and Trademark Office for U.S. Appl. No. 17/493,934, dated May 26, 2022, 19 pages.

Gauthierdickey et al. "Low latency and cheat-proof event ordering for peer-to-peer games." Proceedings of the 14th international workshop on Network and operating systems support for digital audio and video. ACM, 2004, 6 pages.

Gauthierdickey et al., "Using n-trees for scalable event ordering in peer-to-peer games." Proceedings of the international workshop on Network and operating systems support for digital audio and video. ACM, 2005.

International Preliminary Report on Patentability issued by the International Searching Authority for Application No. PCT/US2021/053595, dated Mar. 28, 2023, 13 pages.

(56) References Cited

OTHER PUBLICATIONS

International Search Report and Written Opinion issued by the International Searching Authority for Application No. PCT/US21/053595, dated Jan. 21, 2022, 20 pages.
https://web.archive.org/web/20150811233709/https://en.wikipedia.org/wiki/Paxos_(computer_science). Jun. 17, 2015, 15 pages.
Knutsson et al., "Peer-to-Peer Support for Massively Multiplayer Games", Department of Computer and Information Science, University of Pennsylvania, IEEE INFOCOM 2004, 2 pages.
Kshemkalyani., et al., "Consensus and agreement algorithms," Distributed computing: principles, algorithms, and systems. Cambridge University Press, pp. 510-531 (2011).
Kwon, J., "Tendermint (capture)", Mar. 19, 2015 (Mar. 19, 2015), Retrieved from the Internet: URL:https://web.archive.org/web/20150319035333if_/http://tendermint.com:80/docs/tendermint.pdf [retrieved on Jul. 19, 2018], 1 page.
Lamport et al., "The Byzantine generals problem." ACM Transactions on Programming Languages and Systems (TOPLAS) 4(3): 382-401 (1982).
Lerner, "DagCoin Draft," dated Sep. 11, 2015, 6 pages, Retrieved from the Internet: URL:https://bitslog.files.wordpress.com/2015/09/dagcoin-v41.pdf [retrieved on May 6, 2020].
Lumezanu et al., "Decentralized message ordering for publish/subscribe systems." Proceedings of the ACM/IFIP/USENIX 2006 International Conference on Middleware. Springer-Verlag New York, Inc., 2006, 18 pages.
Moser et al., "Byzantine-resistant total ordering algorithms." Information and Computation 150.1 (1999): 75-111.
Moser et al., "Total Ordering Algorithms for Asynchronous Byzantine Systems," International Workshop on Distributed Algorithms, 1995, 15 pages.
Non-Final Office Action issued by The United States Patent and Trademark Office for U.S. Appl. No. 17/493,934, dated Feb. 1, 2022, 53 pages.
Reed, "Bitcoin Cooperative Proof-of-Stake," Feb. 14, 2015 (Feb. 14, 2015, XP055472093, Retrieved from the Internet: URL: https://web.archive.org/web/20150214181302/https://arxiv.org/abs/1405.5741 [retrieved on May 3, 2018], 16 pages.
Shirriff, Ken, "Bitcoins the hard way: Using the raw Bitcoin protocol," Oct. 14, 2016 (Oct. 14, 2016), pp. 1-31, Retrieved from the Internet: URL: https://web.archive.org/web/2016101400 2912/http://www.righto.com/2014/02/bitcoin s-hard-way-using-raw-bitcoin.html [retrieved on Apr. 12, 2022].
Sompolinsky, Yonatan and Zohar, Aviv, "Secure High-Rate Transaction Processing in Bitcoin," International Conference on Financial Cryptography and Data Security (FC 2015), Springer,2015, 31 pages cited as 7(16):507-527,DOI: 10.1007/978-3-662-47854-7_32.
Tang et al., "Improved Hybrid Consensus Scheme with Privacy-Preserving Property," IACR, International Association for Cryptologic Research 2010407:004100, pp. 1-8 (2017).
Tseng et al., Byzantine Consensus in Directed Graphs. ArXiv, abs/1208.5075. A 1, dated Feb. 19, 2014, 33 pages.
Vaidya et al., "Iterative approximate Byzantine consensus in arbitrary directed graphs," In Proceedings of the 2012 ACM symposium on Principles of distributed computing, pp. 365-374 (2012).
Wikipedia, Copy-on-write, Jul. 31, 2015, accessed Oct. 20, 2017 at https://en.wikipedia.org/w/index.php?title=Copy-on- write&oldid=673938951, 3 pages.
Office Action issued by the Chinese Patent Office for Application No. 2021106588830.3, dated Dec. 6, 2023, 17 pages including English translation.
Wang et al., "Automatically cleaning of approximately duplicate data based on Web big data," Computer Engineering and Design, 6 pages (Mar. 16, 2017).
Extended European Search Report for European Application No. 21878373.6 mailed Oct. 9, 2024, 9 pages.
Hu Shikun, Application of distributed database technology in big data, Database technology, 3 pages including machine translation. (Jan. 15, 2019).
Papazoglou, M.P., "Distributed Database Architectures", International Conference on Databases, Parallel Architectures, and Their Applications, 1 page (Aug. 6, 2002).
Office Action for Japanese Application No. 2023-521031 mailed Aug. 22, 2025, with English translation 11 pages.

\* cited by examiner

An event is a tuple $e = \{d, h, t, c, s\}$ where:

$$
\begin{aligned}
d &= data(e) &&= \text{the "payload" data, which may include transactions.} \\
h &= hashes(e) &&= \text{a list of hashes of the event's parents, self-parent first.} \\
t &= time(e) &&= \text{creator's claimed date and time of the event's creation.} \\
c &= creator(e) &&= \text{creator's ID number.} \\
s &= sig(e) &&= \text{creator's digital signature of } \{d,h,t,c\}. \\
n &= &&\text{the number of members in the population} \\
m &= 1 + \lfloor 2n/3 \rfloor \\
first &= &&\text{the unique event that has no parents} \\
E &= &&\text{the set of all events} \\
T &= &&\text{set of all possible } (time, date) \text{ pairs} \\
\mathbb{B} &= \{true, false\} \\
\mathbb{N} &= \{0, 1, 2, ...\}
\end{aligned}
$$

$$
\begin{aligned}
ancestor &: E \times E \to \mathbb{B} \\
selfAncestor &: E \times E \to \mathbb{B} \\
see &: E \times E \to \mathbb{B} \\
stronglySee &: E \times E \to \mathbb{B} \\
parentRound &: E \to \mathbb{N} \\
witness &: E \to \mathbb{B} \\
round &: E \to \mathbb{N} \\
roundDiff &: E \times E \to \mathbb{I} \\
votes &: E \times E \times \mathbb{B} \to \mathbb{N} \\
voteFraction &: E \times E \to \mathbb{R} \\
vote &: E \times E \to \mathbb{B} \\
decide &: E \times E \to \mathbb{B} \\
allFamous &: \mathbb{I} \to 2^E \\
famous &: E \to \mathbb{B} \\
roundReceived &: E \to \mathbb{N} \\
timeReceived &: E \to T
\end{aligned}
$$

FIG. 10A $$\begin{aligned}
\text{ancestor}(x,y) &= (x=y) \vee (\exists z \in \text{parents}(x): \text{ancestor}(z,y)) \\
\text{selfAncestor}(x,y) &= \text{ancestor}(x,y) \wedge ((\text{selfParent}(x)=y) \vee \text{selfAncestor}(\text{selfParent}(x),y)) \\
\text{see}(x,y) &= \text{ancestor}(x,y) \wedge \neg(\exists a,b,c \in E: \\
&\quad (\text{ancestor}(y,a) \wedge \text{ancestor}(y,b) \wedge c \in \text{parents}(a) \wedge c \in \text{parents}(b)) \wedge \\
&\quad \text{creator}(a) = \text{creator}(b) = \text{creator}(c)) \\
\text{stronglySee}(x,y) &= \text{see}(x,y) \wedge (\exists S \in 2^E: (|S|=m) \wedge (z \in S \iff (\text{see}(x,z) \wedge \text{see}(z,y)))) \\
\text{parentRound}(x) &= \begin{cases} 0 & \text{if } x = first \\ \max_{y \in \text{parents}(x)} \text{round}(y) & \text{otherwise} \end{cases} \\
\text{witness}(x) &= \exists S \in 2^E: (|S|=m \wedge \\
&\quad (\forall y \in S: (\text{round}(y) = \text{parentRound}(x) \wedge \text{stronglySee}(x,y)))) \\
\text{round}(x) &= \begin{cases} 1+\text{parentRound}(x) & \text{if witness}(x) \\ \text{parentRound}(x) & \text{otherwise} \end{cases} \\
\text{roundDiff}(x,y) &= \text{round}(x) - \text{round}(y) \\
\text{votes}(x,y,v) &= |\{z \in E \mid \text{see}(x,y) \wedge \text{roundDiff}(x,z)=1 \wedge \\
&\quad \text{stronglySee}(x,z) \wedge \text{vote}(z,y)=v\}| \\
\text{voteFraction}(x,y) &= \text{votes}(x, true)/(\text{votes}(x, true)+\text{votes}(x, false)) \\
\text{vote}(x,y) &= \begin{cases} \text{see}(x,y) & \text{if roundDiff}(x,y)=1 \\ (\text{voteFraction}(x,y) >= 1/2) & \text{if (roundDiff}(x,y) \bmod 5 \neq 1) \vee \\ & |\text{voteFraction}(x,y)-1/2| > 1/6 \\ (1 = \text{LSB}(\text{signature}(x))) & \text{otherwise} \end{cases} \\
\text{decide}(x,y) &= \text{vote}(x,y) \wedge (\text{roundDiff}(x,y) \bmod 5 \neq 1) \wedge (\text{voteFraction}(x,y) > 2/3) \\
\text{allFamous}(r) &= \{x \in E \mid \text{famous}(x) \wedge \text{round}(x) = r\} \\
\text{famous}(x) &= \text{witness}(x) \wedge \exists y \in E: \text{decide}(y,x) \\
\text{roundReceived}(x) &= \min_{r \in \mathbb{N}}(|\{y \in E \mid \text{round}(y)=r \wedge \text{famous}(y) \wedge \text{see}(y,x)\}| / \\
&\quad |\{y \in E \mid \text{round}(y)=r \wedge \text{famous}(y)\}| >= 1/2) \\
\text{timeReceived}(x) &= \text{median}(\{\text{time}(y) \mid y \in E \wedge \text{see}(y,x) \wedge \\
&\quad (\exists z \in E: \text{round}(z) = \text{roundReceived}(x) \wedge \text{selfAncestor}(z,y)) \wedge \\
&\quad \neg(\exists w \in E: \text{selfAncestor}(y,w) \wedge \text{see}(w,x))\})
\end{aligned}$$

FIG. 10B

An event is a tuple $e = \{d, h, t, c, s\}$ where:

$$
\begin{aligned}
d &= data(e) &&= \text{the "payload" data, which may include transactions.} \\
h &= hashes(e) &&= \text{a list of hashes of the event's parents, self-parent first.} \\
t &= time(e) &&= \text{creator's claimed date and time of the event's creation.} \\
i &= creator(e) &&= \text{creator's ID number.} \\
s &= sig(e) &&= \text{creator's digital signature of } \{d,h,t,c\}. \\
n &= &&\text{the number of members in the population} \\
c &= &&\text{frequency of coin rounds (e.g., } c = 6) \\
E &= &&\text{(the set of all events)} \cup \{\varnothing\} \\
\mathbb{T} &= &&\text{set of all possible } (time, date) \text{ pairs} \\
\mathbb{B} &= &&\{true, false\} \\
\mathbb{N} &= &&\{0, 1, 2, \ldots\}
\end{aligned}
$$

$$
\begin{aligned}
\text{parents} &: E \to 2^E \\
\text{selfParent} &: E \to E \\
\text{ancestor} &: E \times E \to \mathbb{B} \\
\text{selfAncestor} &: E \times E \to \mathbb{B} \\
\text{see} &: E \times E \to \mathbb{B} \\
\text{stronglySee} &: E \times E \to \mathbb{B} \\
\text{parentRound} &: E \to \mathbb{N} \\
\text{roundInc} &: E \to \mathbb{B} \\
\text{round} &: E \to \mathbb{N} \\
\text{witness} &: E \to \mathbb{B} \\
\text{roundDiff} &: E \times E \to \mathbb{I} \\
\text{votes} &: E \times E \times \mathbb{B} \to \mathbb{N} \\
\text{fractTrue} &: E \times E \to \mathbb{R} \\
\text{decide} &: E \times E \to \mathbb{B} \\
\text{vote} &: E \times E \to \mathbb{B} \\
\text{famous} &: E \to \mathbb{B} \\
\text{roundReceived} &: E \to \mathbb{N} \\
\text{timeReceived} &: E \to \mathbb{T}
\end{aligned}
$$

FIG. 11A $\text{parents}(x)$ = set of parents of event $x$ $\text{selfParent}(x)$ = the self-parent of event $x$, or $\emptyset$ if none $\text{ancestor}(x, y)$ = $(x \neq \emptyset) \wedge ((x = y) \vee (\exists z \in \text{parents}(x) : \text{ancestor}(z, y)))$ $\text{selfAncestor}(x, y)$ = $(x \neq \emptyset) \wedge ((x = y) \vee \text{selfAncestor}(\text{selfParent}(x), y))$ $\text{see}(x, y)$ = $\text{ancestor}(x, y) \wedge \neg(\exists a, b \in E : \text{creator}(y) = \text{creator}(a) = \text{creator}(b) \wedge \text{ancestor}(x, a) \wedge \text{ancestor}(x, b) \wedge \neg \text{selfAncestor}(a, b) \wedge \neg \text{selfAncestor}(b, a))$ $\text{stronglySee}(x, y)$ = $\text{see}(x, y) \wedge (\exists S \in 2^E : (|S| > 2n/3) \wedge (z \in S \iff (\text{see}(x, z) \wedge \text{see}(z, y))))$ $\text{parentRound}(x)$ = $\max(\{0\} \cup \{\text{round}(y) | y \in \text{parents}(x)\})$ $\text{roundInc}(x)$ = $\exists S \in 2^E : (|S| > 2n/3 \wedge$
$(\forall y \in S : (\text{round}(y) = \text{parentRound}(x) \wedge \text{stronglySee}(x, y))))$ $\text{round}(x)$ = $\text{parentRound}(x) + \begin{cases} 1 & \text{if roundInc}(x) \\ 0 & \text{otherwise} \end{cases}$ $\text{witness}(x)$ = $(\text{selfParent}(x) = \emptyset) \vee (\text{round}(x) > \text{round}(\text{selfParent}(x)))$ $\text{roundDiff}(x, y)$ = $\text{round}(x) - \text{round}(y)$ $\text{votes}(x, y, v)$ = $|\{z \in E \mid \text{roundDiff}(x, z) = 1 \wedge \text{stronglySee}(x, z) \wedge \text{vote}(z, y) = v\}|$ $\text{fractTrue}(x, y)$ = $\dfrac{\text{votes}(x, y, true)}{\text{votes}(x, y, true) + \text{votes}(x, y, false)}$ $\text{decide}(x, y)$ = $(x \neq \emptyset) \wedge (\text{roundDiff}(x, y) > 1) \wedge (\text{decide}(\text{selfParent}(x), y) \vee$
$(\text{witness}(x) \wedge (\text{roundDiff}(x, y) \mod c \neq 1) \wedge \neg(\frac{1}{3} \leq \text{fractTrue}(x, y) \leq \frac{2}{3})))$ $\text{vote}(x, y)$ = $\begin{cases} \text{vote}(\text{selfParent}(x), y) & \text{if } (\neg \text{witness}(x)) \vee \text{decide}(\text{selfParent}(x), y) \\ 1 = \text{middleBit}(\text{signature}(x)) & \text{if witness}(x) \\ & \wedge \neg \text{decide}(\text{selfParent}(x), y) \\ & \wedge (\text{roundDiff}(x, y) \neq 1) \\ & \wedge (\text{roundDiff}(x, y) \mod c = 1) \\ \text{fractTrue}(x, y) \geq \frac{1}{2} & \text{otherwise} \end{cases}$ $\text{famous}(x)$ = $\text{witness}(x) \wedge \exists y \in E : \text{decide}(y, x) \wedge \text{vote}(y, x)$ $\text{roundReceived}(x)$ = $\min_{r \in \mathbb{N}} \dfrac{|\{y \in E | \text{round}(y) = r \wedge \text{famous}(y) \wedge \text{see}(y, x)\}|}{|\{y \in E | \text{round}(y) = r \wedge \text{famous}(y)\}|} \geq 1/2$ $\text{timeReceived}(x)$ = $\text{median}(\{\text{time}(y) | y \in E \wedge \text{see}(y, x) \wedge$
$(\exists z \in E : \text{round}(z) = \text{roundReceived}(x) \wedge \text{selfAncestor}(z, y)) \wedge$
$\neg(\exists w \in E : \text{selfAncestor}(y, w) \wedge \text{see}(w, x))\})$

FIG. 11B

An event is a tuple $e = \{d, h, t, i, s\}$ where:

$d = data(e)$ = the "payload" data, which may include transactions.
$h = hashes(e)$ = a list of hashes of the event's parents, self-parent first.
$t = time(e)$ = creator's claimed date and time of the event's creation.
$i = creator(e)$ = creator's ID number.
$s = sig(e)$ = creator's digital signature of $\{d,h,t,i\}$.
$parents(x)$ = set of events that are parents of event x
$selfParent(x)$ = the self-parent of event x, or $\varnothing$ if none
$n$ = the number of members in the population
$c$ = frequency of coin rounds (such as $c = 10$)
$E$ = the set of all events in the hashgraph
$E_0$ = $E \cup \{\varnothing\}$
$\mathbb{T}$ = set of all possible (time, date) pairs
$\mathbb{B}$ = $\{true, false\}$
$\mathbb{N}$ = $\{1, 2, 3, ...\}$ $parents : E \to 2^E$
$selfParent : E \to E_0$
$ancestor : E \times E \to \mathbb{B}$
$selfAncestor : E \times E \to \mathbb{B}$
$manyCreators : 2^E \to \mathbb{B}$
$see : E \times E \to \mathbb{B}$
$stronglySee : E \times E \to \mathbb{B}$
$parentRound : E \to \mathbb{N}$
$roundInc : E \to \mathbb{B}$
$round : E \to \mathbb{N}$
$witness : E \to \mathbb{B}$
$diff : E \times E \to \mathbb{I}$
$votes : E \times E \times \mathbb{B} \to \mathbb{N}$
$fractTrue : E \times E \to \mathbb{R}$
$decide : E \times E \to \mathbb{B}$
$copyVote : E \times E \to \mathbb{B}$
$vote : E \times E \to \mathbb{B}$
$famous : E \to \mathbb{B}$
$uniqueFamous : E \to \mathbb{B}$
$roundsDecided : \mathbb{N} \to \mathbb{B}$
$roundReceived : E \to \mathbb{N}$
$timeReceived : E \to \mathbb{T}$

FIG. 12A $$\text{ancestor}(x, y) = x = y \vee \exists z \in \text{parents}(x), \text{ancestor}(z, y)$$

$$\text{selfAncestor}(x, y) = x = y \vee (\text{selfParent}(x) \neq \varnothing \wedge \text{selfAncestor}(\text{selfParent}(x), y))$$

$$\text{manyCreators}(S) = |S| > 2n/3 \wedge \forall x, y \in S, (x \neq y \implies \text{creator}(x) \neq \text{creator}(y))$$

$$\text{see}(x, y) = \text{ancestor}(x, y) \wedge \neg(\exists a, b \in E, \text{creator}(y) = \text{creator}(a) = \text{creator}(b) \wedge$$
$$\text{ancestor}(x, a) \wedge \text{ancestor}(x, b) \wedge \neg \text{selfAncestor}(a, b) \wedge \neg \text{selfAncestor}(b, a))$$

$$\text{stronglySee}(x, y) = \text{see}(x, y) \wedge (\exists S \subseteq E, \text{manyCreators}(S)$$
$$\wedge (z \in S \implies (\text{see}(x, z) \wedge \text{see}(z, y))))$$

$$\text{parentRound}(x) = \max(\{1\} \cup \{\text{round}(y) \mid y \in \text{parents}(x)\})$$

$$\text{roundInc}(x) = \exists S \subseteq E, \text{manyCreators}(S)$$
$$\wedge (\forall y \in S, \text{round}(y) = \text{parentRound}(x) \wedge \text{stronglySee}(x, y))$$

$$\text{round}(x) = \text{parentRound}(x) + \begin{cases} 1 & \text{if roundInc}(x) \\ 0 & \text{otherwise} \end{cases}$$

$$\text{witness}(x) = (\text{selfParent}(x) = \varnothing) \vee (\text{round}(x) > \text{round}(\text{selfParent}(x)))$$

$$\text{diff}(x, y) = \text{round}(x) - \text{round}(y)$$

$$\text{votes}(x, y, v) = |\{z \in E \mid \text{diff}(x, z) = 1 \wedge \text{witness}(z) \wedge \text{stronglySee}(x, z) \wedge \text{vote}(z, y) = v\}|$$

$$\text{fractTrue}(x, y) = \frac{\text{votes}(x, y, \text{true})}{\text{votes}(x, y, \text{true}) + \text{votes}(x, y, \text{false})}$$

$$\text{decide}(x, y) = (\text{selfParent}(x) \neq \varnothing \wedge \text{decide}(\text{selfParent}(x), y)) \vee (\wedge \text{witness}(x) \wedge \text{witness}(y)$$
$$\wedge \text{diff}(x, y) > 1 \wedge (\text{diff}(x, y) \bmod c > 0) \wedge (\exists v \in B, \text{votes}(x, y, v) > \tfrac{2n}{3})))$$

$$\text{copyVote}(x, y) = (\neg \text{witness}(x)) \vee (\text{selfParent}(x) \neq \varnothing \wedge \text{decide}(\text{selfParent}(x), y))$$

$$\text{vote}(x, y) = \begin{cases} \text{vote}(\text{selfParent}(x), y) & \text{if copyVote}(x) \\ 1 = \text{middleBit}(\text{signature}(x)) & \text{if } \neg \text{copyVote}(x) \\ & \wedge (\text{diff}(x, y) \bmod c = 0) \\ & \wedge (\tfrac{1}{3} \leq \text{fractTrue}(x, y) \leq \tfrac{2}{3}) \\ \text{fractTrue}(x, y) \geq \tfrac{1}{2} & \text{otherwise} \end{cases}$$

$$\text{famous}(x) = \exists y \in E, \text{decide}(y, x) \wedge \text{vote}(y, x)$$

$$\text{uniqueFamous}(x) = \text{famous}(x) \wedge \neg \exists y \in E, y \neq x \wedge \text{famous}(y)$$
$$\wedge \text{round}(x) = \text{round}(y) \wedge \text{creator}(x) = \text{creator}(y)$$

$$\text{roundsDecided}(r) = \forall x \in E, ((\text{round}(x) \leq r \wedge \text{witness}(x)) \implies \exists y \in E, \text{decide}(y, x))$$

$$\text{roundReceived}(x) = \min(\{r \in \mathbb{N} \mid \text{roundsDecided}(r) \wedge (\forall y \in E,$$
$$(\text{round}(y) = r \wedge \text{uniqueFamous}(y)) \implies \text{ancestor}(y, x))\})$$

$$\text{timeReceived}(x) = \text{median}(\{\text{time}(y) \mid y \in E \wedge \text{ancestor}(y, x) \wedge$$
$$(\exists z \in E, \text{round}(z) = \text{roundReceived}(x) \wedge \text{uniqueFamous}(z)$$
$$\wedge \text{selfAncestor}(z, y)) \wedge \neg(\exists w \in E, \text{selfAncestor}(y, w) \wedge \text{ancestor}(w, x))\})$$

FIG. 12B

An event is a tuple $x = \{p, h, t, i, s\}$ where:
- $p$ = payload$(x)$ = the "payload" data, such as a list of transactions
- $h$ = hashes$(x)$ = a list of hashes of the event's parents, self-parent first
- $t$ = time$(x)$ = creator's claimed date and time of the event's creation
- $i$ = creator$(x)$ = creator's ID number
- $s$ = signature$(x)$ = creator's digital signature of $\{p, h, t, i\}$

- selfParent$(x)$ = the self-parent of event $x$, or $\varnothing$ if none
- otherParent$(x)$ = the other-parent of event $x$, or $\varnothing$ if none
- parents$(x)$ = the set of events that are parents (self or other) of event $x$
- stake$(m)$ = The amount of stake that member $m$ has, or 0 if $m = \varnothing$
- $c$ = frequency of coin rounds (such as $c = 10$)
- $T$ = set of all possible (time, date) pairs
- $E$ = the set of all events in the hashgraph
- $E_\varnothing$ = $E \cup \{\varnothing\}$
- $M$ = the set of all members (participating computers)
- TotalStake = total stake of the population (where member $m$ has stake$(m)$)
- $\mathbb{N}$ = $\{0, 1, 2, 3, ...\}$
- $\mathbb{Z}$ = $\{..., -2, -1, 0, 1, 2, ...\}$
- $\mathbb{B}$ = $\{\text{true}, \text{false}\}$ The function weightedMedian$(S)$ returns the *weighted median* of a set $S$ of $(x_i, s_i)$ pairs. It is defined as the middle of a sorted list of $x$ values, where each $x_i$ is repeated $s_i$ times. If there are two middle values, it is the minimum of them.

Two such lists are compared by *extended weighted median* by comparing elements in position $\{0, 1, -1, 2, -2, 3, -3, ...\}$ until an unequal element is found, where position 0 is the middle element.

FIG. 13A

| | | |
|---:|:---:|:---|
| gen(x) | = | The generation of event x. |
| ancestor(x, y) | = | can x reach y by following 0 or more parent edges? |
| selfAncestor(x, y) | = | can x reach y by following 0 or more selfParent edges? |
| supermajority(x) | = | is number x is more than 2/3 of the total stake? |
| parentRound(x) | = | the maximum created round of all parents of x (or 1 if there are none) |
| lastSee(x, m) | = | The most recent event created by member m that is an ancestor of x. |
| seeThru(x, m, m') | = | The latest witness that event x can see that is created by m, and is seen through an event created by m'. |
| stronglySeeP(x, m) | = | The witness created by m in round parentRound(x) that x can strongly see. |
| round(x) | = | The created round for event x. |
| firstSelfWitnessS(x) | = | The first witness that is a self ancestor of x in the same round as x. |
| firstWitnessS(x) | = | The first witness that is an ancestor of x in the same round as x. |
| stronglySeeS1(x, m) | = | The witness created by m in round round(x) − 1 that x can strongly see. |
| firstSee(x, m) | = | The most recent witness created by member m that is an ancestor of x. |
| witness(x) | = | true if x has a greater created round than its selfParent |
| diff(x, y) | = | round(x) − round(y) |
| votes(x, y, v) | = | the total stake of creators of votes equal to v about the fame of witness y collected by witness x from witnesses in the previous round |
| decide(x, y) | = | true iff x (or its self ancestor) "decided" for the election for witness y (and therefore that member will never change its vote about y again) |
| copyVote(x, y) | = | true iff x should simply copy its selfParent's vote about the fame of witness y (or x is not a witness, or has already decided earlier) |
| witnessR(x, r) | = | the witness in round r that is a self-ancestor of the witness x. |
| firstVote(x, y) | = | the first vote by x in the voting for the fame of y. It is true iff y is a self-ancestor of an event x can lastSee. |
| coin(x) | = | a pseudorandom boolean as a function of x. An attacker must not be able to guess it before knowing x. There must exist an ε such that the probabilities of true and of false are both greater than ε. In the implementation shown here, this is derived from the signature of x. |
| vote(x, y) | = | the vote by witness x about the fame of witness y (true for famous, false for not) |
| famous(x) | = | true iff x is famous (i.e., had its fame decided by someone, and their vote was true) |
| roundsDecided(r) | = | true iff all known witnesses had their fame decided, for both round r and all earlier rounds |
| received(x, r) | = | the set of events that are each a descendant of x and an ancestor of at least one famous witness in round r. If there are multiple by the same creator, then only the one with the earliest creation time is retained (with ties broken by least signature, lexicographically). |
| roundReceived(x) | = | the round received for event x |
| timeReceived(x) | = | the consensus timestamp for event x |
| before(x, y) | = | true iff event x is before event y in the consensus order. |

FIG. 13B $$\begin{aligned}
\text{IF} &: \mathbb{B} \times \mathbb{N} \times \mathbb{N} \to \mathbb{N} \\
\text{selfParent} &: E \to E_\emptyset \\
\text{otherParent} &: E \to E_\emptyset \\
\text{parents} &: E \to 2^E \\
\text{stake} &: M \to \mathbb{N} \\
\text{gen} &: E_\emptyset \to \mathbb{N} \\
\text{ancestor} &: E \times E \to \mathbb{B} \\
\text{selfAncestor} &: E \times E \to \mathbb{B} \\
\text{supermajority} &: \mathbb{N} \to \mathbb{B} \\
\text{parentRound} &: E_\emptyset \to \mathbb{N} \\
\text{lastSee} &: E_\emptyset \times M \to E_\emptyset \\
\text{seeThru} &: E_\emptyset \times M \to E_\emptyset \\
\text{stronglySeeP} &: E_\emptyset \times M \times M \to E_\emptyset \\
\text{round} &: E_\emptyset \to \mathbb{N} \\
\text{firstSelfWitnessS} &: E_\emptyset \to E_\emptyset \\
\text{firstWitnessS} &: E_\emptyset \to E_\emptyset \\
\text{stronglySeeS1} &: E_\emptyset \times M \times M \to E_\emptyset \\
\text{firstSee} &: E_\emptyset \times M \to E_\emptyset \\
\text{witness} &: E \to \mathbb{B} \\
\text{diff} &: E \times E \to \mathbb{I} \\
\text{votes} &: E \times E \times \mathbb{B} \to \mathbb{N} \\
\text{decide} &: E \times E \to \mathbb{B} \\
\text{copyVote} &: E \times E \to \mathbb{B} \\
\text{witnessR} &: E \times \mathbb{N} \to E \\
\text{firstVote} &: E \times E \to \mathbb{B} \\
\text{coin} &: E \to \mathbb{B} \\
\text{vote} &: E \times E \to \mathbb{B} \\
\text{famous} &: E \to \mathbb{B} \\
\text{roundsDecided} &: \mathbb{N} \to \mathbb{B} \\
\text{received} &: E \times \mathbb{N} \to 2^E \\
\text{roundReceived} &: E \to \mathbb{N} \\
\text{timeReceived} &: E \to \mathbb{T} \\
\text{before} &: E \times E \to \mathbb{B}
\end{aligned}$$

$$\text{IF}(p, x, y) = \begin{cases} x & \text{if } p \\ y & \text{otherwise} \end{cases}$$

$$\text{gen}(x) = \begin{cases} 0 & \text{if } x = \emptyset \\ 1 & \text{if parents}(x) = \{\} \\ 1 + \max(\{\text{gen}(y) | y \in \text{parents}(x)\}) & \text{otherwise} \end{cases}$$

$$\text{ancestor}(x, y) = x = y \vee \exists z \in \text{parents}(x), \text{ancestor}(z, y)$$

$$\text{selfAncestor}(x, y) = x = y \vee (\text{selfParent}(x) \neq \emptyset \wedge \text{selfAncestor}(\text{selfParent}(x), y))$$

$$\text{supermajority}(x) = (x > (2/3)\text{TotalStake})$$

FIG. 13C $$parentRound(x) = \max(round(selfParent(x)), round(otherParent(x)))$$

$$lastSee(x, m) = \begin{cases} x & \text{if } m = creator(x) \\ \varnothing & \text{if } x = \varnothing \lor parents(x) = \{\} \\ lastSee(otherParent(x), m) & \text{if } (round(lastSee(otherParent(x), m)) \\ & > round(lastSee(selfParent(x), m))) \\ & \lor ((gen(lastSee(otherParent(x), m)) \\ & > gen(lastSee(selfParent(x), m))) \\ & \land (firstSee(otherParent(x), m)) \\ & = firstSee(selfParent(x), m)))) \\ lastSee(selfParent(x), m) & \text{otherwise} \end{cases}$$

$$seeThru(x, m, m') = \begin{cases} firstSelfWitnessS(selfParent(x)) & \text{if } m = m' = creator(x) \\ firstSee(lastSee(x, m'), m) & \text{otherwise} \end{cases}$$

$$stronglySeeP(x, m) = \begin{cases} \varnothing & \text{if } x = \varnothing \\ stronglySeeP(selfParent(x), m) & \text{if } \varnothing \neq stronglySeeP(selfParent(x), m) \\ & \land parentRound(x) \\ & = parentRound(selfParent(x)) \\ stronglySeeP(otherParent(x), m) & \text{if } \varnothing \neq stronglySeeP(otherParent(x), m) \\ & \land parentRound(x) \\ & = parentRound(otherParent(x)) \\ \varnothing & \text{if } round(seeThru(x, m, m)) \\ & \neq parentRound(x) \\ seeThru(x, m, m) & supermajority(\sum_{m' \in M}( \\ & IF(seeThru(x, m, m') \\ & = seeThru(x, m, m), \\ & stake(m'), 0)) \\ \varnothing & \text{otherwise} \end{cases}$$

$$round(x) = \begin{cases} 0 & \text{if } x = \varnothing \\ 1 & \text{if } parents(x) = \{\} \\ round(selfParent(x)) & \text{if } round(selfParent(x)) \\ & > round(otherParent(x)) \\ round(otherParent(x)) & \text{if } round(otherParent(x)) \\ & > round(selfParent(x)) \\ parentRound(x) + 1 & \text{if } supermajority(\sum_{m' \in M}(stake( \\ & creator(stronglySeeP(x, m'))))) \\ parentRound(x) & \text{otherwise} \end{cases}$$

$$firstSelfWitnessS(x) = \begin{cases} \varnothing & \text{if } x = \varnothing \\ x & \text{if } round(x) > round(selfParent(x)) \\ firstSelfWitnessS(selfParent(x)) & \text{otherwise} \end{cases}$$

$$firstWitnessS(x) = \begin{cases} \varnothing & \text{if } x = \varnothing \\ x & \text{if } round(x) > parentRound(x) \\ firstWitnessS(selfParent(x)) & \text{if } round(x) = round(selfParent(x)) \\ firstWitnessS(otherParent(x)) & \text{otherwise} \end{cases}$$

$$stronglySeeS1(x, m) = stronglySeeP(firstWitnessS(x), m)$$
$$firstSee(x, m) = firstSelfWitnessS(lastSee(x, m))$$

FIG. 13D $$\text{witness}(x) = (\text{selfParent}(x) = \varnothing) \lor (\text{round}(x) > \text{round}(\text{selfParent}(x)))$$

$$\text{diff}(x, y) = \text{round}(x) - \text{round}(y)$$

$$\text{votes}(x, y, v) = \sum \{\text{stake}(m) \mid m \in M \land v = \text{vote}(\text{stronglySeeS1}(x, m), y)\}$$

$$\text{decide}(x, y) = (\text{selfParent}(x) \neq \varnothing \land \text{decide}(\text{selfParent}(x), y)) \\ \lor (\text{witness}(x) \land \text{witness}(y) \land \text{diff}(x, y) > d \land (\text{diff}(x, y) \bmod c > 0) \\ \land (\text{supermajority}(\text{votes}(x, y, true)) \lor \text{supermajority}(\text{votes}(x, y, false))))$$

$$\text{copyVote}(x, y) = (\neg \text{witness}(x)) \lor (\text{selfParent}(x) \neq \varnothing \land \text{decide}(\text{selfParent}(x), y))$$

$$\text{witnessR}(x, r) = \begin{cases} \varnothing & \text{if round}(x) < r \\ x & \text{if round}(x) = r \\ \text{witnessR}(\text{firstSelfWitnessS}(\text{selfParent}(x)), r) & \text{otherwise} \end{cases}$$

$$\text{firstVote}(x, y) = (y = \text{witnessR}(\text{firstSee}(x, \text{creator}(y)), \text{round}(y)))$$

$$\text{coin}(x) = (1 = \text{middleBit}(\text{signature}(x)))$$

$$\text{vote}(x, y) = \begin{cases} \text{vote}(\text{selfParent}(x), y) & \text{if copyVote}(x, y) \\ \text{firstVote}(x, y) & \text{if diff}(x, y) = 1 \\ \text{coin}(x) & \text{if } (\text{diff}(x, y) \bmod c = 0) \\ & \land \neg \text{supermajority}(\text{votes}(x, y, true)) \\ & \land \neg \text{supermajority}(\text{votes}(x, y, false)) \\ \text{votes}(x, y, true) \geq \text{votes}(x, y, false) & \text{otherwise} \end{cases}$$

$$\text{famous}(x) = \exists y \in E, \text{decide}(y, x) \land \text{vote}(y, x)$$

$$\text{roundsDecided}(r) = \forall x \in E, ((\text{round}(x) \leq r \land \text{witness}(x)) \implies \exists y \in E, \text{decide}(y, x))$$

$$\text{received}(x, r) = \{y \in E \mid \exists z \in E, \text{round}(z) = r \land \text{famous}(z) \land \text{ancestor}(z, y) \land \text{ancestor}(y, x) \\ \land \neg \exists y' \in E, (\text{creator}(y') = \text{creator}(y) \land \text{ancestor}(z, y') \land \text{ancestor}(y', x) \land \\ (\text{time}(y') < \text{time}(y) \lor (\text{time}(y') = \text{time}(y) \land \text{signature}(y') < \text{signature}(y))))\}$$

$$\text{roundReceived}(x) = \min(\{r \in \mathbb{N} \mid \text{supermajority}(\sum \{\text{stake}(\text{creator}(e)) \mid e \in \text{received}(x, r)\})\})$$

$$\text{timeReceived}(x) = \text{weightedMedian}(\{(\text{time}(y), \text{stake}(\text{creator}(y))) \mid y \in \text{received}(x, r)\})$$

$$\text{before}(x, y) = \begin{cases} \text{roundReceived}(x) < \text{roundReceived}(y) & \text{if roundReceived}(x) \\ & \neq \text{roundReceived}(y) \\ \text{timeReceived}(x) < \text{timeReceived}(y) & \text{if timeReceived}(x) \\ & \neq \text{timeReceived}(y) \\ f(x) < f(y) & \text{otherwise} \end{cases}$$

The consensus order is determined by sorting by before($x, y$), where $f$ is any total order, such as sorting by the extended weighted median of the received times, then breaking ties by generation, then breaking ties by whitened signature (signature XORed with all signatures of famous witnesses in the received round).

FIG. 13E

Address Book 1400

| Compute Device | Public Key | Stake |
|---|---|---|
| 110 | A | 100 |
| 120 | B | 50 |
| 130 | C | 30 |
| 140 | D | 75 |

```
┌─────────────────────────────────────────┐
│ Connecting, via a network, to a set of  │
│ compute devices implementing a          │
│ distributed database and as a node      │
│ implementing the distributed database.  │
│                  1602                   │
└─────────────────────────────────────────┘
                     │
                     ▼
┌─────────────────────────────────────────┐
│ Receiving, from a compute device from   │
│ the set of compute devices, a state of  │
│ the distributed database associated     │
│ with a completed round of a consensus   │
│ protocol.                               │
│                  1604                   │
└─────────────────────────────────────────┘
                     │
                     ▼
┌─────────────────────────────────────────┐
│ Receiving, from the set of compute      │
│ devices, a set of events associated     │
│ with the state.                         │
│                  1606                   │
└─────────────────────────────────────────┘
                     │
                     ▼
┌─────────────────────────────────────────┐
│ Calculating a set of attributes for     │
│ each event from the set of events based │
│ on a core set of events and a round     │
│ identifier for each event from the core │
│ set of events.                          │
│                  1608                   │
└─────────────────────────────────────────┘
                     │
                     ▼
┌─────────────────────────────────────────┐
│ Constructing a directed acyclic graph   │
│ (DAG) based on the set of events and    │
│ the set of attributes for the set of    │
│ events.                                 │
│                  1610                   │
└─────────────────────────────────────────┘
                     │
                     ▼
┌─────────────────────────────────────────┐
│ Calculating, using the DAG, an order of │
│ events associated with a next round of  │
│ the consensus protocol.                 │
│                  1612                   │
└─────────────────────────────────────────┘
```

FIG. 16

METHODS AND APPARATUS FOR A DISTRIBUTED DATABASE WITHIN A NETWORK

CROSS-REFERENCE TO RELATED APPLICATIONS

This application is a continuation of U.S. patent application Ser. No. 17/493,934, filed Oct. 5, 2021 and titled "Methods and Apparatus for a Distributed Database within a Network," which claims priority to and the benefit of U.S. Provisional Application No. 63/088,298, filed Oct. 6, 2020 and titled "Methods and Apparatus for a Distributed Database within a Network," which is incorporated herein by reference in its entirety.

BACKGROUND

Embodiments described herein relate generally to a database system and more particularly to methods and apparatus for implementing a database system across multiple devices in a network.

Some known distributed database systems attempt to achieve consensus for values within the distributed database system (e.g., regarding the order in which transactions occur). For example, an online multiplayer game might have many computer servers that users can access to play the game. If two users attempt to pick up a specific item in the game at the same time, then it is important that the servers within the distributed database system eventually reach agreement on which of the two users picked up the item first.

Such distributed consensus can be handled by methods and/or processes such as the Paxos algorithm or its variants. Under such methods and/or processes, one server of the database system is set up as the "leader," and the leader decides the order of events. Events (e.g., within multiplayer games) are forwarded to the leader, the leader chooses an ordering for the events, and the leader broadcasts that ordering to the other servers of the database system.

Such known approaches, however, use a server operated by a party (e.g., central management server) trusted by users of the database system (e.g., game players). Accordingly, a need exists for methods and apparatus for a distributed database system that does not require a leader or a trusted third party to operate the database system.

SUMMARY

In some embodiments, a method includes defining an address book for a distributed database. The address book includes an identifier for each compute device from a set of compute devices that implements the distributed database via a network. The method further includes receiving, from a compute device from the set of compute devices, an event including a transaction to update the address book and calculating, based on a consensus protocol of the distributed database that uses the address book, a received round for the event. The method further includes updating the address book based on the transaction to define an updated address book a predetermined number of rounds after at least one of the received round for the event or a previous update to the address book.

BRIEF DESCRIPTION OF THE DRAWINGS

FIGS. 10A-10B illustrate an example consensus method for use with a hashgraph, according to an embodiment.

FIGS. 11A-11B illustrate an example consensus method for use with a hashgraph, according to another embodiment.

FIGS. 12A-12B illustrate an example consensus method for use with a hashgraph, according to another embodiment.

FIGS. 13A-13E illustrate an example consensus method for use with a hashgraph, according to another embodiment.

FIG. 14 illustrates an address book associated with a distributed database system, according to an embodiment.

FIG. 16 is a flowchart illustrating a method of a compute device connecting to and/or joining a distributed database, according to an embodiment.

DETAILED DESCRIPTION

Figure 1:
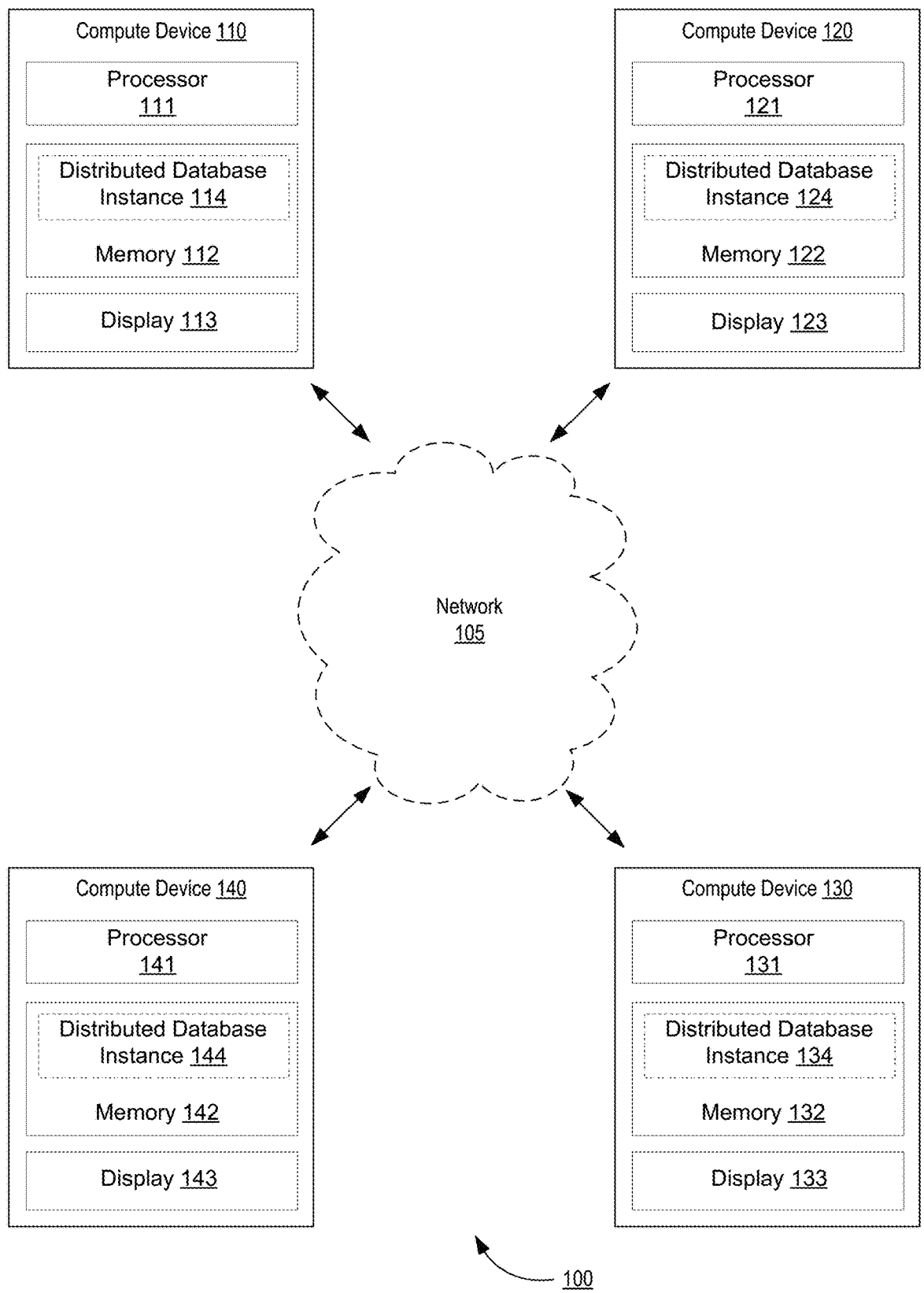
FIG. 1 is a high level block diagram that illustrates a distributed database system, according to an embodiment.

In some embodiments, a method includes defining an address book for a distributed database. The address book includes an identifier for each compute device from a set of compute devices that implements the distributed database via a network. The method further includes receiving, from a compute device from the set of compute devices, an event including a transaction to update the address book and calculating, based on a consensus protocol of the distributed database that uses the address book, a received round for the event. The method further includes updating the address book based on the transaction to define an updated address book a predetermined number of rounds after at least one of the received round for the event or a previous update to the address book.

In some embodiments, an apparatus includes a memory of a compute device associated with a distributed database implemented by a set of compute devices via a network operatively coupled to the set of compute devices, and a processor operatively coupled to the memory. The processor is configured to define an address book for the distributed database. The address book includes an identifier for each compute device from the set of compute devices that implements the distributed database. The processor is configured to receive, from a compute device from the set of compute devices, an event including a transaction to update the address book and to calculate an attribute (e.g., around number or around created) for each event from a group of events. The event is included in the group of events. The processor is configured to calculate, based on a consensus protocol of the distributed database that uses the address book, a received round of the event. The received round can be based on a threshold number of events from a set of events being descendants of the event. The processor is further configured to update the address book based on the transaction to define an updated address book a predetermined number of rounds after at least one of the received round for the event or a previous update to the address book.

The processor is configured to recalculate, using the updated address book, the attribute for each event from the group of events when that event does not have a descendent event from the set of events.

In some embodiments, a non-transitory processor-readable medium stores code representing instructions to be executed by a processor. The code includes code to cause the processor to connect, via a network, to a set of compute devices implementing a distributed database and as a node implementing the distributed database. The code further includes code to cause the processor to receive, from a compute device from the set of compute devices, a state of the distributed database associated with a completed round of a consensus protocol. The state including an indication of a core set of events associated with the completed round along with a round identifier for each event from the core set of events. The code further includes code to cause the processor to receive, from the set of compute devices, a set of events associated with the state and calculate a set of attributes for each event from the set of events based on the core set of events and the round identifier for each event from the core set of events. The code includes code to cause the processor to construct a directed acyclic graph (DAG) based on the set of events and the set of attributes for the events and calculate, using the DAG, an order of events associated with a next round of the consensus protocol.

In some embodiments, an apparatus includes an instance of a distributed database at a first compute device configured to be included within a set of compute devices that implements the distributed database via a network operatively coupled to the set of compute devices. The apparatus also includes a processor operatively coupled to the memory storing the instance of the distributed database. The processor is configured to define, at a first time, a first event linked to a first set of events. The processor is configured to receive, at a second time after the first time and from a second compute device from the set of compute devices, a signal representing a second event (1) defined by the second compute device and (2) linked to a second set of events. The processor is configured to identify an order associated with a third set of events based at least on a result of a protocol. Each event from the third set of events being from at least one of the first set of events or the second set of events. The processor is configured to store in the instance of the distributed database the order associated with the third set of events.

In some instances, each event from the third set of events is associated with a set of attributes (e.g., sequence number, generation number, round number, received round number, and/or timestamp, etc.). The result of the protocol can include a value for each attribute from the set of attributes for each event from the third set of events. The value for a first attribute from the set of attributes can include a first numeric value and the value for a second attribute from the set of attributes can include a binary value associated with the first numeric value. The binary value for the second attribute (e.g., a round increment value) for an event from the third set of events can be based on whether a relationship between that event and a fourth set of events linked to that event satisfies a criterion (e.g., a number of events strongly identified by that event). Each event from the fourth set of events is (1) an ancestor of the event from the third set of events and (2) associated with a first common attribute as the remaining events from the fourth set of events (e.g., a common round number, an indication of being a round R first event, etc.). The first common attribute can be indicative of a first/initial instance that an event defined by each compute device from the set of compute devices is associated with a first particular value (e.g., an indication of being a round R first event, etc.).

The value for a third attribute (e.g., a received round number) from the set of attributes can include a second numeric value based on a relationship between the event and a fifth set of events linked to the event. Each event from the fifth set of events is a descendant of the event and associated with a second common attribute (e.g., is famous) as the remaining events from the fifth set of events. The second common attribute can be associated with (1) a third common attribute (e.g., being a round R first event or a witness) indicative of a first instance a second event defined by each compute device from the set of compute devices is associated with a second particular value different from the first particular value and (2) a result based on a set of indications. Each indication from the set of indications can be associated with an event from a sixth set of events. Each event from the sixth set of events can be associated with a fourth common attribute indicative of a first/initial instance a third event defined by each compute device from the set of compute devices is associated with a third particular value different from the first particular value and the second particular value. In some instances, the first particular value is a first integer (e.g., a first round number R), the second particular value is a second integer (e.g., a second round number, R+n) greater than the first integer and the third particular value is a third integer (e.g., a third round number, R+n+m) greater than the second integer.

As used herein, a module can be, for example, any assembly and/or set of operatively-coupled electrical components associated with performing a specific function, and can include, for example, a memory, a processor, electrical traces, optical connectors, software (executing in hardware) and/or the like.

As used in this specification, the singular forms "a," "an" and "the" include plural referents unless the context clearly dictates otherwise. Thus, for example, the term "module" is intended to mean a single module or a combination of modules. For instance, a "network" is intended to mean a single network or a combination of networks.

FIG. 1 is a high level block diagram that illustrates a distributed database system 100, according to an embodiment. FIG. 1 illustrates a distributed database 100 implemented across four compute devices (compute device 110, compute device 120, compute device 130, and compute device 140), but it should be understood that the distributed database 100 can use a set of any number of compute devices, including compute devices not shown in FIG. 1. The network 105 can be any type of network (e.g., a local area network (LAN), a wide area network (WAN), a virtual network, a telecommunications network) implemented as a wired network and/or wireless network and used to operatively couple compute devices 110, 120, 130, 140. As described in further detail herein, in some embodiments, for example, the compute devices are personal computers connected to each other via an Internet Service Provider (ISP) and the Internet (e.g., network 105). In some embodiments, a connection can be defined, via network 105, between any two compute devices 110, 120, 130, 140. As shown in FIG. 1, for example, a connection can be defined between compute device 110 and any one of compute device 120, compute device 130, or compute device 140.

In some embodiments, the compute devices 110, 120, 130, 140 can communicate with each other (e.g., send data to and/or receive data from) and with the network via intermediate networks and/or alternate networks (not shown in FIG. 1). Such intermediate networks and/or alternate networks can be of a same type and/or a different type of network as network 105.

Each compute device 110, 120, 130, 140 can be any type of device configured to send data over the network 105 to send data to and/or receive data from one or more of the other compute devices. Examples of compute devices are shown in FIG. 1. Compute device 110 includes a memory 112, a processor 111, and an output device 113. The memory 112 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the memory 112 of the compute device 110 includes data associated with an instance of a distributed database (e.g., distributed database instance 114). In some embodiments, the memory 112 stores instructions to cause the processor to execute modules, processes and/or functions associated with sending to and/or receiving from another instance of a distributed database (e.g., distributed database instance 124 at compute device 120) a record of a synchronization event, and/or a record of prior synchronization events with other compute devices, and/or an order of synchronization events, and/or an order of transactions within events, parameters associated with identifying an order of synchronization events and/or transactions, and/or a value for a parameter (e.g., a database field quantifying a transaction, a database field quantifying an order in which events occur, and/or any other suitable field for which a value can be stored in a database).

Distributed database instance 114 can, for example, be configured to manipulate data, including storing, modifying, and/or deleting data. In some embodiments, distributed database instance 114 can be a set of arrays, set of data structures, relational database, object database, post-relational database, and/or any other suitable type of database or storage. For example, the distributed database instance 114 can store data related to any specific function and/or industry. For example, the distributed database instance 114 can store financial transactions (of the user of the compute device 110, for example), including a value and/or a vector of values related to the history of ownership of a particular financial instrument. In general, a vector can be any set of values for a parameter, and a parameter can be any data object and/or database field capable of taking on different values. Thus, a distributed database instance 114 can have a number of parameters and/or fields, each of which is associated with a vector of values. The vector of values is used to determine the actual value for the parameter and/or field within that database instance 114. In some instances, the distributed database instance 114 stores a record of a synchronization event, a record of prior synchronization events with other compute devices, an order of synchronization events, an order of transactions within events, parameters and/or values associated with identifying an order of synchronization events and/or transactions (e.g., used in calculating an order using a consensus method as described herein), a value for a parameter (e.g., a database field quantifying a transaction, a database field quantifying an order in which events occur, and/or any other suitable field for which a value can be stored in a database).

In some instances, the distributed database instance 114 can also store a database state variable and/or a current state. The current state can be a state, balance, condition, and/or the like associated with a result of the transactions. Similarly stated, the state can include the data structure and/or variables modified by the transactions. In other instances, the current state can be stored in a separate database and/or portion of memory 112. In still other instances, the current state can be stored at a memory of a compute device different from compute device 110.

In some instances, the distributed database instance 114 can also be used to implement other data structures, such as a set of (key, value) pairs. A transaction recorded by the distributed database instance 114 can be, for example, adding, deleting, or modifying a (key, value) pair in a set of (key, value) pairs.

In some instances, the distributed database system 100 or any of the distributed database instances 114, 124, 134, 144 can be queried. For example, a query can include a key, and the returned result from the distributed database system 100 or distributed database instances 114, 124, 134, 144 can be a value associated with the key. In some instances, the distributed database system 100 or any of the distributed database instances 114, 124, 134, 144 can also be modified through a transaction. For example, a transaction to modify the database can contain a digital signature by the party authorizing the modification transaction.

The distributed database system 100 can be used for many purposes, such as, for example, storing attributes associated with various users in a distributed identity system. For example, such a system can use a user's identity and/or identifier as the "key," and the list of attributes associated with the users as the "value." In some instances, the identity and/or identifier can be a cryptographic public key with a corresponding private key known to that user. Each attribute can, for example, be digitally signed by an authority having the right to assert that attribute. Each attribute can also, for example, be encrypted with the public key associated with an individual or group of individuals that have the right to read the attribute. Some keys or values can also have attached to them a list of public keys of parties that are authorized to modify and/or delete the keys or values.

In another example, the distributed database instance 114 can store data related to Massively Multiplayer Games (MMGs), such as the current status and ownership of gameplay items. In some instances, distributed database instance 114 can be implemented within the compute device 110, as shown in FIG. 1. In other instances, the instance of the distributed database is accessible by the compute device (e.g., via a network), but is not implemented in the compute device (not shown in FIG. 1).

The processor 111 of the compute device 110 can be any suitable processing device configured to run and/or execute distributed database instance 114. For example, the processor 111 can be configured to update distributed database instance 114 in response to receiving a signal from compute device 120, and/or cause a signal to be sent to compute device 120, as described in further detail herein. More specifically, as described in further detail herein, the processor 111 can be configured to execute modules, functions and/or processes to update the distributed database instance 114 in response to receiving a synchronization event associated with a transaction from another compute device, a record associated with an order of synchronization events, and/or the like. In some embodiments, the processor 111 can be configured to execute modules, functions and/or processes to update the distributed database instance 114 in response to receiving a value for a parameter stored in another instance of the distributed database (e.g., distributed database instance 124 at compute device 120), and/or cause a value for a parameter stored in the distributed database instance 114 at compute device 110 to be sent to compute device 120. In some embodiments, the processor 111 can be a general purpose processor, a Field Programmable Gate Array (FPGA), an Application Specific Integrated Circuit (ASIC), a Digital Signal Processor (DSP), and/or the like.

The display 113 can be any suitable display, such as, for example, a liquid crystal display (LCD), a cathode ray tube display (CRT) or the like. In other embodiments, any of compute devices 110, 120, 130, 140 includes another output device instead of or in addition to the displays 113, 123, 133, 143. For example, any one of the compute devices 110, 120, 130, 140 can include an audio output device (e.g., a speaker), a tactile output device, and/or the like. In still other embodiments, any of compute devices 110, 120, 130, 140 includes an input device instead of or in addition to the displays 113, 123, 133, 143. For example, any one of the compute devices 110, 120, 130, 140 can include a keyboard, a mouse, and/or the like.

While shown in FIG. 1 as being within a single compute device, in some instances the processor configured to execute modules, functions and/or processes to update the distributed database can be within a compute device separate from its associated distributed database. In such an instance, for example, a processor can be operatively coupled to a distributed database instance via a network. For example, the processor can execute a consensus method to identify an order of events and/or transactions (e.g., as a result of synchronization with the other distributed database instances) and can send a signal including the order of events and/or transactions to the associated distributed database instance over the network. The associated distributed database instance can then store the order of events, the order of the transactions and/or a state variable based on the order of transactions in the associated distributed database instance. As such, the functions and storage associated with the distribute database can be distributed. Moreover, the processor can query its associated distributed database instance, store database state variables and/or current states, and other suitable operations described herein in its distributed database instance even when the database is implemented in a compute device separate from compute device having a processor implementing the modules, functions and/or processes (e.g., consensus method) associated with the distributed database system. In other instances, the functions and/or methods described herein can be executed across any number of compute devices (e.g., within a distributed computing environment and/or cluster) and the results and/or values of such functions and/or methods can be stored at a memory and/or storage at any suitable compute device.

The compute device 120 has a processor 121, a memory 122, and a display 123, which can be structurally and/or functionally similar to the processor 111, the memory 112, and the display 113, respectively. Also, distributed database instance 124 can be structurally and/or functionally similar to distributed database instance 114.

The compute device 130 has a processor 131, a memory 132, and a display 133, which can be structurally and/or functionally similar to the processor 111, the memory 112, and the display 113, respectively. Also, distributed database instance 134 can be structurally and/or functionally similar to distributed database instance 114.

The compute device 140 has a processor 141, a memory 142, and a display 143, which can be structurally and/or functionally similar to the processor 111, the memory 112, and the display 113, respectively. Also, distributed database instance 144 can be structurally and/or functionally similar to distributed database instance 114.

Even though compute devices 110, 120, 130, 140 are shown as being similar to each other, each compute device of the distributed database system 100 can be different from the other compute devices. Each compute device 110, 120, 130, 140 of the distributed database system 100 can be any one of, for example, a computing entity (e.g., a personal computing device such as a desktop computer, a laptop computer, etc.), a mobile phone, a personal digital assistant (PDA), and so forth. For example, compute device 110 can be a desktop computer, compute device 120 can be a smartphone, and compute device 130 can be a server.

In some embodiments, one or more portions of the compute devices 110, 120, 130, 140 can include a hardware-based module (e.g., a digital signal processor (DSP), a field programmable gate array (FPGA)) and/or a software-based module (e.g., a module of computer code stored in memory and/or executed at a processor). In some embodiments, one or more of the functions associated with the compute devices 110, 120, 130, 140 (e.g., the functions associated with the processors 111, 121, 131, 141) can be included in one or more modules (see, e.g., FIG. 2).

The properties of the distributed database system 100, including the properties of the compute devices (e.g., the compute devices 110, 120, 130, 140), the number of compute devices, and the network 105, can be selected in any number of ways. In some instances, the properties of the distributed database system 100 can be selected by an administrator of distributed database system 100. In other instances, the properties of the distributed database system 100 can be collectively selected by the users of the distributed database system 100.

Because a distributed database system 100 is used, no leader is appointed among the compute devices 110, 120, 130, and 140. Specifically, none of the compute devices 110, 120, 130, or 140 are identified and/or selected as a leader to settle disputes between values stored in the distributed database instances 114, 124, 134, 144 of the compute devices 110, 120, 130, 140. Instead, using the event synchronization processes, the voting processes, the consensus method and/or protocol and/or other methods described herein, the compute devices 110, 120, 130, 140 can collectively converge on a value for a parameter.

Not having a leader in a distributed database system increases the security of the distributed database system. Specifically, with a leader there is a single point of attack and/or failure. If malicious software infects the leader and/or a value for a parameter at the leader's distributed database instance is maliciously altered, the failure and/or incorrect value is propagated throughout the other distributed database instances. In a leaderless system, however, there is not a single point of attack and/or failure. Specifically, if a parameter in a distributed database instance of a leaderless system contains a value, the value will change after that distributed database instance exchanges values with the other distributed database instances in the system, as described in further detail herein. Additionally, the leaderless distributed database systems described herein increase the speed of convergence while reducing the amount of data sent between devices as described in further detail herein.

Figure 2:
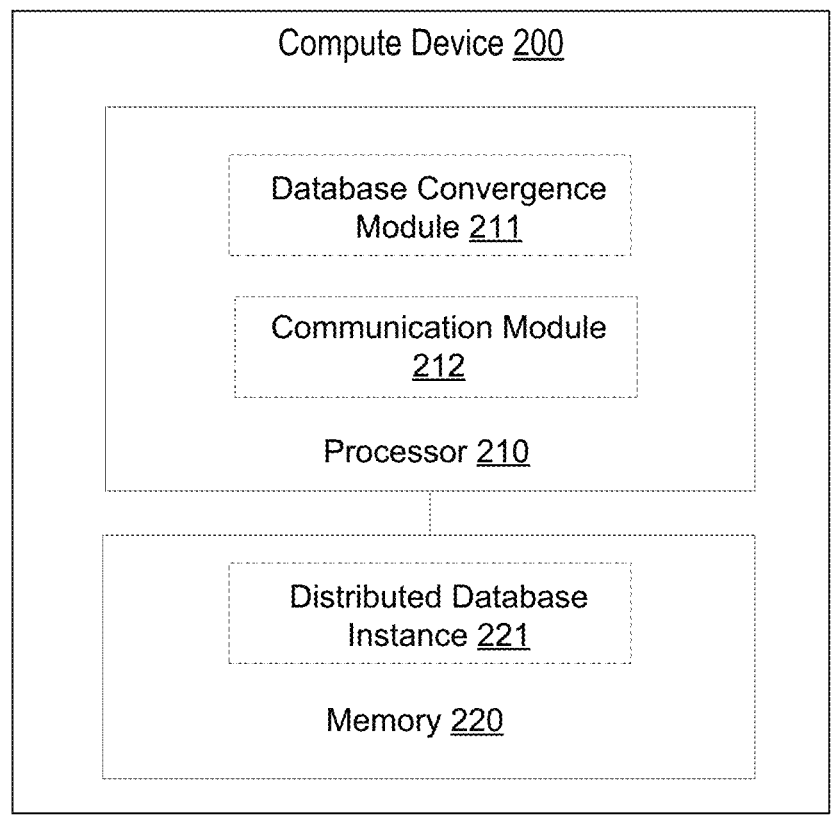
FIG. 2 is a block diagram that illustrates a compute device of a distributed database system, according to an embodiment.

FIG. 2 illustrates a compute device 200 of a distributed database system (e.g., distributed database system 100), according to an embodiment. In some embodiments, compute device 200 can be similar to compute devices 110, 120, 130, 140 shown and described with respect to FIG. 1. Compute device 200 includes a processor 210 and a memory 220. The processor 210 and memory 220 are operatively coupled to each other. In some embodiments, the processor 210 and memory 220 can be similar to the processor 111 and memory 112, respectively, described in detail with respect to FIG. 1. As shown in FIG. 2, the processor 210 includes a database convergence module 211 and communication module 210, and the memory 220 includes a distributed database instance 221. The communication module 212 enables compute device 200 to communicate with (e.g., send data to and/or receive data from) other compute devices. In some embodiments, the communication module 212 (not shown in FIG. 1) enables compute device 110 to communicate with compute devices 120, 130, 140. Communication module 210 can include and/or enable, for example, a network interface controller (NIC), wireless connection, a wired port, and/or the like. As such, the communication module 210 can establish and/or maintain a communication session between the compute device 200 and another device (e.g., via a network such as network 105 of FIG. 1 or the Internet (not shown)). Similarly stated, the communication module 210 can enable the compute device 200 to send data to and/or receive data from another device.

In some instances, the database convergence module 211 can exchange events and/or transactions with other computing devices, store events and/or transactions that the database convergence module 211 receives, and calculate an ordering (e.g., consensus or total order) of the events and/or transactions based on the partial order defined by the pattern of references between the events. Each event can be a record containing an identifier (e.g., a cryptographic hash) of two earlier events (linking that event to the two earlier events and their ancestor events, and vice versa), payload data (such as transactions that are to be recorded), other information such as the current time, a timestamp (e.g., date and UTC time) that its creator asserts is the time the event was first defined, and/or the like. Each of the communicating compute devices are called "members" or "hashgraph members". In some instances, the first event defined by a member only includes a hash of a single event defined by another member. In such instances, the member does not yet have a prior self-hash (e.g., a hash of an event previously defined by that member). In some instances, the first event in a distributed database does not include a hash of any prior event (since there is no prior event for that distributed database).

In some embodiments, such a cryptographic hash of the two earlier events can be a hash value defined based on a cryptographic hash function using an event as an input. Specifically, in such embodiments, the event includes a particular sequence or string of bytes (that represent the information of that event). The hash of an event can be a value returned from a hash function using the sequence of bytes for that event as an input. In other embodiments, any other suitable data associated with the event (e.g., an identifier, serial number, the bytes representing a specific portion of the event, etc.) can be used as an input to the hash function to calculate the hash of that event. Any suitable hash function can be used to define the hash. In some embodiments, each member uses the same hash function such that the same hash is generated at each member for a given event. The event can then be digitally signed by the member defining and/or creating the event. In some implementations, rather than a hash value, any other suitable identifier of an event can be used.

In some instances, the set of events and their interconnections can form a Directed Acyclic Graph (DAG). In some instances, each event in a DAG references zero or more (e.g., two) earlier events (linking that event to the earlier events and their ancestor events and vice versa), and each reference is strictly to earlier ones, so that there are no loops.

In some embodiments, the DAG is based on cryptographic hashes, so the data structure can be called a hashgraph (also referred to herein as a "hashDAG"). In other embodiments, the DAG can be based on any other suitable identifier of the events. The hashgraph or DAG directly encodes a partial order, meaning that event X is known to come before event Y if Y contains a hash of X, or if Y contains a hash of an event that contains a hash of X, or for such paths of arbitrary length. If, however, there is no path from X to Y or from Y to X, then the partial order does not define which event came first. Therefore, the database convergence module can calculate a total or consensus order from the partial order. This can be done by any suitable deterministic function that is used by the compute devices, so that the compute devices calculate the same order. In some embodiments, each member can recalculate this order after each sync, and eventually these orders can converge so that a consensus emerges.

A consensus algorithm and/or method can be used to determine the total or consensus order of events in a hashgraph, DAG and/or the order of transactions stored within the events. The order of transactions in turn can define a state of a database as a result of performing those transactions according to the order. The defined state of the database can be stored as a database state variable. In some embodiments, the instance of the distributed database (e.g., distributed database instance 114) stores the hashgraph, and/or the transactions, and/or the order of transactions, and/or the events, and/or the order of the events, and/or the state resulting from performing transactions.

In some instances, the database convergence module can use the following function to calculate a total order (also referred to consensus order) from the partial order in the hashgraph. For each of the other compute devices (called "members"), the database convergence module can examine the hashgraph to discover an order in which the events (and/or indications of those events) were received by that member. The database convergence module can then calculate as if that member assigned a numeric "rank" to each event, with the rank being 1 for the first event that member received, 2 for the second event that member received, and so on. The database convergence module can do this for each member in the hashgraph. Then, for each event, the database convergence module can calculate the median of the assigned ranks, and can sort the events by their medians. The sort can break ties in a deterministic manner, such as sorting two tied events by a numeric order of their hashes, or by some other method, in which the database convergence module of each member uses the same method. The result of this sort is the total order.

Figure 6:
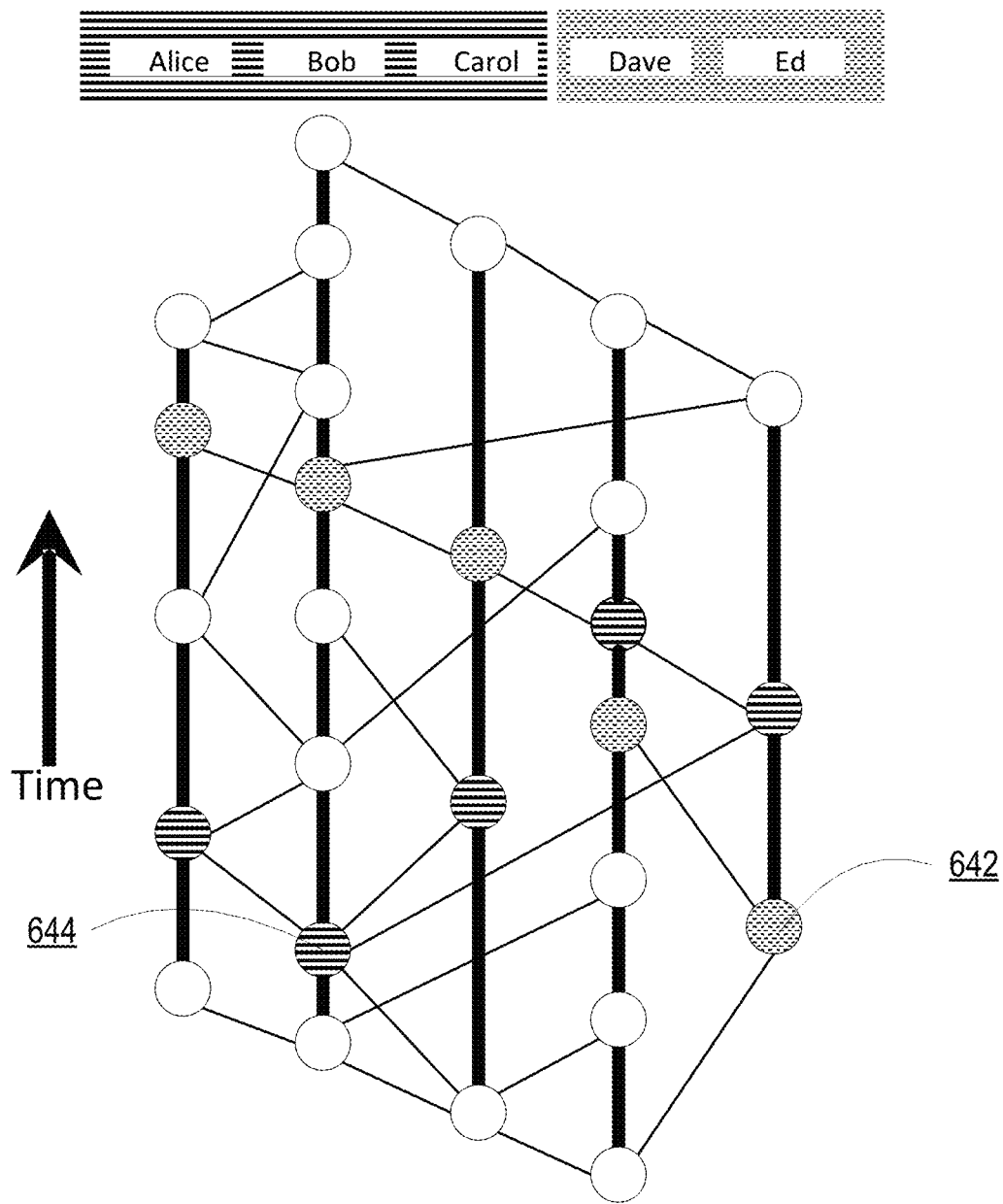

FIG. 6 illustrates a hashgraph 640 of one example for determining a total order (or consensus order) from a partial order. Hashgraph 640 illustrates two events (the lowest striped circle and lowest dotted circle) and the first time each member receives an indication of those events (the other striped and dotted circles). Each member's name at the top is colored by which event is first in their partial or slow order. There are more striped initial votes than dotted; therefore consensus votes for each of the members are striped. In other words, the members eventually converge to an agreement that the striped event occurred before the dotted event.

In this example, the members (compute devices labeled Alice, Bob, Carol, Dave and Ed) will work to define a consensus of whether event 642 or event 644 occurred first. Each striped circle indicates the event at which a member first received an event 644 (and/or an indication of that event 644). Similarly, each dotted circle indicates the event at which a member first received an event 642 (and/or an indication of that event 642). As shown in the hashgraph 640, Alice, Bob and Carol each received event 644 (and/or an indication of event 644) prior to event 642. Dave and Ed both received event 642 (and/or an indication of event 642) prior to event 644 (and/or an indication of event 644). Thus, because a greater number of members received event 644 prior to event 642, the total order can be determined by each member to indicate that event 644 occurred prior to event 642.

In other instances, the database convergence module can use a different function to calculate the total and/or consensus order from the partial order in the hashgraph. In such embodiments, for example, the database convergence module can use the following functions to calculate the total order, where a positive integer Q is a parameter shared by the members.

creator(x)=the member who created event x
anc(x)=the set of events that are ancestors of x, including x itself
other(x)=the event created by the member who synced just before x was created
self(x)=the last event before x with the same creator
self(x,0)=self(x)
self(x,n)=self(self(x), n−1)
order(x,y)=k, where y is the kth event that creator(x) learned of
last (x)={y|y∈ anc(x)∧z∈ anc(x), (y∈ anc(z)∧ creator(y)=creator(z))}

$$\text{slow}(x, y) = \begin{cases} \infty & \text{if } y \notin anc(x) \\ \text{order}(x, y) & \text{if } y \in anc(x) \land y \notin anc(\text{self}(x)) \\ \text{fast}(x, y) & \text{if } \forall i \in \{1, \ldots, Q\}, \text{fast}(x, y) = \text{fast}(\text{self}(x, i), y) \\ \text{slow}(\text{self}(x), y) & \text{otherwise} \end{cases}$$

fast(x, y)=the position of y in a sorted list, with element z∈ anc(x)sorted by median slow(w, z) and with ties broken by the hash of each event w∈ last(x)

In this embodiment, fast(x,y) gives the position of y in the total order of the events, in the opinion of creator(x), substantially immediately after x is created and/or defined. If Q is infinity, then the above calculates the same total order as in the previously described embodiment. If Q is finite, and all members are online, then the above calculates the same total order as in the previously described embodiment. If Q is finite and a minority of the members is online at a given time, then this function allows the online members to reach a consensus among them that will remain unchanged as new members come online slowly, one by one. If, however, there is a partition of the network, then the members of each partition can come to their own consensus. Then, when the partition is healed, the members of the smaller partition will adopt the consensus of the larger partition.

Figure 8:
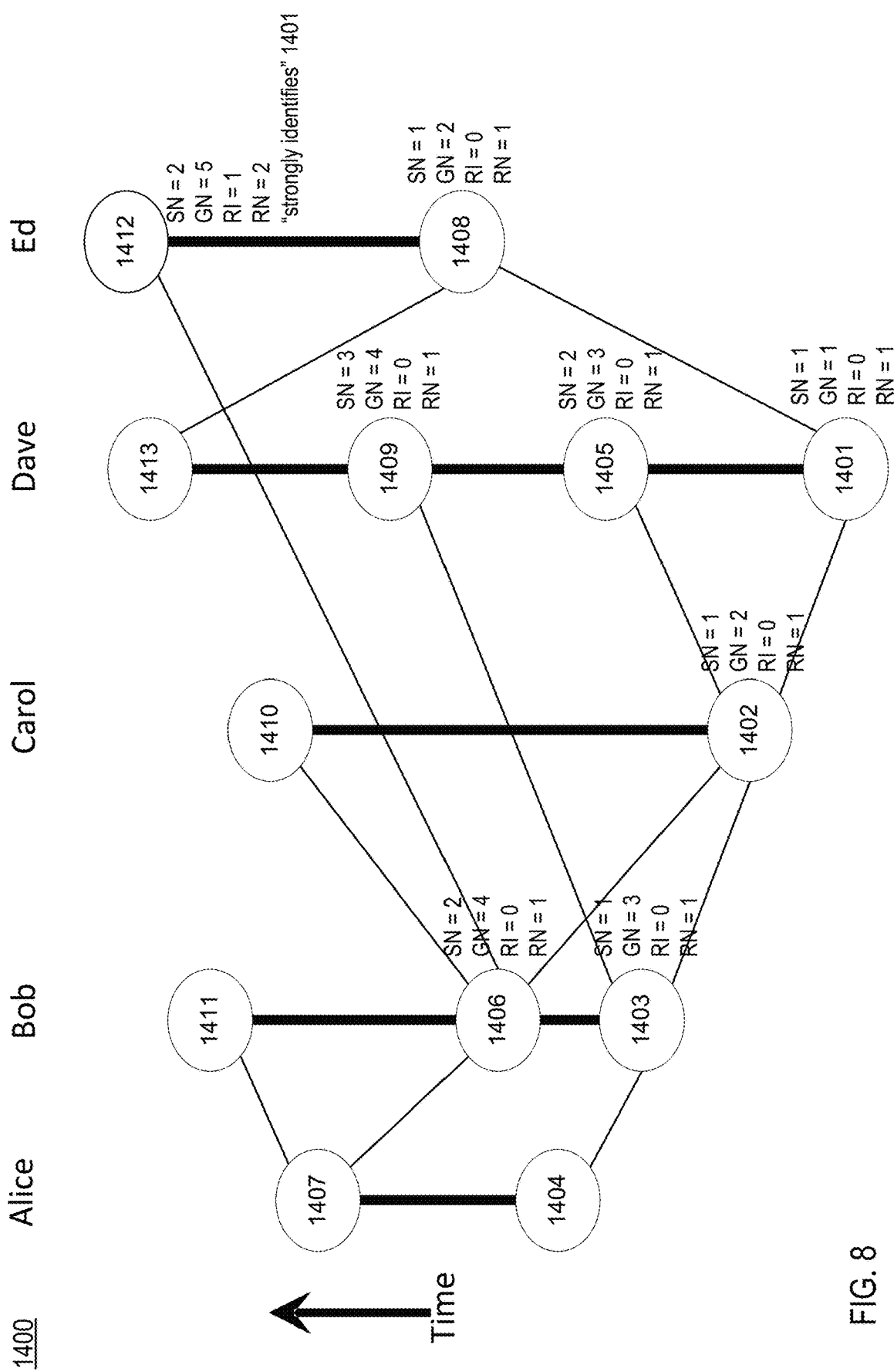
FIG. 8 is an example of a hashgraph, according to an embodiment.
Figure 9:
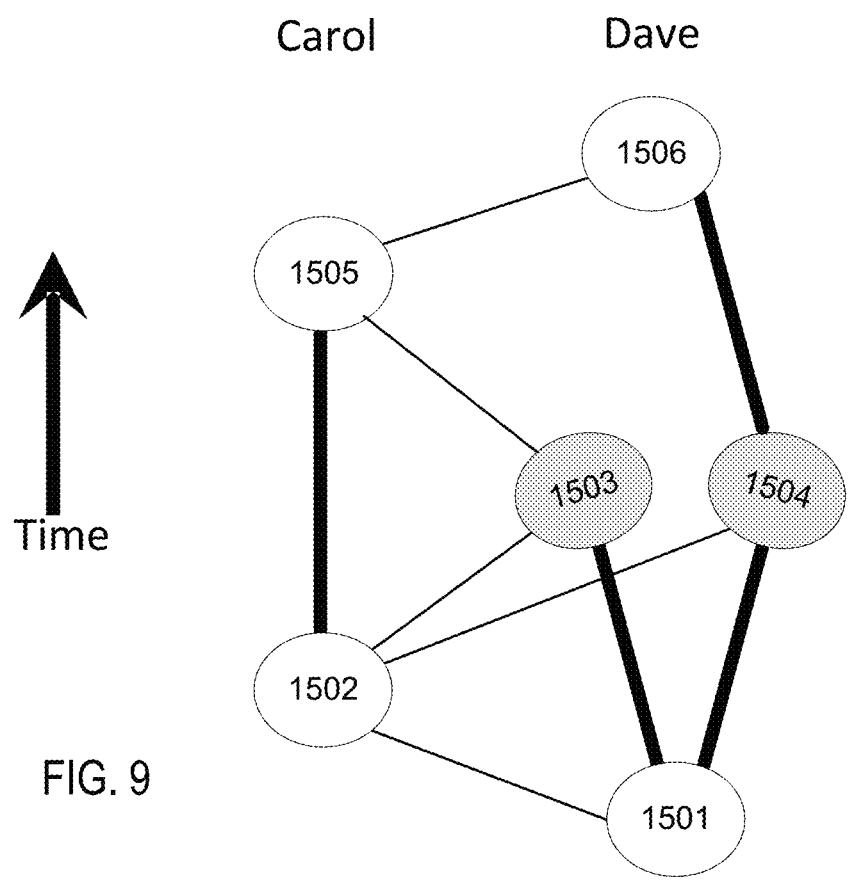
FIG. 9 is an example of a hashgraph, according to an embodiment.

In still other instances, as described with respect to FIGS. 8-13E, the database convergence module can use different functions to calculate the total order from the partial order in the hashgraph. As shown in FIGS. 8-9 each member (Alice, Bob, Carol, Dave and Ed) creates and/or defines events (1401-1413 as shown in FIG. 8; 1501-1506 shown in FIG. 9). Using the function and sub-functions described with respect to FIGS. 8-13E the total order for the events can be calculated by sorting the events by their received round, breaking ties by their received timestamp, and breaking those ties by their signatures, as described in further detail herein. In other instances, the total order for the events can be calculated by sorting the events by their received round, breaking ties by their received generation (instead of their received timestamp), and breaking those ties by their signatures. The following paragraphs specify functions used to calculate and/or define an event's received round and received generation to determine an order for the events. The following terms are used and illustrated in connection with FIGS. 8-13E.

"Parent": an event X is a parent of event Y if Y contains a hash of X. For example, in FIG. 8, the parents of event 1412 include event 1406 and event 1408.

"Ancestor": the ancestors of an event X are X, its parents, its parents' parents, and so on. For example, in FIG. 8, the ancestors of event 1412 are events 1401, 1402, 1403, 1406, 1408, and 1412. Ancestors of an event can be said to be linked to that event and vice versa.

"Descendant": the descendants of an event X are X, its children, its children's children, and so on. For example, in FIG. 8, the descendants of event 1401 are every event shown in the figure. For another example, the descendants of event 1403 are events 1403, 1404, 1406, 1407, 1409, 1410, 1411, 1412 and 1413. Descendants of an event can be said to be linked to that event and vice versa.

"N": the total number of members in the population. For example, in FIG. 8, the members are compute devices labeled Alice, Bob, Carol, Dave and Ed, and N is equal to five.

"M": the least integer that is more than a certain percentage of N (e.g., more than ⅔ of N). For example, in FIG. 8, if the percentage is defined to be ⅔, then M is equal to four. In other instances, M could be defined, for example, to be a different percentage of N (e.g., ⅓, ½, etc.), a specific predefined number, and/or in any other suitable manner.

"Self-parent": the self-parent of an event X is its parent event Y created and/or defined by the same member. For example, in FIG. 8, the self-parent of event 1405 is 1401.

"Self-ancestor": the self-ancestors of an event X are X, its self-parent, its self-parent's self-parent, and so on.

"Sequence Number" (or "SN"): an integer attribute of an event, defined as the Sequence Number of the event's self-parent, plus one. For example, in FIG. 8, the self-parent of event 1405 is 1401. Since the Sequence Number of event 1401 is one, the Sequence Number of event 1405 is two (i.e., one plus one).

"Generation Number" (or "GN"): an integer attribute of an event, defined as the maximum of the Generation Numbers of the event's parents, plus one. For example, in FIG. 8, event 1412 has two parents, events 1406 and 1408, having Generation Numbers four and two, respectively. Thus, the Generation Number of event 1412 is five (i.e., four plus one).

"Round Increment" (or "RI"): an attribute of an event that can be either zero or one.

"Round Number" (or "RN"): an integer attribute of an event. In some instances, this is also referred to as a round created or created round. In some instances, Round Number can be defined as the maximum of the Round Numbers of the event's parents, plus the event's Round Increment. For example, in FIG. 8, event 1412 has two parents, events 1406 and 1408, both having a Round Number of one. Event 1412 also has a Round Increment of one. Thus, the Round Number of event 1412 is two (i.e., one plus one). In other instances, an event can have a Round Number R if R is the minimum integer such that the event can strongly see (as described herein) at least M events defined and/or created by different members, which all have a round number R−1. If there is no such integer, the Round Number for an event can be a default value (e.g., 0, 1, etc.). In such instances, the Round Number for an event can be calculated without using a Round Increment. For example, in FIG. 8, if M is defined to be the least integer greater than ½ times N, then M is three. Then event 1412 strongly sees the M events 1401, 1402, and 1408, each of which was defined by a different member and has a Round Number of 1. The event 1412 cannot strongly see at least M events with Round Number of 2 that were defined by different members. Therefore, the Round Number for event 1412 is 2. In some instances, the first event in the distributed database includes a Round Number of 1. In other instances, the first event in the distributed database can include a Round Number of 0 or any other suitable number.

"Forking": an event X is a fork with event Y if they are defined and/or created by the same member, and neither is a self-ancestor of the other. For example, in FIG. 9, member Dave forks by creating and/or defining events 1503 and 1504, both having the same self-parent (i.e., event 1501), so that event 1503 is not a self-ancestor of event 1504, and event 1504 is not a self-ancestor of event 1503.

"Identification" of forking: forking can be "identified" by a third event created and/or defined after the two events that are forks with each other, if those two events are both ancestors of the third event. For example, in FIG. 9, member Dave forks by creating events 1503 and 1504, neither of which is a self-ancestor of the other. This forking can be identified by later event 1506 because events 1503 and 1504 are both ancestors of event 1506. In some instances, identification of forking can indicate that a particular member (e.g., Dave) has cheated.

"Identification" of an event: an event X "identifies" or "sees" an ancestor event Y if X has no ancestor event Z that is a fork with Y. For example, in FIG. 8, event 1412 identifies (also referred to as "sees") event 1403 because event 1403 is an ancestor of event 1412, and event 1412 has no ancestor events that are forks with event 1403. In some instances, event X can identify event Y if X does not identify forking prior to event Y. In such instances, even if event X identifies forking by the member defining event Y subsequent to event Y, event X can see event Y. Event X does not identify events by that member subsequent to forking. Moreover, if a member defines two different events that are both that member's first events in history, event X can identify forking and does not identify any event by that member.

"Strong identification" (also referred to herein as "strongly seeing") of an event: an event X "strongly identifies" (or "strongly sees") an ancestor event Y created and/or defined by the same member as X, if X identifies Y. Event X "strongly identifies" an ancestor event Y that is not created and/or defined by the same member as X, if there exists a set S of events that (1) includes both X and Y and (2) are ancestors of event X and (3) are descendants of ancestor event Y and (4) are identified by X and (5) can each identify Y and (6) are created and/or defined by at least M different members. For example, in FIG. 8, if M is defined to be the least integer that is more than ⅔ of N (i.e., M=1+floor(2N/3), which would be four in this example), then event 1412 strongly identifies ancestor event 1401 because the set of events 1401, 1402, 1406, and 1412 is a set of at least four events that are ancestors of event 1412 and descendants of event 1401, and they are created and/or defined by the four members Dave, Carol, Bob, and Ed, respectively, and event 1412 identifies each of events 1401, 1402, 1406, and 1412, and each of events 1401, 1402, 1406, and 1412 identifies event 1401. Similarly stated, an event X (e.g., event 1412) can "strongly see" event Y (e.g., event 1401) if X can see at least M events (e.g., events 1401, 1402, 1406, and 1412) created or defined by different members, each of which can see Y.

"Round R first" event (also referred to herein as a "witness"): an event is a "round R first" event (or a "witness") if the event (1) has Round Number R, and (2) has a self-parent having a Round Number smaller than R or has no self-parent. For example, in FIG. 8, event 1412 is a "round 2 first" event because it has a Round Number of two, and its self-parent is event 1408, which has a Round Number of one (i.e., smaller than two).

In some instances, the Round Increment for an event X is defined to be 1 if and only if X "strongly identifies" at least M "round R first" events, where R is the maximum Round Number of its parents. For example, in FIG. 8, if M is defined to be the least integer greater than ½ times N, then M is three. Then event 1412 strongly identifies the M events 1401, 1402, and 1408, all of which are round 1 first events. Both parents of 1412 have a round number of 1, and 1412 strongly identifies at least M round 1 first events, therefore the round increment for 1412 is one. The events in the diagram marked with "RI=0" each fail to strongly identify at least M round 1 first events, therefore their round increments are 0.

In some instances, the following method can be used for determining whether event X can strongly identify ancestor event Y. For each round R first ancestor event Y, maintain an array A1 of integers, one per member, giving the lowest sequence number of the event X, where that member created and/or defined event X, and X can identify Y. For each event Z, maintain an array A2 of integers, one per member, giving the highest sequence number of an event W created and/or defined by that member, such that Z can identify W. To determine whether Z can strongly identify ancestor event Y, count the number of element positions E such that A1[E] <=A2[E]. Event Z can strongly identify Y if and only if this count is greater than M. For example, in FIG. 8, members Alice, Bob, Carol, Dave and Ed can each identify event 1401, where the earliest event that can do so is their events {1404, 1403, 1402, 1401, 1408}, respectively. These events have sequence numbers A1={1,1,1,1,1}. Similarly, the latest event by each of them that is identified by event 1412 is event {NONE, 1406, 1402, 1401, 1412}, where Alice is listed as "NONE" because 1412 cannot identify any events by Alice. These events have sequence numbers of A2={0, 2,1,1,2}, respectively, where all events have positive sequence numbers, so the 0 means that Alice has no events that are identified by 1412. Comparing the list A1 to the list A2 gives the results {1<=0, 1<=2, 1<=1, 1<=1, 1<=2} which is equivalent to {false, true, true, true, true} which has four values that are true. Therefore, there exists a set S of four events that are ancestors of 1412 and descendants of 1401. Four is at least M, therefore 1412 strongly identifies 1401.

Yet another variation on implementing the method for determining, with A1 and A2, whether event X can strongly identify ancestor event Y is as follows. If the integer elements in both arrays are less than 128, then it is possible to store each element in a single byte, and pack 8 such elements into a single 64-bit word, and let A1 and A2 be arrays of such words. The most significant bit of each byte in A1 can be set to 0, and the most significant bit of each byte in A2 can be set to 1. Subtract the two corresponding words, then perform a bitwise AND with a mask to zero everything but the most significant bits, then right shift by 7 bit positions, to get a value that is expressed in the C programming language as: ((A2[i]−A1[i]) & 0x8080808080808080)>>7). This can be added to a running accumulator S that was initialized to zero. After doing this multiple times, convert the accumulator to a count by shifting and adding the bytes, to get ((S & 0xff)+((S>>8) & 0xff)+((S>>16) & 0xff)+((S>>24) & 0xff)+((S>>32) & 0xff)+((S>>40) & 0xff)+((S>>48) & 0xff)+((S>>56) & 0xff)). In some instances, these calculations can be performed in programming languages such as C, Java, and/or the like. In other instances, the calculations can be performed using processor-specific instructions such as the Advanced Vector Extensions (AVX) instructions provided by Intel and AMD, or the equivalent in a graphics processing unit (GPU) or general-purpose graphics processing unit (GPGPU). On some architectures, the calculations can be performed faster by using words larger than 64 bits, such as 128, 256, 512, or more bits.

"Famous" event: a round R event X is "famous" if (1) the event X is a "round R first" event (or "witness") and (2) a decision of "YES" is reached via execution of a Byzantine agreement protocol, described below. In some embodiments, the Byzantine agreement protocol can be executed by an instance of a distributed database (e.g., distributed database instance 114) and/or a database convergence module (e.g., database convergence module 211). For example, in FIG. 8, there are five round 1 first events shown: 1401, 1402, 1403, 1404, and 1408. If M is defined to be the least integer greater than ½ times N, which is three, then 1412 is a round 2 first event. If the protocol runs longer, then the hashgraph will grow upward, and eventually the other four members will also have round 2 first events above the top of this figure. Each round 2 first event will have a "vote" on whether each of the round 1 first events is "famous". Event 1412 would vote YES for 1401, 1402, and 1403 being famous, because those are round 1 first events that it can identify. Event 1412 would vote NO for 1404 being famous, because 1412 cannot identify 1404. For a given round 1 first event, such as 1402, its status of being "famous" or not will be decided by calculating the votes of each round 2 first event for whether it is famous or not. Those votes will then propagate to round 3 first events, then to round 4 first events and so on, until eventually agreement is reached on whether 1402 was famous. The same process is repeated for other firsts.

A Byzantine agreement protocol can collect and use the votes and/or decisions of "round R first" events to identify "famous events. For example, a "round R+1 first" event Y will vote "YES" if Y can "identify" event X, otherwise it votes "NO." Votes are then calculated for each round G, for G=R+2, R+3, R+4, etc., until a decision is reached by any member. Until a decision has been reached, a vote is calculated for each round G. Some of those rounds can be "majority" rounds, while some other rounds can be "coin" rounds. In some instances, for example, Round R+2 is a majority round, and future rounds are designated as either a majority or a coin round (e.g., according to a predefined schedule). For example, in some instances, whether a future round is a majority round or a coin round can be arbitrarily determined, subject to the condition that there cannot be two consecutive coin rounds. For example, it might be predefined that there will be five majority rounds, then one coin round, then five majority rounds, then one coin round, repeated for as long as it takes to reach agreement.

In some instances, if round G is a majority round, the votes can be calculated as follows. If there exists a round G event that strongly identifies at least M round G−1 firsts voting V (where V is either "YES" or "NO"), then the consensus decision is V, and the Byzantine agreement protocol ends. Otherwise, each round G first event calculates a new vote that is the majority of the round G−1 first events that each round G first event can strongly identify. In instances where there is a tie rather than majority, the vote can be designated "YES."

Similarly stated, if X is a round R witness (or round R first), then the results of votes in rounds R+1, R+2, and so on can be calculated, where the witnesses in each round are voting for whether X is famous. In round R+1, every witness that can see X votes YES, and the other witnesses vote NO. In round R+2, every witness votes according to the majority of votes of the round R+1 witnesses that it can strongly see. Similarly, in round R+3, every witness votes according to the majority of votes of the round R+2 witness that it can strongly see. This can continue for multiple rounds. In case of a tie, the vote can be set to YES. In other instances, the tie can be set to NO or can be randomly set. If any round has at least M of the witnesses voting NO, then the election ends, and X is not famous. If any round has at least M of the witnesses voting YES, then the election ends, and X is famous. If neither YES nor NO has at least M votes, the election continues to the next round.

As an example, in FIG. 8, consider some round first event X that is below the figure shown. Then, each round 1 first event will have a vote on whether X is famous. Event 1412 can strongly identify the round 1 first events 1401, 1402, and 1408. So its vote will be based on their votes. If this is a majority round, then 1412 will check whether at least M of {1401, 1402, 1408} have a vote of YES. If they do, then the decision is YES, and the agreement has been achieved. If at least M of them votes NO, then the decision is NO, and the agreement has been achieved. If the vote doesn't have at least M either direction, then 1412 is given a vote that is a majority of the votes of those of 1401, 1402, and 1408 (and would break ties by voting YES, if there were a tie). That vote would then be used in the next round, continuing until agreement is reached.

In some instances, if round G is a coin round, the votes can be calculated as follows. If event X can identify at least M round G−1 firsts voting V (where V is either "YES" or "NO"), then event X will change its vote to V. Otherwise, if round G is a coin round, then each round G first event X changes its vote to the result of a pseudo-random determination (akin to a coin flip in some instances), which is defined to be the least significant bit of the signature of event X.

Similarly stated, in such instances, if the election reaches a round R+K (a coin round), where K is a designated factor (e.g., a multiple of a number such as 3, 6, 7, 8, 16, 32 or any other suitable number), then the election does not end on that round. If the election reaches this round, it can continue for at least one more round. In such a round, if event Y is a round R+K witness, then if it can strongly see at least M witnesses from round R+K−1 that are voting V, then Y will vote V. Otherwise, Y will vote according to a random value (e.g., according to a bit of the signature of event Y (e.g., least significant bit, most significant bit, randomly selected bit) where 1=YES and 0=NO, or vice versa, according to a time stamp of the event Y, using a cryptographic "shared coin" protocol and/or any other random determination). This random determination is unpredictable before Y is created, and thus can increase the security of the events and consensus protocol.

For example, in FIG. 8, if round 2 is a coin round, and the vote is on whether some event before round 1 was famous, then event 1412 will first check whether at least M of {1401, 1402, 1408} voted YES, or at least M of them voted NO. If that is the case, then 1412 will vote the same way. If there are not at least M voting in either direction, then 1412 will have a random or pseudorandom vote (e.g., based on the least significant bit of the digital signature that Ed created for event 1412 when he signed it, at the time he created and/or defined it).

In some instances, the result of the pseudo-random determination can be the result of a cryptographic shared coin protocol, which can, for example, be implemented as the least significant bit of a threshold signature of the round number.

As described above, in some implementations, the hashgraph consensus method can include deciding, for instance, the fame of a witness X in round R. As described above, initial votes can be gathered from round R+1, counting each event voting YES or NO according to whether it is a descendent of X. An alternative approach can include gathering initial votes from "R+2" instead of "R+1" (or "R+3", "R+4", etc. instead of "R+1"). In that approach, an additional step can optionally be added. Specifically, in such an implementation, whenever a round R first event X (or round R witness X) is an ancestor of round R+1 witnesses created and/or defined by more than two thirds of the population (i.e., is more than 2N/3 members), then X is immediately declared to be famous, and the election ends immediately, even before any votes for X are calculated. A second alternative approach can include running an election for R with initial votes gathered from R+1, then if the number of members who created and/or defined witnesses in round R that are decided to be famous is below a given threshold T (e.g., below 2N/3 members), re-run the election a second time with initial votes gathered from R+2. Similarly stated, if an insufficient number of famous witnesses for a round R are identified using votes from round R+1, the election can be completely re-run from scratch using votes from round R+2 rather than round R+1 (i.e., the results of the election using votes from round R+1 are discarded and the election re-run using votes from round R+2). In some implementations, another alternative can include running an election for R with initial votes gathered from R+1, then if the number of members who created and/or defined witnesses in round R that are decided to be famous is below a given threshold T (e.g., below 2N/3 members), the famous witnesses (e.g., judges) for round R can be defined to be the witnesses in round R that are ancestors of famous witnesses in round R+1 (with some removed to ensure only one famous witness in round R per member).

A system can be built from any one of the methods for calculating the result of the pseudo-random determination described above. In some instances, the system cycles through the different methods in some order. In other instances, the system can choose among the different methods according to a predefined pattern.

"Received round": An event X has a "received round" of R if R is the minimum integer such that at least half of the famous round R first events (or famous witnesses) with round number R are descendants of and/or can see X. In other instances, any other suitable percentage can be used. For example, in another instance, an event X has a "received round" of R if R is the minimum integer such that at least a predetermined percentage (e.g., 40%, 60%, 80%, etc.) of the famous round R first events (or famous witnesses) with round number R are descendants of and/or can see X.

In some instances, the "received generation" of event X can be calculated as follows. Find which member created and/or defined each round R first event that can identify event X. Then determine the generation number for the earliest event by that member that can identify X. Then define the "received generation" of X to be the median of that list.

In some instances, a "received timestamp" T of an event X can be the median of the timestamps in the events that include the first event by each member that identifies and/or sees X. For example, the received timestamp of event 1401 can be the median of the value of the timestamps for events 1402, 1403, 1403, and 1408. In some instances, the timestamp for event 1401 can be included in the median calculation. In other instances, the received timestamp for X can be any other value or combination of the values of the timestamps in the events that are the first events by each member to identify or see X. For example, the received timestamp for X can be based on an average of the timestamps, a standard deviation of the timestamps, a modified average (e.g., by removing the earliest and latest timestamps from the calculation), and/or the like. In still other instances, an extended median can be used.

In some instances, the total order and/or consensus order for the events is calculated by sorting the events by their received round, breaking ties by their received timestamp, and breaking those ties by their signatures. In other instances, the total order for the events can be calculated by sorting the events by their received round, breaking ties by their received generation, and breaking those ties by their signatures. The foregoing paragraphs specify functions used to calculate and/or define an event's received round, received timestamp, and/or received generation.

In other instances, instead of using the signature of each event, the signature of that event XORed with the signatures of the famous events or famous witnesses with the same received round and/or received generation in that round can be used. In other instances, any other suitable combination of event signatures can be used to break ties to define the consensus order of events. The result of the XORed signatures of the famous witnesses in a given round represents a pseudorandom number difficult for potential attackers and other entities to predict and/or manipulate. Thus, in some implementations, the XORed signatures can be used as a source of unpredictable random numbers (i.e., "random beacon"). The random numbers can be used in various hashgraph processes.

In still other instances, instead of defining the "received generation" as the median of a list, the "received generation" can be defined to be the list itself. Then, when sorting by received generation, two received generations can be compared by the middle elements of their lists, breaking ties by the element immediately before the middle, breaking those ties by the element immediately after the middle, and continuing by alternating between the element before those used so far and the element after, until the tie is broken.

In some instances, the median timestamp can be replaced with an "extended median." In such instances, a list of timestamps can be defined for each event rather than a single received timestamp. The list of timestamps for an event X can include the first event by each member that identifies and/or sees X. For example, in FIG. 8, the list of timestamps for event 1401 can include the timestamps for events 1402, 1403, 1403, and 1408. In some instances, the timestamp for event 1401 can also be included. When breaking a tie with the list of timestamps (i.e., two events have the same received round), the middle timestamps of each event's list (or a predetermined of the first or second of the two middle timestamps, if of even length) can be compared. If these timestamps are the same, the timestamps immediately after the middle timestamps can be compared. If these timestamps are the same, the timestamps immediately preceding the middle timestamps can be compared. If these timestamps are also the same, the timestamps after the three already compared timestamps are compared. This can continue to alternate until the tie is broken. Similar to the above discussion, if the two lists are identical, the tie can be broken by the signatures of the two elements.

In still other instances, a "truncated extended median" can be used instead of an "extended median." In such an instance, an entire list of timestamps is not stored for each event. Instead, only a few of the values near the middle of the list are stored and used for comparison.

The median timestamp received can potentially be used for other purposes in addition to calculating a total order of events. For example, Bob might sign a contract that says he agrees to be bound by the contract if and only if there is an event X containing a transaction where Alice signs that same contract, with the received timestamp for X being on or before a certain deadline. In that case, Bob would not be bound by the contract if Alice signs it after the deadline, as indicated by the "received median timestamp", as described above.

In some implementations, if Alice creates two events X and Y that are forks (have the same self-parent), and Bob receives X, then a subsequent event defined by Bob can see X. Later, when Bob receives Y, his future events after that can no longer see X or Y (because Bob identifies a fork. In some implementations, this can be changed so that Bob's future events will continue to see X, and will not see Y. Similarly stated, once a member can see an event, that seeing is "sticky", and their future events will continue to see that event, but will not see any forks of that event. Using this, the consensus method and/or algorithm no longer has to detect or react to forks. The definitions change from predicates (can x see y?) to functions (which witness can x see?).

In some implementations, the definitions see, stronglySee, and fork functions can be deleted, and the consensus method and/or algorithm can use the terms of lastSee, firstSee, stronglySeeP, stronglySeeS1, seeThruP, firstSelfWitnessS, and firstWitnessS (see, e.g., functions shown in FIGS. 13A-13E). Each of these functions is given an event x and member m, and returns the unique event that was created by member m, and is seen (in a certain way) by event x. Several of the names that end in S, S1, or P, indicate that the returned event is in x's self round (the round created of x), self round minus one, or parent round (respectively). For each function, if there is no such visible event, or if x=Ø (meaning no event), then it returns Ø.

In the function builder notation used in FIGS. 13A-13E, if multiple lines have an "if" that is satisfied, then the first (upper) one is used. And logical OR ($\vee$) is assumed to short circuit, so $p \vee q$ is defined as true in the case that p is true and q is undefined (such as if the definition of q would have infinite recursion).

The example definitions in FIGS. 13A-13E can be implemented directly in an efficient manner. There are almost no existential or universal quantifiers in the equations of FIGS. 13A and 13B, so those calculations are simple. An efficient implementation would involve memorizing the functions lastSee, stronglySeeP, round, firstSelfWitnessS, and firstWitnessS. The other functions in FIG. 13B may not be memorized: parentRound, seeThru, stronglySeeS1, and firstSee. Each is a function of an event and a member. Thus, a function can be memorized by storing an array for each event, with one element of the array for each member. The example definitions in FIGS. 13A-13E depend on each other recursively, and are listed in an order such that when any given function is called for a given event x, that function will not depend on the functions listed below that function applied to x, only to ancestors of x.

In some instances, a state of the distributed database can be defined after a consensus is achieved. For example, if S(R) is the set of events that can be seen by the famous witnesses in round R, eventually all of the events in S(R) will have a known received round and received timestamp. At that point, the consensus order for the events in S(R) is known and will not change. Once this point is reached, a member can calculate and/or define a representation of the events and their order. For example, a member can calculate a hash value of the events in S(R) in their consensus order. The member can then digitally sign the hash value (using that member's private key) and include the hash value in the next event that member defines. This can be used to inform the other members that that member has determined that the events in S(R) have the given order that will not change. After at least M of the members (or any other suitable number or percentage of members) have signed the hash value for S(R) (and thus agreed with the order represented by the hash value), that consensus list of events along with the list of signatures of the members can form a single file (or other data structure) that can be used to prove that the consensus order was as claimed for the events in S(R). In some instances, if events contain transactions that update a state of the distributed database system (as described herein), then the hash value can be of the state of the distributed database system after applying the transactions of the events in S(R) in the consensus order.

In some instances, M (as described above) can be based on weight values assigned to each member, rather than just a fraction, percentage and/or value of the number of total members. In such an instance, each member has a stake associated with its interest and/or influence in the distributed database system. Such a stake can be a weight value. Each event defined by that member can be said to have the weight value of its defining member. M can then be a fraction of the total stake of all members. The events described above as being dependent on M will occur when a set of members with a stake sum of at least M agree. Thus, based on their stake, certain members can have a greater influence on the system and how the consensus order is derived. In some instances, a transaction in an event can change the stake of one or more members, add new members, and/or delete members. If such a transaction has a received round of R, then after the received round has been calculated, the events after the round R witnesses will recalculate their round numbers and other information using the modified stakes and modified list of members. The votes on whether round R events are famous will use the old stakes and member list, but the votes on the rounds after R will use the new stakes and member list. Additional details regarding using weight values to determine consensus are described in U.S. Pat. No. 9,646,029, filed on Dec. 21, 2016 as U.S. patent application Ser. No. 15/387,048 and titled "Methods And Apparatus For A Distributed Database Within A Network," which is incorporated herein by reference in its entirety.

In some instances, certain members can be identified and/or designated as "lazy members." In such instances, lazy members can define and/or create events similar to normal members or non-lazy members. In addition, events defined and/or created by lazy members can be included in the hashgraph and the consensus order for such events can be calculated and/or identified. The Round Increment for events defined by lazy members, however, is zero. Accordingly, a Round Number (or round created) for an event defined by a lazy member is equal to the maximum of the Round Numbers of the event's parents. Similarly stated, because the Round Increment for events defined by lazy members is zero, a Round Number (or round created) for an event defined by a lazy member cannot be greater than the maximum of the Round Numbers of the event's parents.

Moreover, in some instances, events defined by lazy members are not eligible to vote in elections and events defined by lazy members are not eligible to become Round R first events or witnesses, and/or do not count as intermediate events for an event defined by a normal or non-lazy member to strongly see another event. Accordingly, the limitations imposed on lazy members result in a reduction of computations carried out by the hashgraph while still maintaining security and the integrity of consensus order. Members can be selected as lazy members based on any suitable criteria. For example, in some instances members can be designated as lazy members based on a deterministic pseudorandom selection executed on each round, predefined at the beginning of a round, based on trust levels, based on amount of stake, based on the vote of other members, and/or randomly selected. In some instances, members designated as lazy members can be different for each round while in some other instances, members designated as lazy members remain the same across different rounds. In some other instances, events rather than members can be designated as "lazy" events. In such a case, a lazy events can be selected at each round instead of selecting members.

Accordingly, in some instances, a processor of a first member can define a first group of members (e.g., compute devices) and a second group of members (e.g., compute devices) based on a deterministic pseudorandom function. The first group of members can be non-lazy members and the second group of members can be lazy members. In some instances, the first group of members is the absolute complement of the second group of members with respect to the members (e.g., compute devices) of the distributed database. The first member (or processor of the first member) can receive from a second member (e.g., compute device) an event linked to a first set of events defined by a set of members (e.g., a set of compute devices). The set of members includes at least one member from the first group of members and at least one member from the second group of members. The processor can identify an order associated with a second set of events as a result of a consensus protocol (e.g., as described herein) using a value for a parameter (e.g., a round number, a round increment, a vote, an indication of being a witness, an indication of being a famous witness, etc.) of an event from the first set of events that was defined by a member from the first group of members and not using a value for the parameter of an event from the first set of events that was defined by a member from the second group of members. The processor can identify an order associated with a set of transactions indicated in an instance of a distributed database based at least in part on the order associated with the second set of events and can store the order associated with the set of transactions in the instance of the distributed database.

The foregoing terms, definitions, and algorithms are used to illustrate the embodiments and concepts described in FIGS. 8-13E. FIGS. 10A and 10B illustrate a first example application of a consensus method and/or process shown in mathematical form. FIGS. 11A and 11B illustrate a second example application of a consensus method and/or process shown in mathematical form, FIGS. 12A and 12B illustrate a third example application of a consensus method and/or process shown in mathematical form, and FIGS. 13A-13E illustrate a fourth example application of a consensus method and/or process shown in mathematical form.

In FIG. 2, the database convergence module 211 and the communication module 212 are shown in FIG. 2 as being implemented in processor 210. In some embodiments, the database convergence module 211 and/or the communication module 212 can be implemented in memory 220. In some embodiments, the database convergence module 211 and/or the communication module 212 can be hardware based (e.g., ASIC, FPGA, etc.).

Just as transactions can change data and/or state in the distributed database (as described herein, for example, with respect to FIG. 1), the transactions can also modify the membership of the distributed database (e.g., the set of compute devices implementing the distributed database) by adding, removing, and/or modifying members of the distributed database. In some implementations, the members of the distributed database can change over time by adding and/or removing one or more compute devices from the set of compute devices that implement the distributed database (e.g., compute devices 110, 120, 130, 140 of FIG. 1). Similarly stated, the set of compute devices 110, 120, 130, 140 implementing the distributed database can change over time, as compute devices from the set of compute devices 110, 120, 130, 140 are removed from the set of compute devices 110, 120, 130, 140, and/or other compute devices are added to the set of compute devices 110, 120, 130, 140 that implement the distributed database. In some instances, the removed compute devices can reconnect to the distributed database system at a later time.

An address book can be used to keep track of the members of a distributed database (i.e., the compute devices implementing the distributed database) at any given time. FIG. 14 illustrates an address book 1400 associated with a distributed database system, according to an embodiment. The address book 1400 includes an entry for each of the compute devices 110, 120, 130, 140 in distributed database system 100 of FIG. 1. Specifically, the address book 1400 is defined to include a set of the public keys (A, B, C and D) of a set of compute devices (compute devices 110, 120, 130, 140 as shown and described with respect to FIG. 1) that implement a distributed database. In implementations in which stake is used to determine consensus (e.g., the stake of a device indicates an amount of influence that device has over the consensus process), the address book 1400 can also include an amount of stake associated with each compute device.

When transactions add, remove and/or modify compute devices from the set of compute devices implementing the distributed database, the transactions can change and/or update the address book. For example, if a transaction to remove compute device 140 from the distributed database is entered into the distributed database and ordered (e.g., within a consensus order of the distributed database), the transaction can be executed and compute device 140 can be removed from the distributed database. In response to this transaction, a new address book can be defined that does not include an entry for compute device 140. For another example, if a transaction to add a new compute device to the distributed database is entered into the distributed database and ordered (e.g., within a consensus order of the distributed database), a new address book with an entry (e.g., including a public key and/or an amount of stake) can be defined for the new compute device. For yet another example, if a transaction to change an amount of stake associated with one or more compute devices is entered into the distributed database and ordered, a new address book reflecting the change in stake can be defined. For example, if the stake reflects an amount of cryptocurrency coins held by each compute device, a transaction can reflect compute device 140 transferring 5 coins to compute device 130. After the transaction is ordered and executed, a new address book can be defined reflecting that compute device 140 now has 70 coins while compute device 130 has 35 coins.

In some implementations, each round of a consensus protocol can have a new address book (e.g., each compute device implementing the distributed database can update its address book for each round of the consensus protocol). Specifically, when information in an address book changes (e.g., via a transaction to add, remove and/or modify compute devices implementing the distributed database), each compute device can update its address book to reflect transactions making changes to the address book. Such changes can be reflected in the address book for a round after the event including such changes is assigned a received round via the consensus protocol. Specifically, an address book $A_r$ for round r can reflect the transactions in events having a received round of less than r (i.e., transactions in events having a received round of r−1 or less). Similarly, once events with a received round of r have been identified, a new address book $A_{r+1}$ for round r+1 can be defined implementing the transactions with a received round of less than r+1. Thus, in such implementations, the address book can be updated for each round. This can ensure that transactions affect the address book quickly.

In some implementations, an address book $A_r$ for a round r is not updated for each round, but is instead updated a predetermined number of rounds p after the events having a received round of r have been identified (e.g., each compute device implementing the distributed database can update its address book accordingly). For example, in such implementations, an address book $A_r$ for a round r is defined to be a copy of $A_{r-p}$ that is then modified by the valid transactions in the events having a received round of r−p or less. Thus, if p=2, an address book $A_r$ for a round r includes updates from the transactions impacting the address book (e.g., add, remove and/or modify the compute devices implementing the distributed database) within events having a received round of r−2 or less. In some implementations, any other suitable value for p can be used (e.g., 3, 4, 5, etc.). This provides the compute device (e.g., using a background thread) a duration of p−1 rounds to process consensus transactions before the new address book is used within the consensus protocol. This extra time can help avoid pauses and/or delays in the consensus protocol.

In some implementations, an address book $A_r$ for a round r is instead updated a predetermined number of rounds p after a previous update to the address book (e.g., each compute device implementing the distributed database can update its address book accordingly). For example, in such implementations, an address book $A_r$ for a round r can be defined to be a copy of $A_{r-1}$ for any round that is not a multiple of p. Otherwise, the address book $A_r$ reflects transactions in events having a received round of r−1 or less. Similarly stated, the address book can be updated every p rounds. As an example, if p=10, $A_r$ can be defined as an unmodified copy of $A_{r-1}$ for any round r that is not a multiple of 10. Otherwise, if r is a multiple of 10, $A_r$ is a copy of $A_{r-10}$ that is modified by the valid transactions in the events having received rounds of r−10 through r−1. In some implementations, the multiple p can be any suitable number (e.g., 2, 5, 10, 20, etc.). This allows fewer recalculations of an event's round number (or round created) as new address books are defined (as described in further detail herein). Specifically, batching multiple rounds of changes to the address book prior to updating the address book ensures that the same address book is used to calculate and recalculate round numbers for multiple rounds. Using the same address book for multiple rounds reduces the need to recalculate an event's round number (or round created) after the address book changes.

In some implementations, the consensus protocol can both wait a predetermined number of rounds p after a previous update to the address book and wait a predetermined number of rounds k after consensus is achieved before updating the address book. For example, in such implementations, an address book $A_r$ for a round r can be defined to be a copy of $A_{r-1}$ for any round that is not a multiple of p. Otherwise, if the round is a multiple of p the address book $A_r$ can reflect transactions in events having a received round of r-k or less. As an example, if p=10 and k=2, $A_r$ can be defined as an unmodified copy of $A_{r-1}$ for any r that is not a multiple of 10. Otherwise, if r is a multiple of 10, $A_r$ is a copy of $A_{r-11}$ that is modified by the valid transactions in the events having received rounds of r−11 through r−2. This can provide the advantage of batching multiple rounds of changes before applying to the address book along with the advantage of providing additional time for each compute device (e.g., using a background thread) to process consensus transactions before the new address book is used within the consensus protocol.

After consensus is reached on the famous witnesses in round r, the events with a received round of r can be identified and the new address book $A_{r+1}$ can be calculated (as discussed above). In some implementations, each event can have its round created recalculated using the new address book $A_{r+1}$. This is done to identify the famous witnesses in round r+1. Thus, for each address book and for the round associated with that address book, an event may have a different round created.

In some implementations, to reduce the number of recalculated created rounds for events, some events can be identified as frozen. A frozen event does not have its round created recalculated when a new address book is defined. Specifically, if an event is an ancestor of any famous witnesses in round r or earlier, then it can be considered frozen and its round created is not recalculated in subsequent rounds or using subsequent address books. If, however, an event is not an ancestor of any famous witnesses in round r or earlier, its round created is recalculated in round r+1 using the address book $A_{r+1}$ for round r+1 (if the address book for round r+1 has changed from the address book for round r). Similarly, moving forward, after the famous witnesses in round r+1 are identified and the events with a received round of r+1 are identified, additional events can become frozen if they are an ancestor of a famous witness of round r+1 or earlier. Such frozen events will not have their round created recalculated in round r+2. This can similarly continue for future rounds of the consensus protocol.

In some implementations, the recalculation can be modified for two rounds, seeing (or identifying) a majority (rather than strongly seeing) when the parent round is r+2, and seeing just one (rather than a supermajority) when the parent round is r+1. This can control a tradeoff between latency and computational complexity: it increases computation cost, but decreases latency to achieve consensus. Latency can also be reduced in some implementations by having each compute device implementing the distributed database sync with many other compute devices substantially simultaneously, such as to allow each event to have multiple other-parent events.

Figure 15:
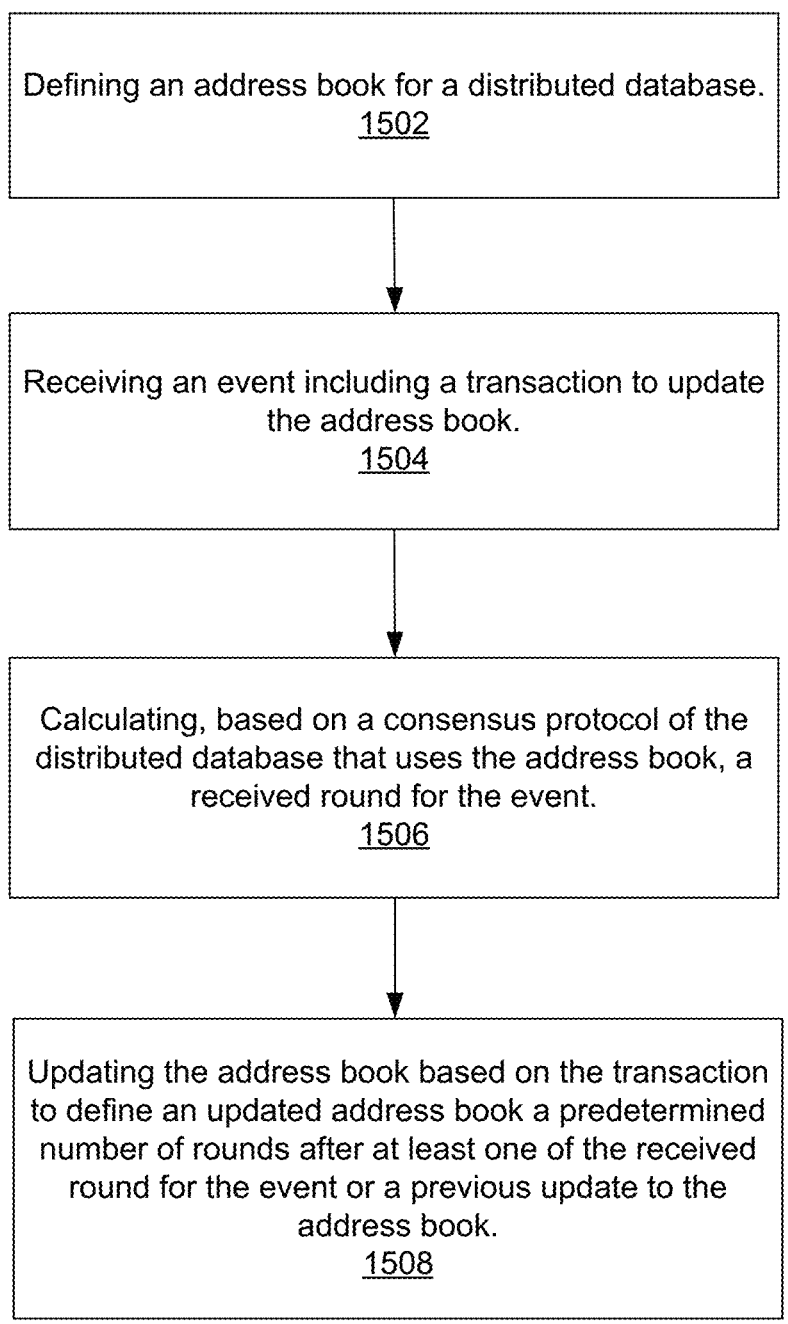
FIG. 15 is a flow chart illustrating a method of updating an address book, according to an embodiment.

FIG. 15 is a flow chart illustrating a method 1500 of updating an address book, according to an embodiment. The method 1500 can be executed by a processor of a compute device from a set of compute devices implementing a distributed database. The method 1500 includes, at 1502, defining an address book for a distributed database. In some implementations, the address book includes an identifier (e.g., a public key) and/or other information (e.g., stake value) for each compute device from a set of compute devices that implements the distributed database via a network.

An event including a transaction to update the address book is received, at 1504. For example, the event can include a transaction to add a compute device to the set of compute devices that implements the distributed database, remove a compute device from the set of compute devices that implements the distributed database, update a stake value associated with a compute device from the set of compute devices that implements the distributed database, and/or the like.

A received round for the event is calculated, based on a consensus protocol of the distributed database that uses the address book, at 1506. For example, any suitable consensus protocol, such as those disclosed herein, can be used to calculate a received round (or an attribute associated with order) for the event.

The address book is updated based on the transaction to define an updated address book a predetermined number of rounds after at least one of the received round for the event or a previous update to the address book, at 1508. As discussed above, in some implementations, the address book can be updated based on the transaction a predetermined number of rounds after the received round for an event. In some implementations, the address book can be updated a predetermined number of rounds after a previous update to the address book (e.g., updates to the address book occurring when the round is a multiple of p).

In some implementations, the consensus protocol is configured to identify a set of events (e.g., famous witnesses) for each round of the consensus protocol. The set of events for each round can be used by the consensus protocol to determine a received round for each event from a group of events. Moreover, an attribute (e.g., round created) can be calculated for each event from the group of events using the address book. The attribute can be recalculated for each event from the group of events using the updated address book when that event is not an ancestor of at least one event from the set of events for a round in which the updated address book is defined. Similarly, the attribute is not recalculated for each event from the group of events using the updated address book when that event from the group of events is an ancestor of at least one event from the set of events for a round in which the updated address book is defined.

In some implementations, events are kept in the distributed database and/or as part of a DAG indefinitely. In some implementations, events can be discarded as they become old. For example, if an event is sufficiently old, that event can be classified as ancient. In some implementations, a compute device can optionally delete an ancient event from that compute device's instance of the distributed database. If an event is even older, the event can be classified as expired and a compute device discards that event from that compute device's instance of the distributed database. If the distributed database has not reached consensus on an event (e.g., the distributed database has not identified a received round for that event) by the time the event is ancient, then the event can be classified as stale. In such implementations, an event classified as stale will not be assigned a received round or a consensus timestamp, will not become part of the consensus order, and the transactions within the event will not be processed. As such, the transactions within the event will not have an effect on the shared state or the address book. Moreover, when an event becomes expired, the event is no longer sent during syncs with other members (compute devices implementing the distributed database). In some implementations, members can, however, continue to exchange ancient events during syncs to give members that may be behind time to still consider these events (e.g., such members that are behind may still not consider such events as ancient).

In some instances, an event is only added to a DAG or hashgraph if all its parents already exist in the DAG or hashgraph. In other implementations, an event can still be added to a DAG or hashgraph if a parent does not exist in the DAG or hashgraph but that parent would be either ancient or expired.

In some implementations, a threshold for expired and/or ancient events can be defined by a number of rounds from when an event is created until it becomes ancient or expired. As an example, the thresholds can be defined as expiredDuration>ancientDuration>0. The values for ancientDuration and expiredDuration can be any suitable values. For example, in some implementations, ancientDuration=4 and expiredDuration=8. In other implementations, any other values can be used for ancientDuration and/or expiredDuration.

In some implementations, each event can include an indication of a claimed generation number (or generation) for each of that event's parent events. In such implementations, the generation number for an event can be the maximum of the claimed generation numbers of the event's parents, plus one. Events with no parents can have a generation number of one.

When the distributed database (or a compute device(s) implementing the distributed database), DAG or hashgraph reaches consensus for events with a specific received round (e.g., received round r where the distributed database previously did not have consensus for received round r), the generation number for round r can be the minimum generation number of the events that are famous witness in round r. In some implementations, an event x can be considered ancient if event x has a generation number that is less than the generation number of the round equal to the most recent round to achieve consensus less ancientDuration. Similarly stated, an event x can be considered ancient if gen(x)<gen(r−ancientDuration), where gen(x) is the generation number of event x and gen(r−ancientDuration) is the generation number of the round resulting from the most recent round r to achieve consensus minus ancientDuration. Similarly, in some implementations, an event x can be considered expired if event x has a generation number that is less than the generation number of the round equal to the most recent round to achieve consensus less expiredDuration (or gen(x)<gen(r−expiredDuration)).

In some implementations, a core set of events $S_r$ for a round r can be defined. The core set of events for a round r can be defined as the frozen, non-ancient, non-expired events immediately after reaching consensus on round r. Similarly stated, the core set of events $S_r$ for a round r can be the set of frozen witnesses in round r, along with their ancestors in round r and prior rounds, whose generations are recent enough such that the events are not ancient or expired. The core set of events can be useful to prove that the distributed database systems described herein continue to have an asynchronous byzantine fault tolerance (ABFT) property. For example, consensus can be guaranteed for the base case of round 1, because no events have yet been discarded, and the address book has not yet changed. Then, if consensus is true for round r, and all honest members have the same core set of events $S_r$ and the same address book for round r+1, then all will reach the same consensus on round r+1, agreeing on the same core set of events $S_r+$ and consensus events for r+1 and the address book for r+2. Accordingly, consensus can be proved, by induction.

In some implementations, if a new member (compute device) joins the distributed database and/or if a member reconnects to the distributed database after being disconnected, that member can receive the latest information and events associated with the distributed database from another member (compute device), as of a recent round for which consensus was obtained, r. In some implementations, the latest information can be a state of the distributed database digitally signed by a predetermined number of and/or percentage of the current members and/or stake of the distributed database (e.g., ⅓ of the members and/or ⅓ of the total stake in the distributed database). In addition to the signed state as of round r, which reflects the results of the consensus transactions up to round r, the new or reconnecting member can obtain additional information about the hashgraph, DAG and/or distributed database. For example, the new or reconnecting member can receive, from another member, events in the core set $S_r$ for round r, hash values of the events in the core set $S_r$ for round r and/or the minimum generation of the unique famous witnesses in each non-ancient round, as of the moment when r is the latest round with consensus. Given this information, the new or reconnecting member can join or rejoin the hashgraph, DAG and/or distributed database.

In some implementations, where possible, a reconnecting member can write their events and/or the state of their hashgraph, DAG and/or instance of distributed database to memory before rebooting or leaving the hashgraph, DAG and/or distributed database. The reconnecting member can then read the events and/or state after rebooting and/or when reconnecting to the hashgraph, DAG and/or distributed database. This can save bandwidth for syncing after a reboot and/or when the member is reconnecting to and/or rejoining the hashgraph, DAG and/or distributed database, but is not required.

As an example, member compute device Alice (using a processor at compute device Alice) can use the DAG and/or hashgraph at Alice's instance of a distributed database to determine and/or identify the famous witnesses of the distributed database for rounds up to and including round r. Alice can then calculate the consensus order for events having a received round of r or less. Using the consensus order, Alice can process the transactions in the events in the consensus order to determine a state of the distributed database. Alice can calculate a hash value of the state of the distributed database and define and send a new event with a transaction including the hash value of the state. Alice can digitally sign this event and/or transaction using Alice's private key. Alice can then collect digital signatures from other members of the distributed database that agree with the state such that the state of the distributed database is digitally signed by a predetermined number of and/or percentage of the current members and/or stake of the distributed database (e.g., at least ⅓ of the members and/or ⅓ of the total stake in the distributed database).

In this example, if compute device Bob joins (or reconnects to) the network (e.g., by being added to the address book via a transaction in an event), Alice can send him the signed state for round r (e.g., the state for round r that is digitally signed by a predetermined number of and/or percentage of the current members and/or stake of the distributed database). Bob can then begin syncing with other members of the distributed database. Specifically, he can receive events through syncing with other members. Bob can first accept events that are not ancient, but whose parents are ancient (according to the definition of ancient as of the end of round r). Then Bob can accept events whose parents are either ancient, or among the older events Bob has received. Using these events, Bob can begin to construct and/or define a DAG. This can continue until Bob has received events up to the present, at which point Bob is caught-up and can be a full participating member.

As a participating member, Bob can calculate the received round for the events Bob receives going forward. Because different address books are used for different rounds (as discussed herein), Bob cannot simply calculate the received round for each of the events using address book $A_{r+1}$. Thus, in some implementations, the signed state can include and/or be sent to Bob (from Alice) with each event in $S_r$, along with the round created for each event in $S_r$. Then Bob will know the consensus round created for each event in $S_r$. Using this information, Bob can then calculate the consensus round created for the events in rounds r−1 and rounds going forward. For events having a round created before r−1, Bob will not know the round created, but it will not matter because those events will not be used in the calculation of the famous witnesses in round r+1 and later.

While described above as sending to Bob each event in $S_r$, in some implementations only those events in $S_r$ with a round created that is greater than the round created of both their parent events are sent with the signed state to a joining (or reconnecting) member (e.g., Bob). This provides sufficient information for the other events to have their round created recalculated by Bob by copying the round created from their parent event with the highest round created.

In some implementations, a hash value of each event in $S_r$ discussed above as being sent with the signed state is sent with the signed state, rather than the event itself. Thus, in such implementations, the state includes and/or is sent with three lists of hash values: hash values for events in $S_r$ having a round created greater than a round created for both their parents and created in rounds r, r−1 and r−2. In such implementations, upon a reconnect or upon newly connecting, Bob can sync with other members until Bob has received the events whose hash values are stored in and/or sent with the signed state. Specifically, Bob can identify such events during syncs by computing a hash value for each event Bob receives and comparing that hash value with the hash values Bob received with the state. Bob can then assign the appropriate round created to any event that is both an ancestor of one event that has a hash value in and/or sent with the state and a descendent of another event that has a hash value in and/or sent with the state. Bob can also assign a predetermined round created value (e.g., −∞) to any other event for which Bob has no parent events. Based on this information, Bob can define a DAG and Bob can calculate the round created values for the other events Bob receives as described above using address book $A_{r+1}$. Bob can then continue on from there as a normal participating member as further rounds reach consensus and as Bob receives further events via syncs with other members.

FIG. 16 is a flowchart illustrating a method 1600 of a compute device connecting to and/or joining a distributed database. The method 1600 can be executed by a processor of a compute device. The method 1600 includes connecting, via a network, to a set of compute devices implementing a distributed database and as a node implementing the distributed database, at 1602. For example, a compute device can join a distributed database as a member and/or node by being added to the address book of the distributed database. This can be done using a transaction within an event that is ordered using a consensus protocol of the distributed database (as described herein).

A state of the distributed database associated with a completed round of a consensus protocol is received from a compute device from the set of compute devices, at 1604. In some implementations, the state can be digitally signed by a predetermined number of and/or percentage of the current members and/or stake of the distributed database (e.g., at least ⅓ of the members and/or ⅓ of the total stake in the distributed database). The state can be a state of the distributed database as of a given round r (e.g., with transactions included in events with a received round of r or earlier having been executed and/or processed). In some implementations, the state includes or is sent with an indication of a core set of events (e.g., a hash value of each event from the core set of events) associated with the completed round along with a round identifier for each event from the core set of events. In some implementations, the core set of events does not include events that have a generation that is a predetermined number of rounds prior to the completed round (e.g., that are expired and/or ancient).

A set of events associated with the state is received from the set of compute devices, at 1606. The set of events can be received based on syncing with other compute devices from the set of compute devices.

A set of attributes for each event from the set of events is calculated based on the core set of events and the round identifier for each event from the core set of events, at 1608. For example, attributes described herein with respect to a consensus protocol (e.g., a round created, famous witnesses for each round, etc.) can be calculated for each event from the set of events.

A directed acyclic graph (DAG) is constructed based on the set of events and the set of attributes for the set of events, at 1610, and an order of events associated with a next round of the consensus protocol is calculated using the DAG, at 1612. The compute device connecting and/or joining the distributed database can continue to function as a fully-functioning and up-to-date member going forward.

In some instances, a distributed database (e.g., shown and described with respect to FIG. 1) can be used to implement a cryptocurrency. In such an instance, each distributed database instance 114, 124, 134, 144 can define one or more wallet data structures (also referred to herein as wallets) to store cryptocurrency. In some instances, users who are not associated with the distributed database (e.g., compute devices that are not members of the distributed database) can also create and/or define such wallets. The wallet data structure can include a key pair (a public key and a private key). In some instances, the key pair for a wallet can be generated by the compute device at which that wallet originates. For example, if Alice defines a wallet (W, K), with W being the public key (which can also act as an identifier for the wallet) and K being the private key, she can publish W (e.g., in an event) to the remaining instances of the distributed database, but keep her identity anonymous, so that the other instances of the distributed database (or their users) cannot identify that wallet W is associated with Alice.

Figure 7:
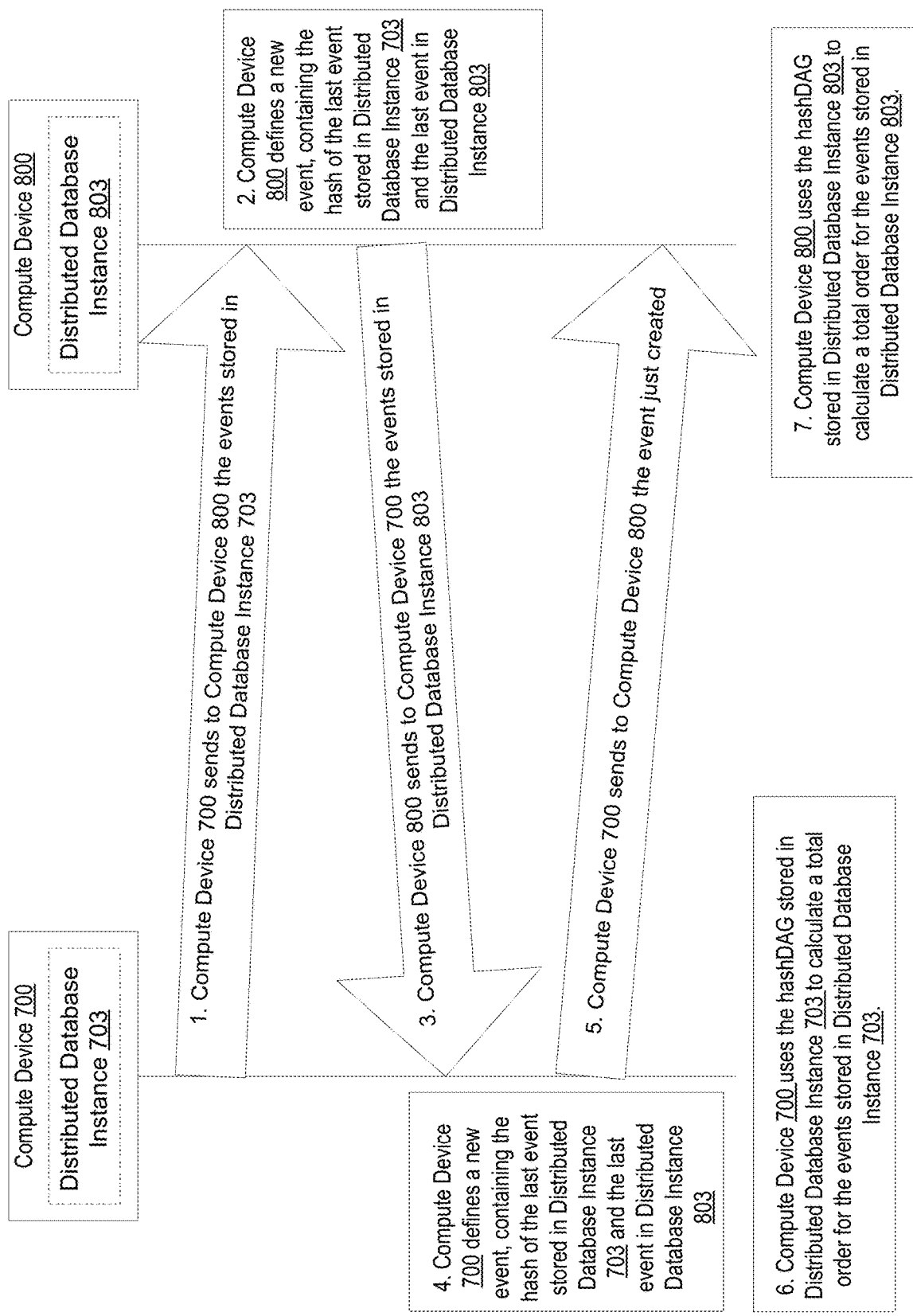
FIG. 7 is a flow diagram that illustrates a communication flow between a first compute device and a second compute device, according to an embodiment.

FIG. 7 illustrates a signal flow diagram of two compute devices syncing events, according to an embodiment. Specifically, in some embodiments, the distributed database instances 703 and 803 can exchange events to obtain convergence. The compute device 700 can select to sync with the compute device 800 randomly, based on a relationship with the compute device 700, based on proximity to the compute device 700, based on an ordered list associated with the compute device 700, and/or the like. In some embodiments, because the compute device 800 can be chosen by the compute device 700 from the set of compute devices belonging to the distributed database system, the compute device 700 can select the compute device 800 multiple times in a row or may not select the compute device 800 for a while. In other embodiments, an indication of the previously selected compute devices can be stored at the compute device 700. In such embodiments, the compute device 700 can wait a predetermined number of selections before being able to select again the compute device 800. As explained above, the distributed database instances 703 and 803 can be implemented in a memory of compute device 700 and a memory of compute device 800, respectively.

In some implementations, compute device 700 can have multiple threads running at once, each thread syncing with another member. Accordingly, compute device 700 can synchronize with other compute devices (not shown in FIG. 7) in addition to compute device 800. In some instances, compute device 700 can establish connections for each thread at an initial or first time and thereafter, maintain each connection alive or open by periodically sending a heartbeat message (e.g., sending a heartbeat twice a second). Thus, in some instances, compute device 700 can prevent synchronization latency or delays otherwise caused by Transfer Layer Security (TLS) protocols (e.g., record protocol and handshake protocol) each time a compute device establishes a connection with another member or compute device for synchronization. Additional details related to establishing and maintaining connections with other members or compute devices (including as a pool of connections) can be found in U.S. Pat. No. 10,375,037, filed as U.S. patent application Ser. No. 16/032,652 on Jul. 11, 2018 and titled "Methods and Apparatus for Efficiently Implementing a Distributed Database within a Network," which is incorporated herein by reference in its entirety.

FIGS. 3-6 illustrate examples of a hashgraph according to an embodiment. There are five members, each of which is represented by a dark vertical line. Each circle represents an event. The two downward lines from an event represent the hashes of two previous events. Every event in this example has two downward lines (one dark line to the same member and one light line to another member), except for each member's first event. Time progresses upward. In FIGS. 3-6, compute devices of a distributed database are indicated as Alice, Bob, Carol, Dave and Ed. In should be understood that such indications refer to compute devices structurally and functionally similar to the compute devices 110, 120, 130 and 140 shown and described with respect to FIG. 1. The following paragraphs include example systems for implementing a distributed database. It should be understood that any of the examples can be combined with other examples, devices, methods and/or systems listed below or otherwise described herein.

Example System 1: If the compute device 700 is called Alice, and the compute device 800 is called Bob, then synchronization between them can be as illustrated in FIG. 7. A sync between Alice and Bob can, for example, be as follows:

Alice sends Bob the events stored in distributed database 703.

Bob creates and/or defines a new event which contains:
a hash of the last event Bob created and/or defined
a hash of the last event Alice created and/or defined
a digital signature by Bob of the above Bob sends Alice the events stored in distributed database 803.

Alice creates and/or defines a new event.

Alice sends Bob that event.

Alice calculates a total order for the events, as a function of a hashgraph

Bob calculates a total order for the events, as a function of a hashgraph

At any given time, a member can store the events received so far, along with an identifier associated with the compute device and/or distributed database instance that created and/or defined each event. Each event contains the hashes of two earlier events, except for an initial event (which has no parent hashes), and the first event for each new member (which has a single parent event hash, representing the event of the existing member that invited them to join). A diagram can be drawn representing this set of events. It can show a vertical line for each member, and a dot or circle on that line for each event created and/or defined by that member. A diagonal line is drawn between two dots whenever an event (the higher dot) includes the hash of an earlier event (the lower dot). An event can be said to be linked to another event if that event can reference the other event via a hash of that event (either directly or through intermediary events).

Figure 3:
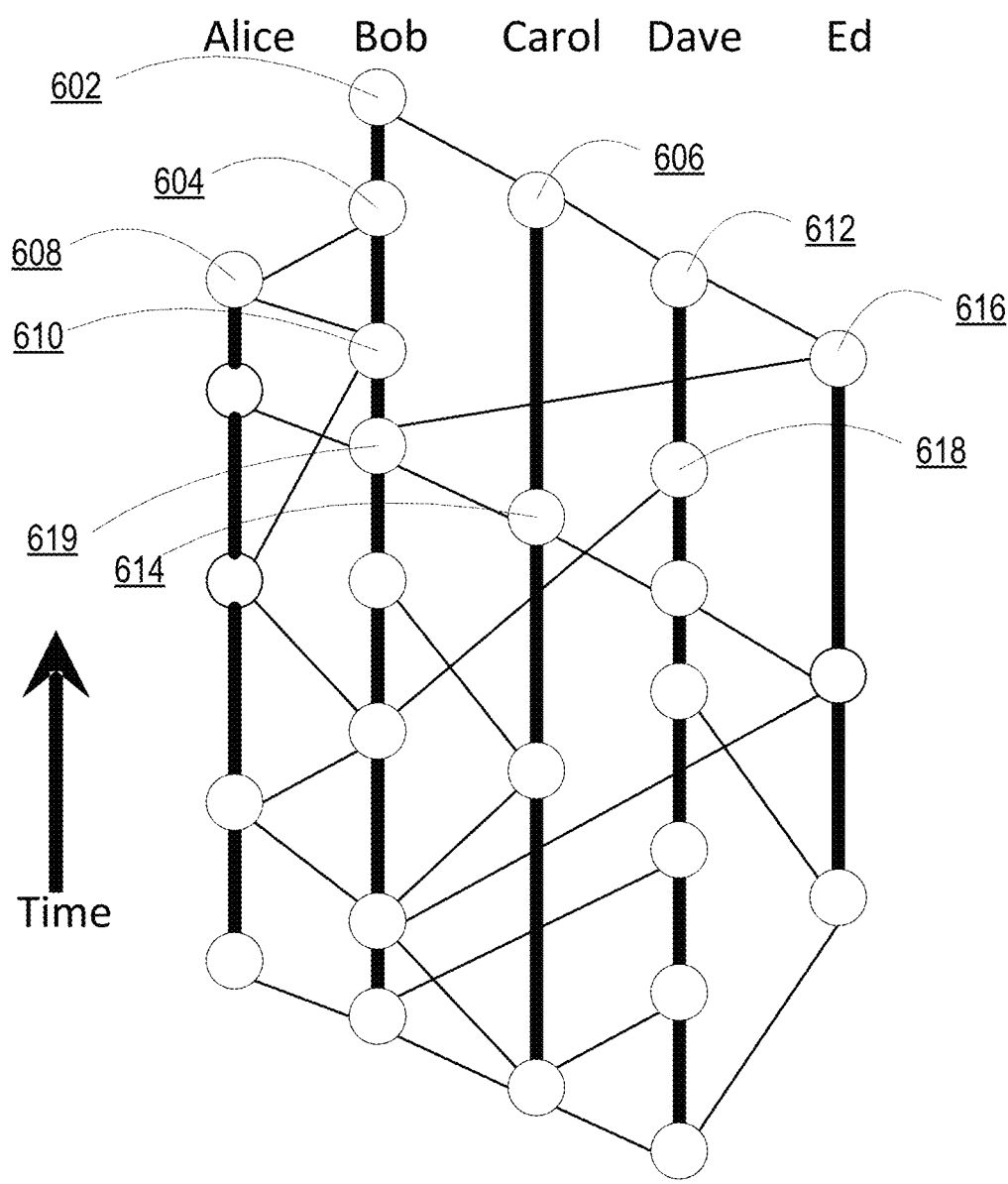
FIGS. 3-6 illustrate examples of a hashgraph, according to an embodiment.

For example, FIG. 3 illustrates an example of a hashgraph 600. Event 602 is created and/or defined by Bob as a result of and after syncing with Carol. Event 602 includes a hash of event 604 (the previous event created and/or defined by Bob) and a hash of event 606 (the previous event created and/or defined by Carol). In some embodiments, for example, the hash of event 604 included within event 602 includes a pointer to its immediate ancestor events, events 608 and 610. As such, Bob can use the event 602 to reference events 608 and 610 and reconstruct the hashgraph using the pointers to the prior events. In some instances, event 602 can be said to be linked to the other events in the hashgraph 600 since event 602 can reference each of the events in the hashgraph 600 via earlier ancestor events. For example, event 602 is linked to event 608 via event 604. For another example, event 602 is linked to event 616 via events 606 and event 612.

Example System 2: The system from Example System 1 (or any other example system disclosed herein), where the event also includes a "payload" of transactions or other information to record. Such a payload can be used to update the events with any transactions and/or information that occurred and/or was defined since the compute device's immediate prior event. For example, the event 602 can include any transactions performed by Bob since event 604 was created and/or defined. Thus, when syncing event 602 with other compute devices, Bob can share this information. Accordingly, the transactions performed by Bob can be associated with an event and shared with the other members using events. In some implementations, Example System 2 can also apply to other example systems disclosed herein that may not specifically reference Example System 2.

Example System 3: The system from Example System 1 (or any other example system disclosed herein), where the event also includes the current time and/or date, useful for debugging, diagnostics, and/or other purposes. The time and/or date can be the local time and/or date when the compute device (e.g., Bob) creates and/or defines the event. In such embodiments, such a local time and/or date is not synchronized with the remaining devices. In other embodiments, the time and/or date can be synchronized across the devices (e.g., when exchanging events). In still other embodiments, a global timer can be used to determine the time and/or date.

Example System 4: The system from Example System 1 (or any other example system disclosed herein), where Alice does not send Bob events created and/or defined by Bob, nor ancestor events of such an event. An event x is an ancestor of an event y if y contains the hash of x, or y contains the hash of an event that is a descendent of x. Similarly stated, in such embodiments Bob sends Alice the events not yet stored by Alice and does not send events already stored by Alice.

Figure 4:
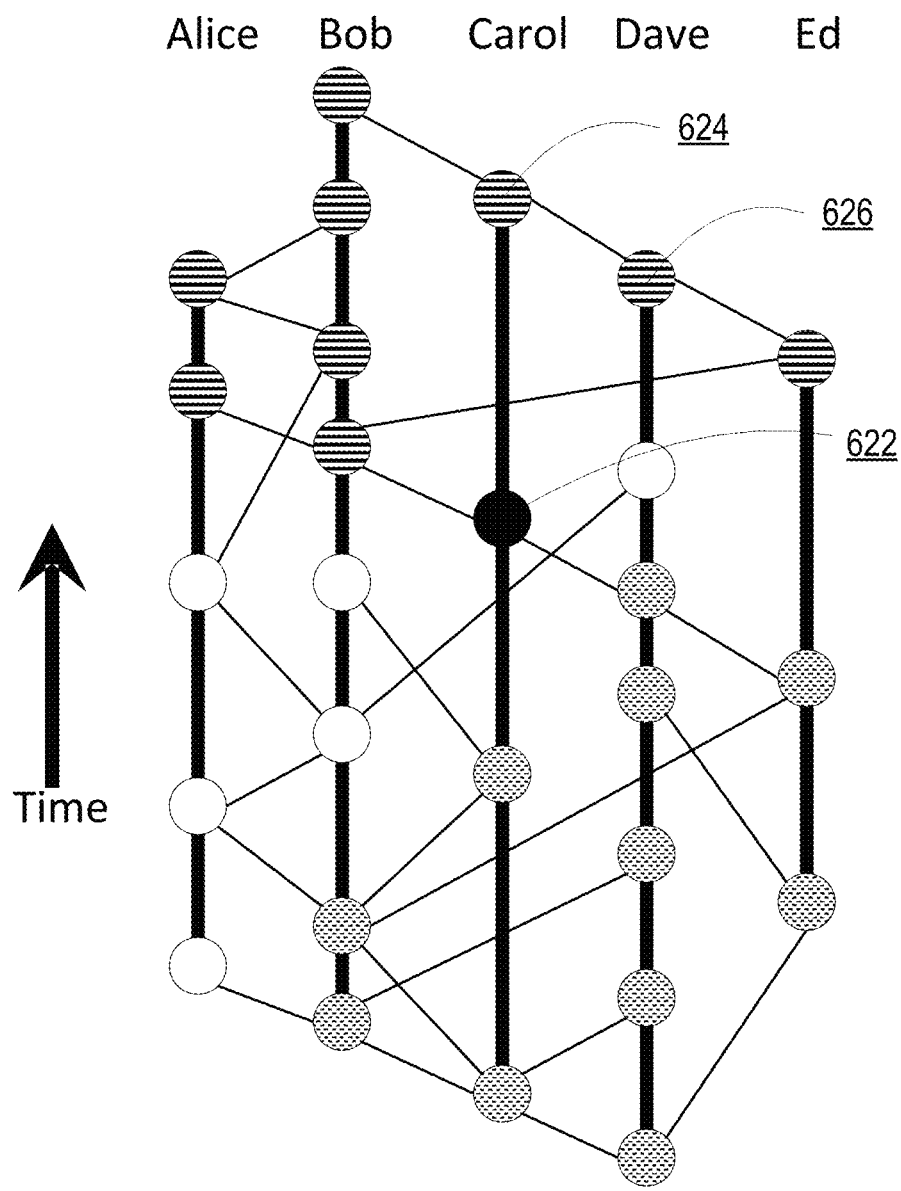
Figure 5:
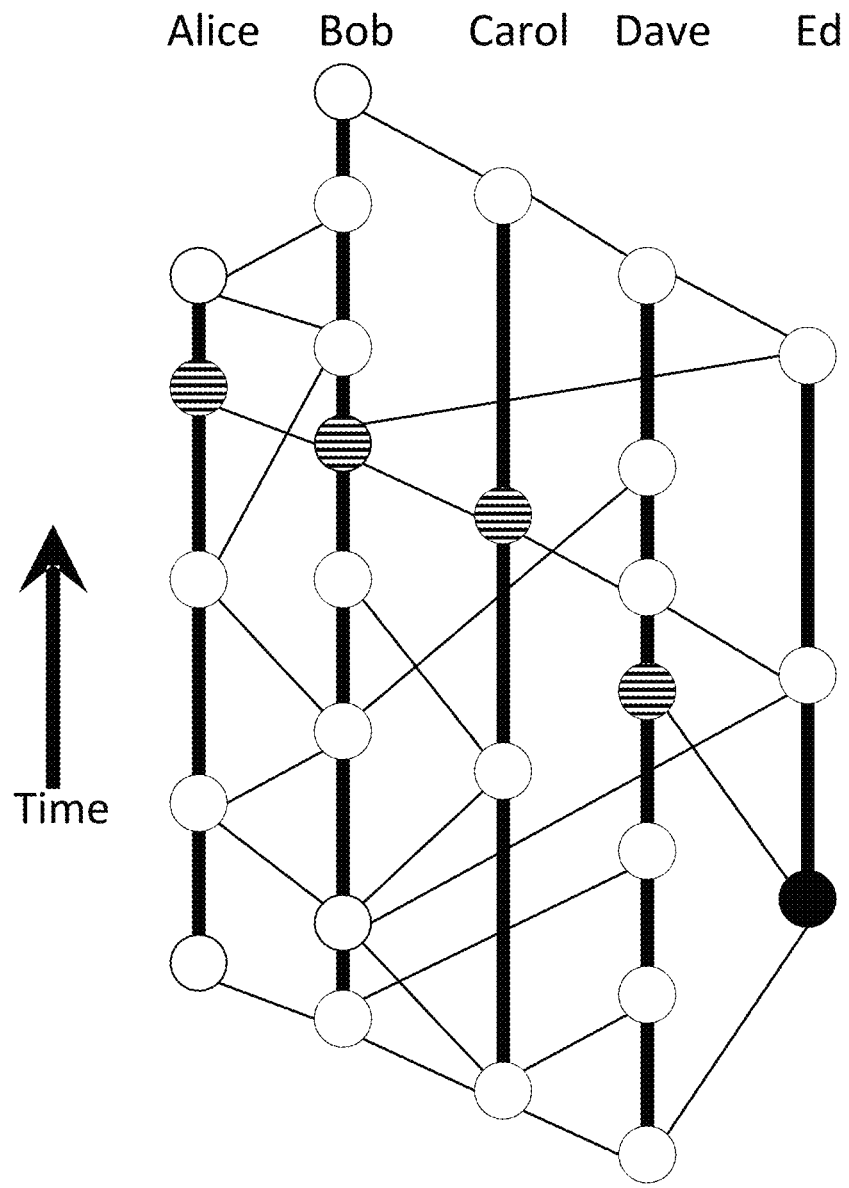

For example, FIG. 4 illustrates an example hashgraph 620 illustrating the ancestor events (dotted circles) and descendent events (striped circles) of the event 622 (the black circle). The lines establish a partial order on the events, where the ancestors come before the black event, and the descendants come after the black event. The partial order does not indicate whether the white events are before or after the black event, so a total or consensus order is used to decide their sequence. For another example, FIG. 5 illustrates an example hashgraph illustrating one particular event (solid circle) and the first time each member receives an indication of that event (striped circles). When Carol syncs with Dave to create and/or define event 624, Dave does not send to Carol ancestor events of event 622 since Carol is already aware of and has received such events. Instead, Dave sends to Carol the events Carol has yet to receive and/or store in Carol's distributed database instance. In some embodiments, Dave can identify what events to send to Carol based on what Dave's hashgraph reveals about what events Carol has previously received. Event 622 is an ancestor of event 626. Therefore, at the time of event 626, Dave has already received event 622. FIG. 4 shows that Dave received event 622 from Ed who received event 622 from Bob who received event 622 from Carol. Furthermore, at the time of event 624, event 622 is the last event that Dave has received that was created and/or defined by Carol. Therefore, Dave can send Carol the events that Dave has stored other than event 622 and its ancestors. Additionally, upon receiving event 626 from Dave, Carol can reconstruct the hashgraph based on the pointers in the events stored in Carol's distributed database instance. In other embodiments, Dave can identify what events to send to Carol based on Carol sending event 622 to Dave (not shown in FIG. 4) and Dave identifying using event 622 (and the references therein) to identify the events Carol has already received. By reconstructing the hashgraph, Carol can determine how Dave would vote in the consensus protocols described above without actually receiving votes from Dave for each round of the consensus protocol. Similarly, based on Carol's hashgraph, Carol is able to determine how each remaining member of the distributed database would vote without specifically receiving their votes. This reduces network traffic as votes for each round of a consensus protocol are not exchanged between members of the distributed database.

Example System 5: The system from Example System 1 (or any other example system disclosed herein) where both members send events to the other in an order such that an event is not sent until after the recipient has received and/or stored the ancestors of that event. Accordingly, the sender sends events from oldest to newest, such that the recipient can check the two hashes on each event as the event is received, by comparing the two hashes to the two ancestor events that were already received. The sender can identify what events to send to the receiver based on the current state of the sender's hashgraph (e.g., a database state variable defined by the sender) and what that hashgraph indicates the receiver has already received. Referring to FIG. 3, for example, when Bob is syncing with Carol to define event 602, Carol can identify that event 619 is the last event created and/or defined by Bob that Carol has received. Therefore Carol can determine that Bob knows of that event, and its ancestors. Thus Carol can send Bob event 618 and event 616 first (i.e., the oldest events Bob has yet to receive that Carol has received). Carol can then send Bob event 612 and then event 606. This allows Bob to easily link the events and reconstruct Bob's hashgraph. Using Carol's hashgraph to identify what events Bob has yet to receive can increase the efficiency of the sync and can reduce network traffic since Bob does not request events from Carol.

In other embodiments, the most recent event can be sent first. If the receiver determines (based on the hash of the two previous events in the most recent event and/or pointers to previous events in the most recent event) that they have not yet received one of the two previous events, the receiver can request the sender to send such events. This can occur until the receiver has received and/or stored the ancestors of the most recent event. Referring to FIG. 3, in such embodiments, for example, when Bob receives event 606 from Carol, Bob can identify the hash of event 612 and event 614 in event 606. Bob can determine that event 614 was previously received from Alice when creating and/or defining event 604. Accordingly, Bob does not need to request event 614 from Carol. Bob can also determine that event 612 has not yet been received. Bob can then request event 612 from Carol. Bob can then, based on the hashes within event 612, determine that Bob has not received events 616 or 618 and can accordingly request these events from Carol. Based on events 616 and 618, Bob will then be able to determine that he has received the ancestors of event 606.

Example System 6: The system from Example System 5 (or any other example system disclosed herein) with the additional constraint that when a member has a choice between several events to send next, the event is chosen to minimize the total number of bytes sent so far created and/or defined by that member. For example, if Alice has only two events left to send Bob, and one is 100 bytes and was created and/or defined by Carol, and one is 10 bytes and was created and/or defined by Dave, and so far in this sync Alice has already sent 200 bytes of events by Carol and 210 by Dave, then Alice should send the Dave event first, then subsequently send the Carol event. Because 210+10<100+200. This can be used to address attacks in which a single member either sends out a single gigantic event, or a flood of tiny events. In the case in which the traffic exceeds a byte limit of most members (as discussed with respect to Example System 7), the method of Example System 6 can ensure that the attacker's events are ignored rather than the events of legitimate users. Similarly stated, attacks can be reduced by sending the smaller events before bigger ones (to defend against one giant event tying up a connection). Moreover, if a member can't send each of the events in a single sync (e.g., because of network limitation, member byte limits, etc.), then that member can send a few events from each member, rather than merely sending the events defined and/or created by the attacker and none (of few) events created and/or defined by other members.

Example System 7: The system from Example System 1 (or any other example system disclosed herein) with an additional first step in which Bob sends Alice a number indicating a maximum number of bytes he is willing to receive during this sync, and Alice replies with her limit. Alice then stops sending when the next event would exceed this limit. Bob does the same. In such an embodiment, this limits the number of bytes transferred. This may increase the time to convergence, but will reduce the amount of network traffic per sync.

Alternatively or additionally, in some implementations, a limit of the number of bytes per synchronization process and/or a number of events permitted to be synchronized per synchronization process are implemented in the distributed database. For example, Alice can send to Bob events not yet known by Bob, then the instance of the database associated with Alice can stop and/or terminate sending data packets and/or events when the next event exceeds and/or reaches a synchronization threshold value based on either an allowable number of bytes (i.e., an amount of synchronized data) or an allowable number of permitted events to be synchronized. Transmission of events in such cases can be performed by sending the parent of an event before sending the event if both events are being synchronized.

In some instances, when Alice is synchronizing with Bob, and she needs to send him two events, for example, event X and event Y, and Bob already has all parents of both those events, then Alice can choose which to send first. In some implementations, Alice can calculate the total bytes (Bx) of all the bytes in X plus the bytes in all the events by the creator of X that she has already sent during this synchronization. Similarly, she can calculate the total bytes (By) for the bytes in Y and the events by the creator of Y that were sent so far. She can then choose to send X before Y if Bx<By, and send Y before X if By<Bx, and send them in either order if Bx=By.

In some instances, synchronization between two members can be limited to a maximum number of received events per synchronization (e.g., to prevent denial of service attacks). If such a limit is reached before all the events related to that synchronization have been received, then the synchronization ends early. In some other instances, each synchronization event can be limited to a maximum number of received bytes (instead of or in addition to being limited to a number of received events). Accordingly, limits such as maximum number of received events and maximum number of received bytes can be used to constrain or regulate the number of events and/or bytes received and/or accepted by a receiver member (e.g., Bob) from another member (e.g., Alice) during a synchronization. The aforementioned limits can prevent attacks where a malicious member creates a large event, or floods the network with a huge number of tiny events. These limits also ensure graceful degradation in cases when, for instance, one member has a low-bandwidth connection to handle an average amount of data traffic but not a surge in data traffic.

In some implementations, members or compute devices do not initiate synchronization with another member or compute device if all the known events for which consensus has not yet been identified are empty events containing no transactions. This ensures that members will not waste bandwidth if there are long periods with no new transactions.

In some instances, a lack of consensus can cause an overflow of a member's or compute device memory. For example, a set of events for which consensus has not yet been identified can grow or increase past a given threshold, when, for instance, at least ⅓ of the population is offline, since consensus may not be derived when too few members are online. Thus, a member's or compute device's memory can overflow with the cumulative number of events for which consensus cannot be reached. To prevent memory overflow due to accumulated events for which no consensus can be achieved, each member and/or compute device can be configured such that once a threshold of events for which consensus has not yet been achieved is reached, that member or compute device can refuse to define and/or create any new events until that member or compute device reaches consensus on some of the events of which the member or compute device is aware. Differently stated, in some instances a lack of consensus can cause an overflow if consensus cannot be achieved (e.g., when too few members are online and able to derive consensus). Thus, to prevent an overflow of events that cannot be put into consensus order (e.g., because too few members are online), the member does not define any additional events until it can receive events from some of the offline members to reach consensus on some of the older events.

Example System 8: The system from Example System 1 (or any other example system disclosed herein), in which the following steps added at the start of the syncing process:

Alice identifies S, the set of events that she has received and/or stored, skipping events that were created and/or defined by Bob or that are ancestors of events created and/or defined by Bob.

Alice identifies the members that created and/or defined each event in S, and sends Bob the list of the member's ID numbers. Alice also sends a number of events that were created and/or defined by each member that she has already received and/or stored.

Bob replies with a list of how many events he has received that were created and/or defined by the other members.

Alice then sends Bob only the events that he has yet to receive. For example, if Alice indicates to Bob that she has received 100 events created and/or defined by Carol, and Bob replies that he has received 95 events created and/or defined by Carol, then Alice will send only the most recent 5 events created and/or defined by Carol.

Example System 9: The system from Example System 1 (or any other example system disclosed herein), with an additional mechanism for identifying and/or handling cheaters. Each event contains two hashes, one from the last event created and/or defined by that member (the "self hash"), and one from the last event created and/or defined by another member (the "foreign hash"). If a member creates and/or defines two different events with the same self hash, then that member is a "cheater". If Alice discovers Dave is a cheater, by receiving two different events created and/or defined by him with the same self hash, then she stores an indicator that he is a cheater, and refrains from syncing with him in the future. If she discovers he is a cheater and yet still syncs with him again and creates and/or defines a new event recording that fact, then Alice becomes a cheater, too, and the other members who learn of Alice further syncing with Dave stop syncing with Alice. In some embodiments, this only affects the syncs in one way. For example, when Alice sends a list of identifiers and the number of events she has received for each member, she doesn't send an ID or count for the cheater, so Bob won't reply with any corresponding number. Alice then sends Bob the cheater's events that she has received and for which she hasn't received an indication that Bob has received such events. After that sync is finished, Bob will also be able to determine that Dave is a cheater (if he hasn't already identified Dave as a cheater), and Bob will also refuse to sync with the cheater.

Example System 10: The system in Example System 9 (or any other example system disclosed herein), with the addition that Alice starts a sync process by sending Bob a list of cheaters she has identified and of whose events she is still storing, and Bob replies with any cheaters he has identified in addition to the cheaters Alice identified. Then they continue as normal, but without giving counts for the cheaters when syncing with each other.

Example System 11: The system in Example System 1 (or any other example system disclosed herein), with a process that repeatedly updates a current state (e.g., as captured by a database state variable defined by a member of the system) based on transactions inside of any new events that are received during syncing. This also can include a second process that repeatedly rebuilds that state (e.g., the order of events), whenever the sequence of events changes, by going back to a copy of an earlier state, and recalculating the present state by processing the events in the new order. Thus, for example, each compute device can maintain two versions of a state (one that is updated as new events and transactions are received (based on the partial order) and one that is updated only after consensus is achieved (based on the total or consensus order)). At some point (e.g., after a period of time, after a given number of events are defined and/or received, etc.), the version of the state that is updated as new events and transactions are received can be discarded and a new copy of the state that is updated only after consensus is achieved can be made as a new version of the state that is updated as new events and transactions are received. This can ensure synchronization of both states.

In some embodiments, the current state is a state, balance, condition, and/or the like associated with a result of the transactions. Similarly stated, the state can include the data structure and/or variables modified by the transactions. For example, if the transactions are money transfers between bank accounts, then the current state can be the current balance of the accounts. For another example, if the transactions are associated with a multiplayer game, the current state can be the position, number of lives, items obtained, sate of the game, and/or the like associated with the game.

Example System 12: The system in Example System 11 (or any other example system disclosed herein), made faster by the use of "fast clone" arrayList to maintain the state (e.g., bank account balances, game state, etc.). A fast clone arrayList is a data structure that acts like an array with one additional feature: it supports a "clone" operation that appears to create and/or define a new object that is a copy of the original. The clone acts as if it were a true copy, because changes to the clone do not affect the original. The cloning operation, however, is faster than creating a true copy, because creating a clone does not actually involve copying and/or updating the entire contents of one arrayList to another. Instead of having two clones and/or copies of the original list, two small objects, each with a hash table and a pointer to the original list, can be used. When a write is made to the clone, the hash table remembers which element is modified, and the new value. When a read is performed on a location, the hash table is first checked, and if that element was modified, the new value from the hash table is returned. Otherwise, that element from the original arrayList is returned. In this way, the two "clones" are initially just pointers to the original arrayList. But as each is modified repeatedly, it grows to have a large hash table storing differences between itself and the original list. Clones can themselves be cloned, causing the data structure to expand to a tree of objects, each with its own hash table and pointer to its parent. A read therefore causes a walk up the tree until a vertex is found that has the requested data, or the root is reached. If vertex becomes too large or complex, then it can be replaced with a true copy of the parent, the changes in the hash table can be made to the copy, and the hash table discarded. In addition, if a clone is no longer needed, then during garbage collection it can be removed from the tree, and the tree can be collapsed.

Example System 13: The system in Example System 11 (or any other example system disclosed herein), made faster by the use of a "fast clone" hash table to maintain the state (e.g., bank account balances, game state, etc.). This is the same as System 12, except the root of the tree is a hash table rather than an arrayList.

Example System 14: The system in Example System 11 (or any other example system disclosed herein), made faster by the use of a "fast clone" relational database to maintain the state (e.g., bank account balances, game state, etc.). For example, the fast clone database can be used to maintain two copies of the state, as discussed with respect to Example System 11. This is an object that acts as a wrapper around an existing Relational Database Management System (RDBMS). Each apparent "clone" is actually an object with an ID number and a pointer to an object containing the database. When the user's code tries to perform a Structure Query Language (SQL) query on the database, that query is first modified, then sent to the real database. The real database is identical to the database as seen by the client code, except that each table has one additional field for the clone ID. For example, suppose there is an original database with clone ID 1, and then two clones of the database are made, with IDs 2 and 3 (e.g., used to maintain the two copies of the state). Each row in each table will have a 1, 2, or 3 in the clone ID field. When a query comes from the user code into clone 2, the query is modified so that the query will only read from rows that have a 2 or 1 in that field. Similarly, reads to 3 look for rows with a 3 or 1 ID. If the Structured Query Language (SQL) command goes to clone 2 and says to delete a row, and that row has a 1, then the command should just change the 1 to a 3, which marks the row as no longer being shared by clones 2 and 3, and now just being visible to 3. If there are several clones in operation, then several copies of the row can be inserted, and each can be changed to the ID of a different clone, so that the new rows are visible to the clones except for the clone that just "deleted" the row. Similarly, if a row is added to clone 2, then the row is added to the table with an ID of 2. A modification of a row is equivalent to a deletion then an insertion. As before, if several clones are garbage collected, then the tree can be simplified. The structure of that tree will be stored in an additional table that is not accessible to the clones, but is purely used internally.

Example System 15: The system in Example System 11 (or any other example system disclosed herein), made faster by the use of a "fast clone" file system to maintain the state. This is an object that acts as a wrapper around a file system. The file system is built on top of the existing file system, using a fast clone relational database to manage the different versions of the file system. The underlying file system stores a large number of files, either in one directory, or divided up according to filename (to keep directories small). The directory tree can be stored in the database, and not provided to the host file system. When a file or directory is cloned, the "clone" is just an object with an ID number, and the database is modified to reflect that this clone now exists. If a fast clone file system is cloned, it appears to the user as if an entire, new hard drive has been created and/or defined, initialized with a copy of the existing hard drive. Changes to one copy can have no effect on the other copies. In reality, there is just one copy of each file or directory, and when a file is modified through one clone the copying occurs.

Example System 16: The system in Example System 15 (or any other example system disclosed herein) in which a separate file is created and/or defined on the host operating system for each N-byte portion of a file in the fast clone file system. N can be some suitable size, such as for example 4096 or 1024. In this way, if one byte is changed in a large file, only one chunk of the large file is copied and modified. This also increases efficiency when storing many files on the drive that differ in only a few bytes.

Example System 17: The system in Example System 11 (or any other example system disclosed herein) where each member includes in some or all of the events they create and/or define a hash of the state at some previous time, along with the number of events that occurred up to that point, indicating that the member recognizes and/or identifies that there is now a consensus on the order of events. After a member has collected signed events containing such a hash from a majority of the users for a given state, the member can then store that as proof of the consensus state at that point, and delete from memory the events and transactions before that point.

Example System 18: The system in Example System 1 (or any other example system disclosed herein) where operations that calculate a median or a majority is replaced with a weighted median or weighted majority, where members are weighted by their "stake". The stake is a number that indicates how much that member's vote counts. The stake could be holdings in a crypto currency, or just an arbitrary number assigned when the member is first invited to join, and then divided among new members that the member invites to join. Old events can be discarded when enough members have agreed to the consensus state so that their total stake is a majority of the stake in existence. If the total order is calculated using a median of ranks contributed by the members, then the result is a number where half the members have a higher rank and half have a lower. On the other hand, if the total order is calculated using the weighted median, then the result is a number where about half of the total stake is associated with ranks lower than that, and half above. Weighted voting and medians can be useful in preventing a Sybil attack, where one member invites a huge number of "sock puppet" users to join, each of whom are simply pseudonyms controlled by the inviting member. If the inviting member is forced to divide their stake with the invitees, then the sock puppets will not be useful to the attacker in attempts to control the consensus results. Accordingly, proof-of-stake may be useful in some circumstances.

Example System 19: The system in Example System 1 (or any other example system disclosed herein) in which instead of a single, distributed database, there are multiple databases in a hierarchy. For example, there might be a single database that the users are members of, and then several smaller databases, or "chunks", each of which has a subset of the members. When events happen in a chunk, they are synced among the members of that chunk and not among members outside that chunk. Then, from time to time, after a consensus order has been decided within the chunk, the resulting state (or events with their consensus total order) can be shared with the entire membership of the large database.

Example System 20: The system in Example System 11 (or any other example system disclosed herein), with the ability to have an event that updates the software for updating the state (e.g., as captured by a database state variable defined by a member of the system). For example, events X and Y can contain transactions that modify the state, according to software code that reads the transactions within those events, and then updates the state appropriately. Then, event Z can contain a notice that a new version of the software is now available. If a total order says the events happen in the order X, Z, Y, then the state can be updated by processing the transactions in X with the old software, then the transactions in Y with the new software. But if the consensus order was X, Y, Z, then both X and Y can be updated with the old software, which might give a different final state. Therefore, in such embodiments, the notice to upgrade the code can occur within an event, so that the community can achieve consensus on when to switch from the old version to the new version. In some embodiments, the code can switch from the old version to the new version in rounds after the received round of event Z (including the notice to upgrade the code). Thus, if event Z is determined to have a received round r, any events with a received round of round r or before would be ordered using the old version. Similarly, any events that have yet to have a received round as of round r, would be ordered using the new version. This ensures that the members will maintain synchronized states. It also ensures that the system can remain running, even during upgrades, with no need to reboot or restart the process.

Example System 21: The system in Example System 1 (or any other example system disclosed herein), wherein members or compute devices of a hashgraph are configured to remove unnecessary events from instances of the distributed database by defining a signed state of the distributed database. In some implementations, members or compute devices can execute additional processes to prevent the overflow of memory and/or save memory resources. For instance, members or compute devices can periodically discard old events based on a set of rules or criteria. A rule can for example, state to ignore or discard transactions in an event if the event's round received minus round number (or round created) exceeds a given threshold or if the event's generation is less than a threshold (e.g., based on expiredDuration or ancientDuration). In some instances, events contain the hashes of their parents and the round created for each parent. Therefore, a given event can still be accepted during a synchronization, even if one or more parents are missing due to having been ignored or discarded because they were created too many rounds ago (e.g., are ancient or expired, as described herein). Accordingly, signed states can include the hash of events that were defined and/or created in rounds before the signed state, but not so long before the signed state that they would be ignored or discarded. Removing or discarding unnecessary events decreases overhead caused by synchronizing redundant or irrelevant events between the set of compute devices that implement the distributed database (e.g., members of a hashgraph) and decreases underutilization of local memories of such a set of compute devices. Additional details regarding removing and/or discarding events can be found in U.S. Patent Application Publication 2018/0173747, filed as U.S. patent application Ser. No. 15/846,402, filed Dec. 19, 2017 and titled "Methods and Apparatus for a Distributed Database that Enables Deletion of Events," which is incorporated herein by reference in its entirety.

Moreover, in some implementations, during a sync with another member, a compute device can reject received events that are syntactically incorrect (e.g., that don't parse) or that have an invalid digital signature. Moreover, in some implementations, during a sync, received events that are expired can be rejected. Further, in some implementations, during a sync, a received event that has a non-ancient, non-expired parent event that is missing at the compute device (e.g., is not in the memory or DAG of that compute device or instance of the distributed database) can be rejected until the non-ancient, non-expired parent event is received.

The systems described above are expected to create and/or achieve an efficient convergence mechanism for distributed consensus, with eventual consensus. Several theorems can be proved about this, as shown in the following.

Example Theorem 1: If event x precedes event y in the partial order, then in a given member's knowledge of the other members at a given time, each of the other members will have either received an indication of x before y, or will not yet have received an indication of y.

Proof: If event x precedes event y in the partial order, then x is an ancestor of y. When a member receives an indication of y for the first time, that member has either already received an indication of x earlier (in which case they heard of x before y), or it will be the case that the sync provides that member with both x and y (in which case they will hear of x before y during that sync, because the events received during a single sync are considered to have been received in an order consistent with ancestry relationships as described with respect to Example System 5). QED Example Theorem 2: For any given hashgraph, if x precedes y in the partial order, then x will precede y in the total order calculated for that hashgraph.

Proof: If x precedes y in the partial order, then by theorem 1:

for all i, rank(i,x)<rank(i,y)

where rank(i,x) is the rank assigned by member i to event x, which is 1 if x is the first event received by member i, 2 if it is second, and so on. Let med(x) be the median of the rank(i,x) over all i, and similarly for med(y).

For a given k, choose an i1 and i2 such that rank(i1,x) is the kth-smallest x rank, and rank(i2,y) is the kth-smallest y rank. Then:

rank(i1,x)<rank(i2,y)

This is because rank(i2,y) is greater than or equal to k of the y ranks, each of which is strictly greater than the corresponding x rank. Therefore, rank(i2,y) is strictly greater than at least k of the x ranks, and so is strictly greater than the kth-smallest x rank. This argument holds for any k.

Let n be the number of members (which is the number of i values). Then n must be either odd or even. If n is odd, then let k=(n+1)/2, and the kth-smallest rank will be the median. Therefore, med(x)<med(y). If n is even, then when k=n/2, the kth-smallest x rank will be strictly less than the kth-smallest y rank, and also the (k+1)th-smallest x rank will be strictly less than the (k+1)th-smallest y rank. So the average of the two x ranks will be less than the average of the two y ranks. Therefore, med(x)<med(y). So in both cases, the median of x ranks is strictly less than the median of y ranks. So if the total order is defined by sorting the actions by median rank, then x will precede y in the total order. QED Example Theorem 3: If a "gossip period" is the amount of time for existing events to propagate through syncing to all the members, then:

after 1 gossip period: all members have received the events after 2 gossip periods: all members agree on the order of those events after 3 gossip periods: all members know that agreement has been reached after 4 gossip periods: all members obtain digital signatures from all other members, endorsing this consensus order.

Proof: Let S0 be the set of the events that have been created and/or defined by a given time T0. If every member will eventually sync with every other member infinitely often, then with probability 1 there will eventually be a time T1 at which the events in S0 have spread to every member, so that every member is aware of all of the events. That is the end of the first gossip period. Let S1 be the set of events that exist at time T1 and that didn't yet exist at T0. There will then with probability 1 eventually be a time T2 at which every member has received every event in set S1, which is those that existed at time T1. That is the end of the second gossip period. Similarly, T3 is when all events in S2, those existing by T2 but not before T1, have spread to all members. Note that each gossip period eventually ends with probability 1. On average, each will last as long as it takes to perform log $2(n)$ syncs, if there are n members.

By time T1, every member will have received every event in S0.

By time T2, a given member Alice will have received a record of each of the other members receiving every event in S0. Alice can therefore calculate the rank for every action in S0 for every member (which is the order in which that member received that action), and then sort the events by the median of the ranks. The resulting total order does not change, for the events in S0. That is because the resulting order is a function of the order in which each member first received an indication of each of those events, which does not change. It is possible, that Alice's calculated order will have some events from S1 interspersed among the S0 events. Those S1 events may still change where they fall within the sequence of S0 events. But the relative order of events in S0 will not change.

By time T3, Alice will have learned a total order on the union of S0 and S1, and the relative order of the events in that union will not change. Furthermore, she can find within this sequence the earliest event from S1, and can conclude that the sequence of the events prior to S1 will not change, not even by the insertion of new events outside of S0. Therefore, by time T3, Alice can determine that consensus has been achieved for the order of the events in history prior to the first S1 event. She can digitally sign a hash of the state (e.g., as captured by a database state variable defined by Alice) resulting from these events occurring in this order, and send out the signature as part of the next event she creates and/or defines.

By time T4, Alice will have received similar signatures from the other members. At that point she can simply keep that list of signatures along with the state they attest to, and she can discard the events she has stored prior to the first S1 event. QED The systems described herein describe a distributed database that achieves consensus quickly and securely. This can be a useful building block for many applications. For example, if the transactions describe a transfer of cryptocurrency from one cryptocurrency wallet to another, and if the state is simply a statement of the current amount in each wallet, then this system will constitute a cryptocurrency system that avoids the costly proof-of-work in existing systems. The automatic rule enforcement allows this to add features that are not common in current cryptocurrencies. For example, lost coins can be recovered, to avoid deflation, by enforcing a rule that if a wallet neither sends nor receives cryptocurrency for a certain period of time, then that wallet is deleted, and its value is distributed to the other, existing wallets, proportional to the amount they currently contain. In that way, the money supply would not grow or shrink, even if the private key for a wallet is lost.

Another example is a distributed game, which acts like a Massively Multiplayer Online (MMO) game being played on a server, yet achieves that without using a central server. The consensus can be achieved without any central server being in control.

Another example is a system for social media that is built on top of such a database. Because the transactions are digitally signed, and the members receive information about the other members, this provides security and convenience advantages over current systems. For example, an email system with strong anti-spam policies can be implemented, because emails could not have forged return addresses. Such a system could also become a unified social system, combining in a single, distributed database the functions currently done by email, tweets, texts, forums, wikis, and/or other social media.

Other applications can include more sophisticated cryptographic functions, such as group digital signatures, in which the group as a whole cooperates to sign a contract or document. This, and other forms of multiparty computation, can be usefully implemented using such a distributed consensus system.

Another example is a public ledger system. Anyone can pay to store some information in the system, paying a small amount of cryptocurrency (or real-world currency) per byte per year to store information in the system. These funds can then be automatically distributed to members who store that data, and to members who repeatedly sync to work to achieve consensus. It can automatically transfer to members a small amount of the cryptocurrency for each time that they sync.

These examples show that the distributed consensus database is useful as a component of many applications. Because the database does not use a costly proof-of-work, possibly using a cheaper proof-of-stake instead, the database can run with a full node running on smaller computers or even mobile and embedded devices.

While described above as an event containing a hash of two prior events (one self hash and one foreign hash), in other embodiments, a member can sync with two other members to create and/or define an event containing hashes of three prior events (one self hash and two foreign hashes). In still other embodiments, any number of event hashes of prior events from any number of members can be included within an event. In some embodiments, different events can include different numbers of hashes of prior events. For example, a first event can include two event hashes and a second event can include three event hashes.

While events are described above as including hashes (or cryptographic hash values) of prior events, in other embodiments, an event can be created and/or defined to include a pointer, an identifier, and/or any other suitable reference to the prior events. For example, an event can be created and/or defined to include a serial number associated with and used to identify a prior event, thus linking the events. In some embodiments, such a serial number can include, for example, an identifier (e.g., media access control (MAC) address, Internet Protocol (IP) address, an assigned address, and/or the like) associated with the member that created and/or defined the event and an order of the event defined by that member. For example, a member that has an identifier of 10 and the event is the 15th event created and/or defined by that member can assign an identifier of 1015 to that event.

In other embodiments, any other suitable format can be used to assign identifiers for events.

In other embodiments, events can contain full cryptographic hashes, but only portions of those hashes are transmitted during syncing. For example, if Alice sends Bob an event containing a hash H, and J is the first 3 bytes of H, and Alice determines that of the events and hashes she has stored, H is the only hash starting with J, then she can send J instead of H during the sync. If Bob then determines that he has another hash starting with J, he can then reply to Alice to request the full H. In that way, hashes can be compressed during transmission.

While the example systems shown and described above are described with reference to other systems, in other embodiments any combination of the example systems and their associated functionalities can be implemented to create and/or define a distributed database. For example, Example System 1, Example System 2, and Example System 3 can be combined to create and/or define a distributed database. For another example, in some embodiments, Example System 10 can be implemented with Example System 1 but without Example System 9. For yet another example, Example System 7 can be combined and implemented with Example System 6. In still other embodiments, any other suitable combinations of the example systems can be implemented.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components, and/or features of the different embodiments described.

What is claimed is:

1. A method, comprising:

defining, at a first compute device from a plurality of compute devices that implements a distributed database via a network, an address book for the distributed database, the address book including an identifier for each compute device from the plurality of compute devices that implements the distributed database via the network;

receiving, at the first compute device and from a second compute device from the plurality of compute devices, a first event including a first transaction to update the address book;

calculating, at the first compute device and based on a consensus protocol of the distributed database that uses the address book, a received round for the first event, the received round for the first event not being a predetermined received round;

receiving at the first compute device and from a third compute device from the plurality of compute devices, a second event including a second transaction to update the address book;

updating, at the first compute device, a directed acyclic graph (DAG) that represents the distributed database to include a representation of the second event;

calculating, at the first compute device and based on the consensus protocol and the DAG, a received round for the second event, the received round for the second event being greater than the received round for the first event, the received round for the second event being a predetermined received round;

updating, at the first compute device, the address book to define an updated address book, based on (1) the first transaction, (2) the second transaction, and (3) the received round for the second event being a predetermined received round;

calculating, at the first compute device and using the updated address book with the consensus protocol, a received round for each event from a first plurality of events within a set of rounds from a predetermined number of rounds after the received round for the second event;

identifying, at the first compute device and using the consensus protocol, a set of famous witness events for each round of the consensus protocol, the set of famous witness events for each round being used by the consensus protocol to determine a received round for each event from a second plurality of events;

calculating an attribute for at least one first event from the second plurality of events using the address book; and excluding an attribute for at least one second event from the second plurality of events from being calculated using the updated address book, the at least one second event from the second plurality of events being an ancestor of at least one famous witness event from the set of famous witness events for a round in which the updated address book is defined.

2. The method of claim 1, further comprising:
defining a state of the distributed database based on the received round for each event from the first plurality of events; and
sending the state to at least one compute device from the plurality of compute devices that implements the distributed database.

3. The method of claim 1, wherein the first transaction to update the address book includes at least one of adding a compute device to the plurality of compute devices that implements the distributed database or removing a compute device from the plurality of compute devices that implements the distributed database.

4. The method of claim 1, wherein the address book includes a stake value for each compute device from the plurality of compute devices that implements the distributed database,
the first transaction to update the address book includes modifying the stake value for at least one compute device from the plurality of compute devices.

5. The method of claim 1, wherein a received round for each event from a third plurality of events associated with the distributed database is based on a set of descendant events for that event, the set of descendant events being calculated using the address book prior to the updating the address book, the set of descendant events being recalculated using the updated address book after the updating the address book.

6. The method of claim 1, wherein the attribute is recalculated for each event from the second plurality of events using the updated address book when that event is not an ancestor of at least one event from the set of famous witness events for a round in which the updated address book is defined.

7. The method of claim 1, wherein the updated address book includes updates to the address book within events having a received round number between a round in which a previous update to the address book occurred and the received round for the second event.

8. The method of claim 1, wherein the updating the address book occurs a predetermined number of rounds after the received round for the second event.

9. The method of claim 1, wherein the identifier for each compute device from the plurality of compute devices is a public key for that compute device from the plurality of compute devices.

10. An apparatus, comprising:
a memory of a compute device associated with a distributed database implemented by a plurality of compute devices via a network operatively coupled to the plurality of compute devices; and
a processor operatively coupled to the memory, the processor configured to:
define an address book for the distributed database, the address book including an identifier for each compute device from the plurality of compute devices that implements the distributed database;
receive, from a compute device from the plurality of compute devices, a first event including a transaction to update the address book;
update a directed acyclic graph (DAG) that represents the distributed database to include a representation of the first event;
calculate a round created for each event from a first plurality of events, the first event included in the first plurality of events;
calculate, based on (1) the DAG, (2) a consensus protocol of the distributed database that uses the address book, and (3) the round created for each event from the first plurality of events, a received round for the first event, the received round for the first event being based on a threshold number of events from a second plurality of events being descendants of the first event;
update the address book (1) based on the transaction to define an updated address book and (2) a predetermined number of rounds after the received round for the first event;
recalculate, using the updated address book, the round created for each event from a first set of events from the first plurality of events to define a recalculated round created for that event from the first set of events, (1) each event from the first set of events not having a descendent event from the second plurality of events, (2) the round created for each event from a second set of events from the first plurality of events not being recalculated using the updated address book, and (3) each event from the second set of events having a descendent event from the second plurality of events; and
calculate, using the updated address book with the consensus protocol and based on the round created for each event from the second set of events and the recalculated round created for each event from the first set of events, a received round for a second event.

11. The apparatus of claim 10, wherein the predetermined number of rounds after the received round for the first event is greater than one.

12. The apparatus of claim 10, wherein the updated address book includes updates to the address book within events having the received round for the first event.

13. The apparatus of claim 10, wherein the transaction to update the address book includes at least one of adding a compute device to the plurality of compute devices that implements the distributed database or removing a compute device from the plurality of compute devices that implements the distributed database.

14. The apparatus of claim 10, wherein the processor is configured to not recalculate, using the updated address book, the round created for each event from the first plurality of events when that event has a descendent event from the second plurality of events.

15. A non-transitory processor-readable medium storing code representing instructions to be executed by a processor, the code comprising code to cause the processor to:
define an address book for a distributed database, the address book including a public key for each compute device from a plurality of compute devices that implements the distributed database;
receive a set of events, each event from the set of events including a transaction to update the address book;
update a directed acyclic graph (DAG) that represents the distributed database to include a representation of the set of events;
calculate a round created for each event from the set of events;

calculate, based on (1) the DAG, (2) a consensus protocol of the distributed database that uses the address book, and (3) the round created for each event from the set of events, a received round for each event from the set of events;

update, during a first round of the consensus protocol and based on the transaction in each event from a first subset of events from the set of events, the address book to define a first updated address book, the received round for each event from the first subset of events being within a first range;

calculate, using (1) the first updated address book with the consensus protocol and (2) the DAG, a received round for each event from a first plurality of events within a set of rounds from a predetermined number of rounds after the first range;

update, during a second round of the consensus protocol and based on the transaction in each event from a second subset of events from the set of events, the first updated address book to define a second updated address book, the received round for each event from the second subset of events being within a second range different than the first range;

calculate, using the second updated address book with the consensus protocol, a received round for each event from a second plurality of events within a set of rounds from a predetermined number of rounds after the second range; and define a state of the distributed database based on the received round for each event from the first plurality of events and the received round for each event from the second plurality of events.

16. The non-transitory processor-readable medium of claim 15, further comprising code to cause the processor to:
send the state to at least one compute device from the plurality of compute devices that implements the distributed database.

17. The non-transitory processor-readable medium of claim 15, wherein the transaction to update the address book included in each event from the set of events includes at least one of adding a compute device to the plurality of compute devices that implements the distributed database or removing a compute device from the plurality of compute devices that implements the distributed database.

18. The non-transitory processor-readable medium of claim 15, wherein the address book includes a stake value for each compute device from the plurality of compute devices that implements the distributed database, the transaction to update the address book included within at least one event from the set of events includes modifying the stake value for at least one compute device from the plurality of compute devices.

19. The non-transitory processor-readable medium of claim 15, wherein the received round for each event from the first plurality of events and the received round for each event from the second plurality of events are based on a set of descendant events, a round created for each event from the set of descendant events being calculated using the first updated address book for the predetermined number of rounds after the first range, the round created for each event from the set of descendant events being recalculated using the second updated address book for the predetermined number of rounds after the second range.

20. The non-transitory processor-readable medium of claim 15, wherein the DAG is a first DAG, the non-transitory processor-readable medium further comprising code to cause the processor to:
send the state of the distributed database to a compute device from the plurality of compute devices, the state (1) being associated with a completed round of the consensus protocol, (2) including an indication of a core set of events that (a) is associated with the completed round and (b) includes fewer events than the set of events, and (3) being used to generate a second DAG at the compute device.

* * * * *